United States Patent
Groner et al.

(10) Patent No.: US 7,363,346 B2
(45) Date of Patent: Apr. 22, 2008

(54) RELIABLY STORING INFORMATION ACROSS MULTIPLE COMPUTERS SUCH AS IN A HIVE OF COMPUTERS

(75) Inventors: Michael Scott Groner, Chesterfield, MO (US); Roberto Raul Lozano, Creve Coeur, MO (US)

(73) Assignee: Appistry, Inc., St. Louis, MO (US)

( * ) Notice: Subject to any disclaimer, the term of this patent is extended or adjusted under 35 U.S.C. 154(b) by 60 days.

(21) Appl. No.: 11/241,152

(22) Filed: Sep. 30, 2005

(65) Prior Publication Data

US 2007/0011302 A1   Jan. 11, 2007

(51) Int. Cl.
 *G06F 13/00* (2006.01)

(52) U.S. Cl. ................. 709/214; 709/215; 709/226

(58) Field of Classification Search .......... 709/213, 709/214, 215, 217, 223, 225, 226; 713/193; 714/6
See application file for complete search history.

(56) References Cited

U.S. PATENT DOCUMENTS

| | | | |
|---|---|---|---|
| 6,128,277 A * | 10/2000 | Bruck et al. ............... 370/221 |
| 6,320,520 B1 * | 11/2001 | Luby ............................ 341/50 |
| 6,665,701 B1 | 12/2003 | Combs et al. |
| 6,766,348 B1 | 7/2004 | Combs et al. |
| 7,043,225 B1 | 5/2006 | Patel et al. |
| 7,069,295 B2 * | 6/2006 | Sutherland et al. ......... 709/203 |
| 2001/0024502 A1 * | 9/2001 | Ohkuma et al. ............. 380/46 |
| 2002/0152106 A1 | 10/2002 | Stoxen et al. |
| 2002/0162103 A1 * | 10/2002 | Boudreault et al. ........... 725/30 |
| 2003/0051051 A1 | 3/2003 | O'Neal et al. |
| 2003/0065656 A1 * | 4/2003 | de la Torre et al. ........... 707/3 |
| 2006/0117212 A1 * | 6/2006 | Meyer et al. .................. 714/4 |
| 2007/0156842 A1 | 7/2007 | Vermeulen et al. |

OTHER PUBLICATIONS

Couloirs et al., Distributed Transactions, Distributed Systems Concepts and Design, Addison-Wesley Publishers, Third Ed., 2001, Ch. 13, pp. 515-552.
Couloirs et al., Replication, Distributed Systems Concepts and Design, Addison-Wesley Publishers, Third Ed., 2001, Ch. 14, pp. 553-606.

(Continued)

*Primary Examiner*—Viet D. Vu
(74) *Attorney, Agent, or Firm*—The Law Office of Kirk D. Williams

(57) ABSTRACT

Disclosed are mechanisms for reliably storing information across multiple computers networked together, where each of these computers may or may not be a hive node of a hive. This information includes multiple information units. At least one protection unit is generated based on the information units such that the information can be recreated using less than all of these information units and at least one protection unit. A data unit is defined as one or more information units, one or more protection units, or a combination of information and protection units, with each information unit being included in at least one of the data units and each protection unit being included in at least one of the data units. A operation is initiated to store on each of the computers at least one data unit, such that each data unit is stored in at least one of the computers.

48 Claims, 33 Drawing Sheets

EXEMPLARY HIVE COMPUTING ARCHITECTURE

OTHER PUBLICATIONS

Couloirs et al., Distributed Shared Memory, Distributed Systems Concepts and Design, Addison-Wesley Publishers, Third Ed., 2001, Ch. 16, pp. 635-667.

Appistry Enterprise Application Fabric, Product Datasheet, Sep. 2004, Appistry, Inc., St. Louis, MO.

Michael Groner and Roberto (Bob) Lozano, Appistry EAF Architecture Principles and Practice, Sep. 2004, Appistry, Inc., St. Louis, MO.

Welcome to the World of Hive Computing, Ver. 3.0, HIVE Creator, Sep. 2004, Appistry, Inc., (formerly Tsunami Research, Inc.), St. Louis, MO.

HIVE Computing FAQ, Ver. 2.5, 2003, Appistry, Inc., (formerly Tsunami Research, Inc.), St. Louis, MO.

HIVE Computing Executive Overview, Ver. 1.1, Sep. 2004, Appistry, Inc., (formerly Tsunami Research, Inc.), St. Louis, MO.

HIVE Computing Manifesto, Ver. 1.22, Sep. 2004, Appistry, Inc., (formerly Tsunami Research, Inc.), St. Louis, MO.

HIVE Computing Technical Overview, Ver. 1.1, Sep. 2004, Appistry, Inc., (formerly Tsunami Research, Inc.), St. Louis, MO.

HIVE Integration Guide, Ver. 2.01, Sep. 2004, Appistry, Inc., (formerly Tsunami Research, Inc.), St. Louis, MO.

J. Postel, "Assigned Numbers," RFC 755, May 3, 1979, 12 pages.

Bolt Beranek and Newman Laboratories, "Host Access Protocol Specification," RFC 907, Jul. 1984, 79 pages.

Veizades et al., "Service Location Protocol," RFC 2165, Jun. 1997, 72 pages.

U.S. Appl. No. 10/236,784, filed Sep. 7, 2002, Hinni et al.

* cited by examiner

EXEMPLARY HIVE
COMPUTING ARCHITECTURE

CLIENT PROCESSING

REQUEST HANDLER RESPONSE PROCESSING

SELECTED REQUEST HANDLER JOB PROCESSING

SELECTED REQUEST HANDLER ERROR RECOVERY PROCESSING

PROCESS HANDLER RESPONSE PROCESSING

SELECTED PROCESS HANDLER PROCESSING

TASK HANDLER PROCESSING

RECOVERY LAYER PROCESSING

600

```
<?xml version='1'?>
<!DOCTYPE application SYSTEM 'ApplicationDefinition.dtd'>
<application id='name' version='version number'>
  <ProcessFlows>
    <file='file name'/>
    <file='file name'/>
    <file='file name'/>
    <file='file name'/>
  </ProcessFlows>
  <tasks>
    <file='file name'/>
    <file='file name'/>
    <file='file name'/>
    <file='file name'/>
  </tasks>
  <supportfiles>
    <file='file name'/>
    <file='file name'/>
    <file='file name'/>
    <file='file name'/>
  </supportfiles>
  <cfgfile>
    <file='file name'/>
    <file='file name'/>
    <file='file name'/>
    <file='file name'/>
  </cfgfile>
</application>
```

601 → ProcessFlows
602 → tasks
603 → supportfiles
604 → cfgfile

FIGURE 6A

```
620
       <?XML VERSION='1.0'?>
       <!DOCTYPE process SYSTEM 'ProcessDefinition.dtd'>
       <process id='doProcessOne'>
           <state id='start'>
               <task id='task1' retries='1' timeout='1'/>
621            <arc task-status='complete' next-state='newProcess'/>
               <arc task-status='not-complete' next-state='bazState'/>
               <arc task-status='not-attempted' next-state='finish'/>
           </state>
           <state id='bazState' snapshot='true'>
               <task id='bazState' retries='3' timeout='1'/>
622            <arc task-status='complete' next-state='finish'/>
               <arc task-status='not-complete' next-state='errorState'/>
               <arc task-status='not-attempted' next-state='finish'/>
           </state>
           <state id='errorState'>
623            <task id='error/>
               <arc task-status='complete' next-state='finish'/>
           </state>
           <state id='newProcess' snapshot='false'>
               <sub-process='doStuff'/>
624            <arc task-status='complete' next-state='finish'/>
               <arc task-status='not-complete' next-state='errorState'/>
               <arc task-status='not-attempted' next-state='finish'/>
           </state>
           </state>
       </process>
```

FIGURE 6B

EXEMPLARY PROCESS FLOW PROCESSING

HEARTBEAT LEADER

HEARTBEAT MEMBER

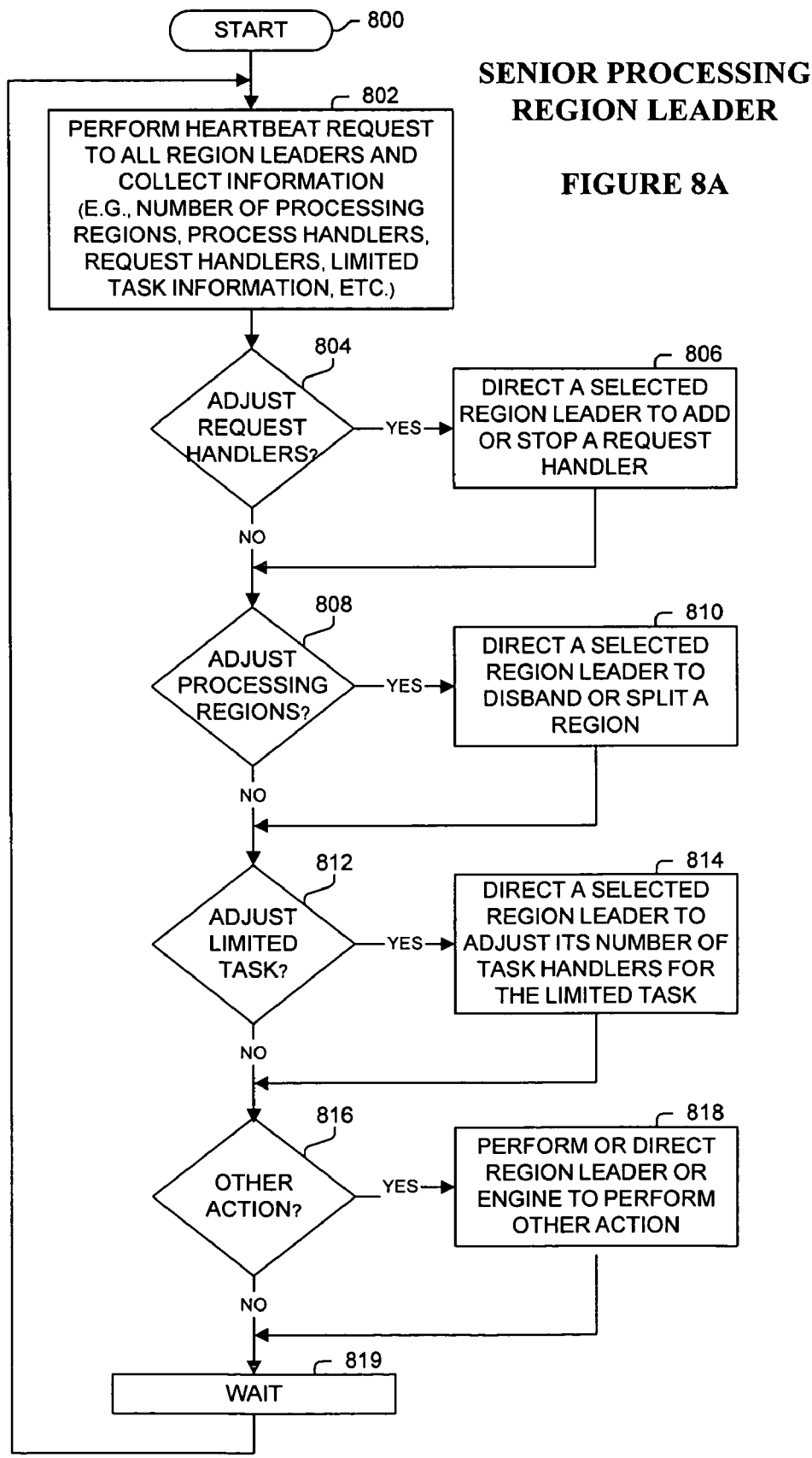

PROCESSING REGION LEADER

REGION SPLITTING

SELF-DETERMINING ADJUSTMENT OF A NODE

STARTUP PROCESS

EXEMPLARY HIVE STORAGE ARCHITECTURE

EXEMPLARY HIVE STORAGE ARCHITECTURE ILLUSTRATING MULTIPLE TERRITORIES

CREATING STORAGE SPACE

WRITING INFORMATION

READING INFORMATION

RELIABILITY GROUP HEARTBEAT MONITORING

QUORUM-BASED RECOVERY

RELIABLY STORING INFORMATION ACROSS MULTIPLE COMPUTERS SUCH AS IN A HIVE OF COMPUTERS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Award No. DMI-0339863 awarded by National Science Foundation.

FIELD OF THE INVENTION

This invention especially relates to processing of information including, but not limited to transactional processing using multiple networked computing systems; and more particularly, the invention relates to processing information using a hive of computing engines, typically including request handlers and process handlers.

BACKGROUND OF THE INVENTION

Many businesses are demanding faster, less expensive, and more reliable computing platforms. Brokerage houses, credit card processors, telecommunications firms, as well as banks are a few examples of organizations that require tremendous computing power to handle a countless number of small independent transactions. Currently, organizations that require these systems operate and maintain substantial servers. Further, the cost associated with these machines stems not only from the significant initial capital investment, but the continuing expense of a sizeable labor force dedicated to maintenance.

When it comes to mission-critical computing, businesses and other organizations face increasing pressure to do more with less. On one hand, they must manage larger transaction volumes, larger user populations, and larger data sets. They must do all of this in an environment that demands a renewed appreciation for the importance of reliability, fault tolerance, and disaster recovery. On the other hand, they must satisfy these growing requirements in a world of constrained resources. It is no longer an option to just throw large amounts of expensive hardware, and armies of expensive people, at problems. The challenge businesses face is that, when it comes to platforms for mission-critical computing, the world is fragmented. Different platforms are designed to satisfy different sets of requirements. As a result, businesses must choose between, and trade off, equally important factors.

Currently, when it comes to developing, deploying, and executing mission-critical applications, businesses and other organizations can choose between five alternative platforms. These are mainframes, high-availability computers, UNIX-based servers, distributed supercomputers, and PC's. Each of these approaches has strengths and weaknesses, advantages and disadvantages.

The first, and oldest, solution to the problem of mission-critical computing was the mainframe. Mainframes dominated the early days of computing because they delivered both availability and predictability. Mainframes deliver availability because they are located in extremely controlled physical environments and are supported by large cadres of dedicated, highly-trained people. This helps to ensure they do not fall victim to certain types of problems. However, because they are typically single-box machines, mainframes remain vulnerable to single-point failures. Mainframes deliver predictability because it is possible to monitor the execution and completion of processes and transactions and restart any that fail. However, the limitation of mainframes is that all monitoring code must be understood, written, and/or maintained by the application developer. The problem mainframes run into is that such systems fall short when it comes to three factors of high importance to businesses. First, mainframes tend not to offer high degrees of scalability. The only way to significantly increase the capability of such a system is to buy a new one. Second, because of their demanding nature, mainframes rely on armies of highly-trained support personnel and custom hardware. As a result, mainframes typically are neither affordable nor maintainable.

Developed to address the limitations and vulnerabilities of mainframes, high-availability computers are able to offer levels of availability and predictability that are equivalent to, and often superior to, mainframes. High-availability computers deliver availability because they use hardware or software-based approaches to ensure high levels of survivability. However, this availability is only relative because such systems are typically made up of a limited number of components. High-availability computers also deliver predictability because they offer transaction processing and monitoring capabilities. However, as with mainframes, that monitoring code must be understood, written, and/or maintained by the application developer. The problem with high-availability computers is that have many of the same shortcomings as mainframes. That means that they fall short when it comes to delivering scalability, affordability, and maintainability. First, they are largely designed to function as single-box systems and thus offer only limited levels of scalability. Second, because they are built using custom components, high-availability computers tend not to be either affordable or maintainable.

UNIX-based servers are scalable, available, and predictable but are expensive both to acquire and to maintain. Distributed supercomputers, while delivering significant degrees of scalability and affordability, fall short when it comes to availability. PC's are both affordable and maintainable, but do not meet the needs of businesses and other organizations when it comes to scalability, availability, and predictability. The 1990s saw the rise of the UNIX-based server as an alternative to mainframes and high-availability computers. These systems have grown in popularity because, in addition to delivering availability and predictability, they also deliver significant levels of scalability. UNIX-based servers deliver degrees of scalability because it is possible to add new machines to a cluster and receive increases in processing power. They also deliver availability because they are typically implemented as clusters and thus can survive the failure of any individual node. Finally, UNIX-based servers deliver some degree of predictability. However, developing this functionality can require significant amounts of custom development work.

One problem that UNIX-based servers run into, and the thing that has limited their adoption, is that this functionality comes at a steep price. Because they must be developed and maintained by people with highly specialized skills, they fall short when it comes to affordability and maintainability. For one thing, while it is theoretically possible to build a UNIX-based server using inexpensive machines, most are still implemented using small numbers of very expensive boxes. This makes upgrading a UNIX-based server an expensive and time-consuming process that must be performed by highly-skilled (and scarce) experts. Another limitation of UNIX-based servers is that developing applications for them typically requires a significant amount of effort. This requires application developers to be experts in both the UNIX environment and the domain at hand. Needless to say, such people can be hard to find and are typically quite expensive. Finally, setting up, expanding, and maintaining a UNIX-based server requires a significant amount of effort on the part of a person intimately familiar with the workings of the operating system. This reflects the fact that most were developed in the world of academia (where graduate students are plentiful). However, this can create significant issues for organizations that do not have such plentiful supplies of cheap, highly-skilled labor.

A recent development in the world of mission-critical computing is the distributed supercomputer (also known as a Network of Workstations or "NOW"). A distributed supercomputer is a computer that works by breaking large problems up into a set of smaller ones that can be spread across many small computers, solved independently, and then brought back together. Distributed supercomputers were created by academic and research institutions to harness the power of idle PC and other computing resources. This model was then adapted to the business world, with the goal being to make use of underused desktop computing resources. The most famous distributed supercomputing application was created by the Seti@Home project. Distributed supercomputers have grown in popularity because they offer both scalability and affordability. Distributed supercomputers deliver some degree of scalability because adding an additional resource to the pool usually yields a linear increase in processing power. However that scalability is limited by the fact that communication with each node takes place over the common organizational network and can become bogged down. Distributed supercomputers are also relatively more affordable than other alternatives because they take advantage of existing processing resources, be they servers or desktop PC's.

One problem distributed supercomputers run into is that they fall short when it comes to availability, predictability, and maintainability. Distributed supercomputers have problems delivering availability and predictability because they are typically designed to take advantage of non-dedicated resources. The problem is that it is impossible to deliver availability and predictability when someone else has primary control of the resource and your application is simply completing its work when it gets the chance. This makes distributed supercomputers appropriate for some forms of off-peak processing but not for time-sensitive or mission-critical computing. Finally, setting up, expanding, and maintaining a distributed supercomputer also requires a significant amount of effort because they tend to offer more of a set of concepts than a set of tools. As a result, they require significant amounts of custom coding. Again, this reflects the fact that most were developed in the world of academia where highly trained labor is both cheap and plentiful.

PC's are another option for creating mission-critical applications. PC's have two clear advantages relative to other solutions. First, PC's are highly affordable. The relentless progress of Moore's law means that increasingly powerful PC's can be acquired for lower and lower prices. The other advantage of PC's is that prices have fallen to such a degree that many people have begun to regard PC's as disposable. Given how fast the technology is progressing, in many cases it makes more sense to replace a PC than to repair it. Of course, the problem with PC's is that they do not satisfy the needs of businesses and other organizations when it comes to scalability, availability, and predictability. First, because PC's were designed to operate as stand-alone machines, they are not inherently scalable. Instead, the only way to allow them to scale is to link them together into clusters. That can be a very time-consuming process. Second, PC's, because they were designed for use by individuals, were not designed to deliver high levels of availability. As a result, the only way to make a single PC highly available is through the use of expensive, custom components. Finally, PC's were not designed to handle transaction processing and thus do not have any provisions for delivering predictability. The only way to deliver this functionality is to implement it using the operating system or an application server. The result is that few organizations even consider using PC's for mission-critical computing.

In a dynamic environment, it is important to be able to find available services. Service Location Protocol, RFC 2165, June 1997, provides one such mechanism. The Service Location Protocol provides a scalable framework for the discovery and selection of network services. Using this protocol, computers using the Internet no longer need so much static configuration of network services for network based applications. This is especially important as computers become more portable, and users less tolerant or able to fulfill the demands of network system administration. The basic operation in Service Location is that a client attempts to discover the location of a Service. In smaller installations, each service will be configured to respond individually to each client. In larger installations, services will register their services with one or more Directory Agents, and clients will contact the Directory Agent to fulfill requests for Service Location information. Clients may discover the whereabouts of a Directory Agent by preconfiguration, DHCP, or by issuing queries to the Directory Agent Discovery multicast address.

The following describes the operations a User Agent would employ to find services on the site's network. The User Agent needs no configuration to begin network interaction. The User Agent can acquire information to construct predicates which describe the services that match the user's needs. The User Agent may build on the information received in earlier network requests to find the Service Agents advertising service information.

A User Agent will operate two ways. First, if the User Agent has already obtained the location of a Directory Agent, the User Agent will unicast a request to it in order to resolve a particular request. The Directory Agent will unicast a reply to the User Agent. The User Agent will retry a request to a Directory Agent until it gets a reply, so if the Directory Agent cannot service the request (say it has no information) it must return an response with zero values, possibly with an error code set.

Second, if the User Agent does not have knowledge of a Directory Agent or if there are no Directory Agents available on the site network, a second mode of discovery may be used. The User Agent multicasts a request to the service-specific multicast address, to which the service it wishes to locate will respond. All the Service Agents which are listening to this multicast address will respond, provided they can satisfy the User Agent's request. A similar mechanism is used for Directory Agent discovery. Service Agents which have no information for the User Agent MUST NOT respond.

While the multicast/convergence model may be important for discovering services (such as Directory Agents) it is the exception rather than the rule. Once a User Agent knows of the location of a Directory Agent, it will use a unicast request/response transaction. The Service Agent SHOULD listen for multicast requests on the service-specific multicast address, and MUST register with an available Directory Agent. This Directory Agent will resolve requests from User Agents which are unicasted using TCP or UDP. This means that a Directory Agent must first be discovered, using DHCP, the DA Discovery Multicast address, the multicast mechanism described above, or manual configuration. If the service is to become unavailable, it should be deregistered with the Directory Agent. The Directory Agent responds with an acknowledgment to either a registration or deregistration. Service Registrations include a lifetime, and will eventually expire. Service Registrations need to be refreshed by the Service Agent before their Lifetime runs out. If need be, Service Agents can advertise signed URLs to prove that they are authorized to provide the service.

New mechanisms for computing are desired, especially those which may provide a reliable computing framework and platform, including, but not limited to those which might produce improved levels of performance and reliability at a much lower cost than that of other solutions.

In addition to performing computations or transactions, many applications require reliable storage of information for some period of time beyond that required for the processing of the computation or transaction. Examples of such applications and/or there data are email, search engines, news feeds, databases, inventory, transaction records, databases, file systems, images. The storage requirements of these applications might be small to very large, be static or dynamic in size. Prior practical data storage use the Reed-Solomon code for protecting stored information; however, the computation overhead of using the Reed-Solomon code, however, is large. Thus, practical storage systems seldom use a general (n, k) Maximum Distance Separable code, except for full replication or mirroring (which is an (n,1)), striping without redundancy (corresponding to (n, n)) or single parity (which is (n, n−1)). The advantages of using (n, k) are hence very limited if not totally lost.

SUMMARY OF THE INVENTION

Disclosed are, inter alia, methods, apparatus, data structures, computer-readable media, and mechanisms, for reliability storing information across multiple systems, such as, but not limited to computers or hive nodes. These systems are networked together and this information includes multiple information units. In one embodiment, at least one protection unit is generated based on the information units such that the information can be recreated using less than all of these information units and at least one protection unit. A data unit is defined as one or more information units, one or more protection units, or a combination of information and protection units, with each information unit being included in at least one of the data units and each protection unit being included in at least one of the data units. A operation is initiated to store on each of the systems at least one data unit, such that each data unit is stored in at least one of the systems.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 6A illustrates a definition of an application used in one embodiment;

FIG. 6B illustrates a definition of an process flow used in one embodiment;

FIG. 8A is a flow diagram of a senior processing region leader process used in one embodiment;

DETAILED DESCRIPTION

Figure 1A:
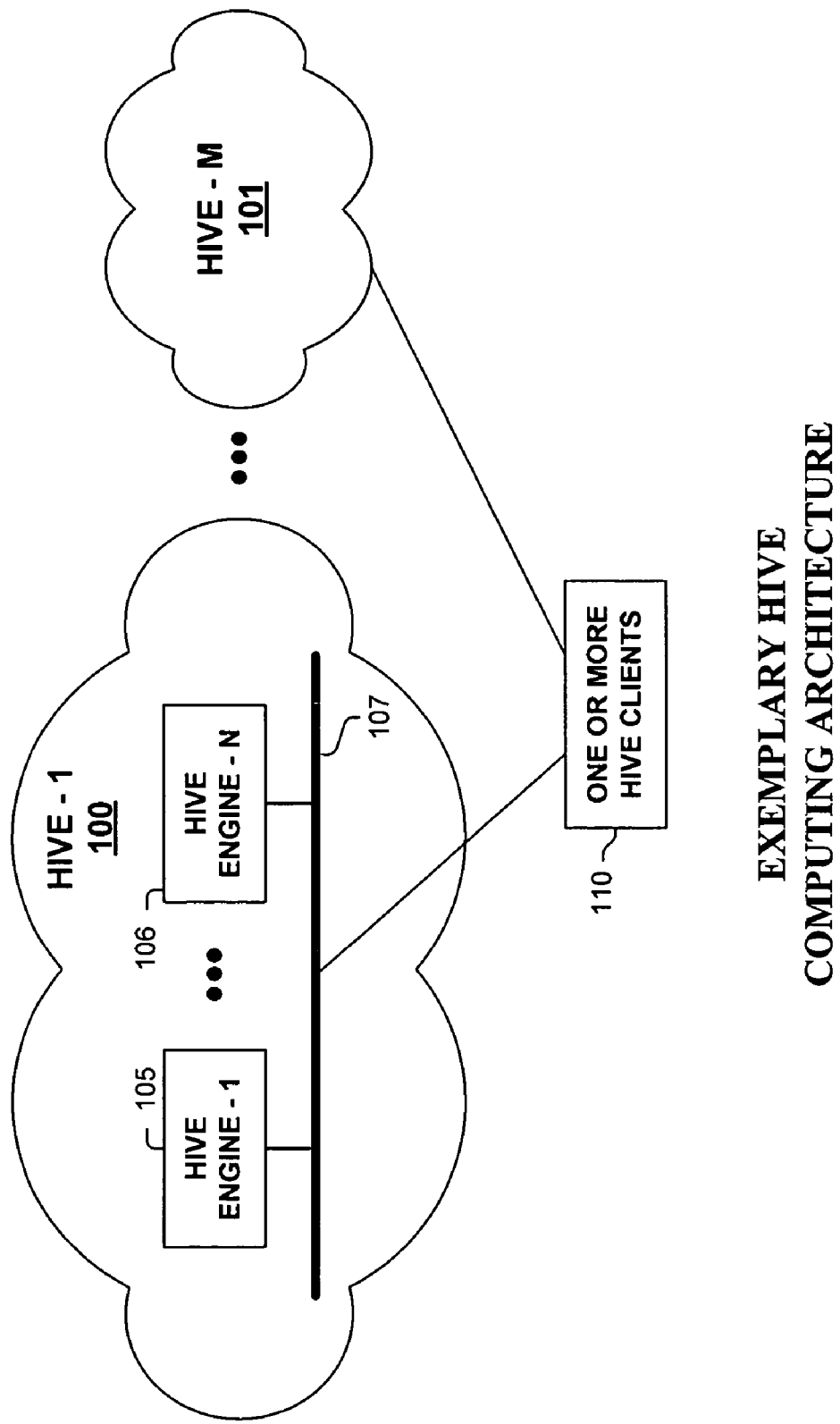
FIG. 1A illustrates an architecture of hives used in one embodiment.

Disclosed are, inter alia, methods, apparatus, data structures, computer-readable media, and mechanisms, for reliability computing and/or storing information across multiple systems, such as, but not limited to computers or hive nodes. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Numerous means for processing information using a hive of computing/hive engines are disclosed. One implementation includes a request region including multiple request handlers and multiple processing regions, each typically including multiple process handlers. Each request handler is configured to respond to a client service request of a processing job, and if identified to handle the processing job: to query one or more of the processing regions to identify and assign a particular process handler to service the processing job, and to receive a processing result from the particular process handler. As typically used herein, a result corresponds to the outcome of a successfully or unsuccessfully completed job, task or other operation or an error condition, and typically includes one or more indications of a final value or outcome and/or state information (e.g., indications of to the processing performed or not performed, partial or final results, error descriptors, etc.) Each of the process handlers is configured to respond to such a query, and if identified as the particular process handler: to service the processing job, to process the processing job, to update said identified request handler with state information pertaining to partial processing of said processing job, and to communicate the processing result to the identified request handler.

In one embodiment, a volunteer pattern allows a software application (e.g., client process, request handler, process handler, task handler, tasks, or another hive engine process, etc.) to automatically detect a group of software applications on the same network, and to select and communicate with the most appropriate application without any prior knowledge to the location and capabilities of the chosen software application. In one embodiment, messages are sent among processes typically using multicast UDP, unicast UDP, and standard TCP connections.

In one embodiment, the volunteer pattern includes the following steps. First, hive engines that wish to volunteer its capabilities begin by listening for volunteer requests on a known multicast address. Next, a client looking for a request handler to handle its request transmits its needs by issuing a volunteer or service request packet. The service request packet is a small text buffer which includes the type of service it is requesting and any potential parameters of that request. The service request packet also includes the return IP address of the client for hive engines to use to communicate their volunteer responses. The volunteer packet is communicated via multicast to the known multicast group corresponding to the request region. Request handlers of multiple hive engines on the client's network will detect this request. Third, hive engines that receive the service request packet examine its contents. If the hive engine is capable of servicing this request, it responds by sending a response (e.g., a UDP packet) to the client which made the request. The UDP packet typically contains the TCP address of the hive engine's communication port. Unicast UDP packets are used so that only the client that initiated the service request will receive the volunteer responses from the request handlers. Fourth, the client receives unicast UDP packets from the hive engines, selects one, and connects to the hive engine via TCP socket. The client and hive engine will typically use this socket for all subsequent communications during the processing of this application.

In one embodiment, regionalization is used to allow participating hive engines on the same network to detect each other and organize into logical groups of processing regions without any prior configuration to minimize bandwidth usage and CPU consumption in the entire system. Regionalization provides an automated mechanism that allows these processing regions grow and split as needed, which may provide for an unlimited growth of a hive. Thus, volunteer requests (e.g., processing requests, task requests, etc.) can be within a processing region without affecting all hive engines sending these requests or other communications using a multicast address assigned to a specific processing region. This places a bound on the number of responses to be generated (e.g., by the number of hive engines in a processing region.)

Typically, hive engines participate in an automated self-organization mechanisms, which allows participating hive engines on the same local or wide area network to detect each other and organize into logical groups without any prior configuration. However, an embodiment may use any mechanism for defining a regionalization, or even one embodiment does not use regionalization. For example, in one embodiment, a hive engine is pre-configured with parameters to define which region or regions in which to participate; while in one embodiment, users or a centralized control system is used to specify to one or more hive engines which region or regions in which to participate.

A hive typically has multiple processing regions and a single request region; although, one embodiment includes multiple request regions and one or more processing regions. One way to view a processing region is that it is a set of processes on one or more hive engines for executing processing jobs. In one embodiment, a processing region has a leader that keeps track of the number of hive engines in the region. If the number of hive engines in the region reaches the user defined maximum, the region leader instructs the hive engines in the region to divide into two separate smaller regions. If the number of hive engines in the regions reaches the user defined minimum, the region leader instructs the hive engines in the region to join other regions in the hive.

In one embodiment, the processing regions are self-healing in that if the region leader shuts down for any reason all the region members detect the lack of a region leader. A region member promotes itself to region leader. If a processing region has multiple region leaders, the youngest region leaders demotes themselves back to region members, leaving one region leader.

A request region typically hides that the hive consists of multiple regions and directs the processing load across all the regions. From one perspective, spreading the request region across multiple hive engines provides an increased level of fault tolerance, as these services detect the loss of a connection and rebuild or shutdown as necessary. The hive recovers most failure cases, however, when a request is in an indeterminate state, the request is typically terminated to prevent multiple executions.

In one embodiment, a single senior region leader forms the request region, while in one embodiment another process performs this functionality. The senior region leader discovers the region leaders via the volunteer pattern. The senior region leader discovers the size of the request region by asking the region leaders for the number of hive engines in their region that are also members of the request region. If the request region has too many or too few members, the senior region leader directs the region leaders to re-allocate the hive engines to or from the request region. The request region is typically self-healing in that if the senior region leader shuts down for any reason all the region leaders detect the lack of a senior region leader. A region leader promotes itself to senior region leader. If the new senior region leader is not the most senior region leader, the senior region leader demotes itself and the most senior region leader promotes itself to senior region leader. If more than one senior region leader exists, the senior region leaders that are less senior or junior to another senior region leader demotes itself.

In one embodiment, a client processing job is specified in terms of a process flow, typically specifying a set of tasks as well state variables typically before and after each task for storing state information. The hive process flow contains the information on the sequence of sub-routines to be called, timeout and retry information if the sub-routines fail, and which sub-routine to call next based on the sub-routine's result. Once specified, it is up to the hive software to execute the sub-routines in the process flow. A process flow may described in any manner or format. For example, in one embodiment, a process flow is described in a XML process definition file. The process flow definition file defines the process flow name, the task to be performed, the task's recovery procedure including the timeout limit and retry limit, and the transition from one state to the next state based on the previous task's result.

In order to maintain high-availability and fault tolerance, a client processing job is typically performed using a self-organized, non-administered, network of services across several hive engines that work together to guarantee execution of a request even in the event that any of the individual services or hive engines fail. For example, in one embodiment, a processing job is received by a request handler from a client using the volunteer pattern. The request engine selects a process handler based on pattern. The process handler proceeds to perform the processing job, and at intermediate steps within the process flow, the process handler communicates state information to the request engine, such that the state and progress of the processing job at discrete steps is known by multiple processes, typically on different physical hive engines, and possibly in different territories (which may be defined to be in physically different locations, or using different communications and/or electrical systems, etc.) Thus, should a failure occur, the processing job typically can be resumed by another process handler newly selected by the request handler, or possibly completed by the original process handler with it storing results and/or communicating the results to the client via a different path (e.g., using a different request handler, etc.)

In one embodiment, processing a request typically includes the request setup, request processing, and request teardown. In the request setup, the client submits a request for a volunteer to the request region. A request handler receives the request, opens a TCP connection, and sends a response to the client. The client sends the request over the TCP connection to the request handler. The request handler receives the request and submits a request for a volunteer. A process handler receives the request, opens a TCP connection, and sends a response to the request handler. The request handler receives the response and sends the request over the TCP connection to the process handler. The process handler receives the request and sends an acknowledgement message. The request handler receives the acknowledgement message then sends an acknowledgement message to the client. The client receives the acknowledgement message then sends a process command to the request handler. The request handler receives the process command sends the process command to the process handler. The process handler receives the process command and begins processing the request. If the client loses connection with the request handler during this procedure, the client should perform a retry.

In one embodiment, in the request process procedure, the process handler submits a volunteer request to a processing region. A task handler receives the volunteer request, opens a TCP connection, and sends a response. The process handler receives the volunteer response and sends the first task in the process flow to the task handler over the TCP connection. The task handler processes the task and sends the results to the process handler. If the task does not complete within the specified amount of time and retries are set to zero, the request handler returns an error code as the final result to the request handler. If the task does not complete within the specified amount of time and retries are greater than zero, the request handler resubmits the task to another task handler. If snapshot is enabled on this task or if retries is set to zero, the process handler sends the result to the request handler. This repeats until the next state is finish. When the next state is finish, the process handler sends the final result to the request handler. If the client loses connection with the request handler during this procedure, the client should perform a recover.

In one embodiment, in the request teardown procedure, the request handler sends the final result to the client. The client receives the result and sends an acknowledgement to the request handler. The request handler receives the acknowledgement and sends an acknowledgement to the process handler. If the client loses connection with the request handler during this procedure, the client should perform a recover.

In one embodiment, the task service runs on each worker machine. Task services have an IP address and assigned TCP port on their worker machine. All task services in the Hive share common UDP multicast groups based on their worker machine's current region. On completion of the volunteer pattern for a simple task, the connected TCP socket will be passed off to the task handler. When responding to a volunteer pattern for a daemon task, this service will UDP the daemon task's IP and port to the requester. The service has both task handlers and daemon tasks. Upon receiving a task to execute from a process handler, the service will spin off a task handler or delegate the task to a daemon task, as appropriate. Upon completion of the task, the task handler or daemon task will return the results to the process handler.

One embodiment uses an intra-process recovery which enables the hive to recover from a connection loss between the client and the request handler while the request handler is overseeing the processing of a request. When the client loses the connection with a first request handler, once the request processing has completed the request setup phase, the first request handler continues processing the request and the client submits a request for a new request handler (second request handler). The client issues the recover command and second request handler listens queries the recover service for a user-defined amount of time. If second request handler does not receive the result within the specified amount of time, second request handler returns an error. When first request handler receives the final result, first request handler writes the final result to the recover service.

One embodiment operates slightly differently as multiple process handlers are used for each step in a process flow. For example, both process handlers typically maintain the current state of the request such that if either of the process handlers is lost, the other picks up in its place. If the request handler is lost, the client and/or process handlers can establish a new request handler. The request handler manages the interface between software requesting processing from the hive and the hive. A primary process handler is a service that walks a request through the steps and recovery defined in a process flow. A secondary process handler is a service that monitors the primary process handler. If something happens to the primary process handler, the secondary process handler continues going through the steps and recovery defined in a process flow. A task handler is a service that performs the sub-routine defined in the process flow.

For example, in one embodiment, first, a request handler finds two process handlers. The request handler designates one as the primary process handler and the other as the secondary process handler. Next, the request handler sends the primary process handler the secondary process handler's IP address and sends the secondary process handler the primary process handler's IP address. The primary process handler and secondary process handler open a TCP port for communication then send acknowledgement messages to the request handler. The primary process handler finds a task handler. The task handler opens a TCP port and sends the request to the primary process handler. The primary process handler prepares the initial process flow state and sends that state to the secondary process handler. The secondary process handler and the request handler monitor the task states over the TCP connection. The task handler processes the request, sends the result to the primary process handler.

One embodiment provides an assimilation mechanism which recognizes new hive engines trying to join a hive. These steps occur without stopping execution of the entire hive, and he hive updates its hive engines in a measured rate to ensure that portions of the hive are continually processing requests ensuring constant availability of the hive applications.

In one embodiment, when a new hive engine joins the hive, the new hive engine finds the operating system image and the base hive software via DHCP. The new hive engine self installs the OS image and hive software using automated scripts defined by client. If a hive engine has an old version of the OS, the region leader makes the hive engine unavailable for processing. The hive engine is erased and rebooted. The hive engine then joins the hive as a new hive engine and re-installs the OS and hive software accordingly.

In addition, in one embodiment, when a hive engine joins the hive, the hive engine sends a request to the region leader. The hive engine receives a response from the region leader and selects a region to join. The region leader queries the hive engine for information about services, software, and versions. If the region leader is running a newer version of the hive system, the region leader makes the hive engine unavailable for processing. The region leader updates the hive engine by transmitting the current version of the hive system. The hive engine installs the update and commences processing. If the hive engine is running a newer version of hive system than the region leader, the region leader makes itself unavailable for process, receives the newer version of the hive system from the hive engine, installs the software, and continues processing. Once the region leader is updated, the region leader begins updating its region's members and the other region leaders. For example, in one embodiment, a hive engine then receives a response from the region leaders and selects a region to join. The region leader queries the hive engine for information about services, software, and versions. If the region leader is running the most current version of the hive applications, the region leader automatically updates the hive engine's hive applications. If the hive engine is running the most current version of the hive applications, the region leader automatically updates its hive applications. Once the region leader is updated, the region leader begins updating its region's members and the other region leaders.

Disclosed are, inter alia, methods, apparatus, data structures, computer-readable media, and mechanisms, for reliability storing information across multiple networked systems, such as, but not limited to, computers or hive nodes. The information to be stored and retrieved includes multiple information units. At least one protection unit is generated based on the information units such that the information can be recreated using less than all of these information units and at least one protection unit. A data unit is defined as one or more information units, one or more protection units, or a combination of information and protection units, with each information unit being included in at least one of the data units and each protection unit being included in at least one of the data units. A operation is initiated to store on each of the systems at least one data unit, such that each data unit is stored in at least one of the systems.

In one embodiment, this information includes a computer file, and each of the information units include an approximate same sized portion of the computer file. In one embodiment, this information includes multiple computer files, with each of the information units including a different one of the computer files.

One embodiment retrieves less than all of the data units including at least one protection unit from the systems, and recreates the information from these retrieved data units. In one embodiment, the generation of the at least one protection unit includes using an (n, k) threshold scheme, wherein the multiple data units consists of n data units; and wherein a minimum of k data units are required to recreate the information. In one embodiment, n is three and k is two, and each of the k data units consists of one of the information units or one of the at least one protection unit. In one embodiment, n is four and k is two, and each of the k data units consists of one of the information units and one of the at least one protection unit. In one embodiment, at least one protection unit is generated using an (n, k) threshold scheme, wherein the data units consists of n data units; and wherein the retrieved less than all data units consists of more than k data units.

In one embodiment, at least one protection unit is generated using an (n, k) threshold scheme, wherein the data units consists of n data units; and wherein a minimum of k data units are required to recreate the information; and the multiple systems are selected based on their respective locations such that k computers are located on each of at least two physically different subnetworks. One embodiment retrieves k data units from the systems, wherein the retrieved k data units include at least one of the at least one protection unit; and the information is recreated from the retrieved less than all of the data units.

In one embodiment, at least one protection unit is generated using an (n, k) threshold scheme, wherein multiple data units consists of n data units; and wherein a minimum of k data units are required to recreate the information; and wherein the systems are selected based on their respective locations such that k computers are located on each of at least two different hive territories. In one embodiment, k data units are retrieved from the systems, wherein the retrieved k data units include at least one protection unit; and the information is recreated from these retrieved less than all of the data units.

One embodiment includes at least three systems. One embodiment includes at least four systems. In one embodiment, these systems include a first and second system, wherein the first system updates then information, and then subsequently, the second system updates the information, where updating the information includes the generating operation and the operation to initiate storage. In one embodiment, the generating and initiating storage operations are performed by a particular system; and wherein the particular system receives an instruction to store the information from a different device, wherein the instruction includes the information and an identifier for use in storing the information.

In one embodiment, the generation of at least one protection unit includes using an (n, k) threshold scheme, wherein the data units consists of n data units, a minimum of k data units are required to recreate the information, the generating and initiating storage operations are performed by a particular system; and the particular system receives an instruction to store the information from a different device, with the instruction including the information and a value of k to use in the generating operation. In one embodiment, the instruction also defines the value of n.

One embodiment is used with a hive distributed storage system for storing information among hive nodes in a reliability group of a hive. Each of the hive nodes include a storage mechanism, and the information includes multiple information units. At least one protection unit is generated based on the multiple information units such that the information can be recreated using less than all of the information units and at least one of the protection unit(s). A data unit of a plurality is defined as one or more information units, one or more protection units, or a combination of one or more information units and one or more protection units. Each of the information units are included in at least one of the data units and each of the at least one protection unit are included in at least one of the data units. At least one data unit is stored on each of the hive nodes such that each data unit is stored in at least one of the hive nodes.

In one embodiment, this information includes a computer file, and each of the information units include an approximate same sized portion of the computer file. In one embodiment, this information includes multiple computer files, with each of the information units including a different one of the computer files.

In one embodiment, each of the hive nodes of the reliability group include a mechanism for replacing a failed hive node in the reliability group. In one embodiment, one of the hive nodes recognizes that a failed hive node has failed; and in response, the hive node initiates replacement of the failed hive node in the reliability group with a replacement hive node. The replacement of the failed hive node includes recreating and storing on the replacement hive node the at least one data unit stored on the failed hive node. In one embodiment, the replacement of the failed hive node includes sending a multicast hive volunteer request message and receiving one or more responses, and selecting the replacement hive node from the one or more responses. One embodiment includes a first particular hive node and a second particular hive node of the hive nodes each recognizing that the failed hive node has failed, and in response, the first particular hive node identifies that it should replace the failed node and the second particular hive node identifies that it not should replace said failed node. The first particular hive node initiates the replacement of the failed hive node in the reliability group with a replacement hive node; wherein the replacement of said failed hive node includes recreating and storing on the replacement hive node said at least one data unit stored on said failed hive node. In one embodiment, the identification by the first particular hive node that it should replace said failed node includes the first particular hive node identifying that it is in communication with a quorum of the plurality of nodes. In one embodiment, the identification by the second particular hive node that it should not replace said failed node includes the second particular hive node identifying that it is not in communication with a quorum of the plurality of nodes.

One embodiment creates the reliability group, which includes requesting hive volunteers and receiving responses, and selecting the plurality of hive nodes from said responses. In one embodiment, the responses include responses from hive nodes other than hive nodes that will be included in the reliability group. In one embodiment, requesting hive volunteers includes sending a multicast hive volunteer request message. one embodiment includes intelligently selecting the hive nodes to be included in the reliability group in order to diversify the hive node composition of the reliability group in comparison with the composition of one or more other reliability groups (e.g., so that if a hive node down, the number of reliability groups that need to be recreated is lessened, and that burden will not be on the same other hive nodes of a reliability group). In one embodiment, a data structure identifying membership information of other reliability groups when intelligently selecting the hive nodes.

One embodiment retrieves less than all of the data units including at least one protection unit from the hive nodes, and recreates the information from these retrieved data units. In one embodiment, the generation of the at least one protection unit includes using an (n, k) threshold scheme, wherein the multiple data units consists of n data units; and wherein a minimum of k data units are required to recreate the information. In one embodiment, exactly k data units are retrieved and the information is recreated from these retrieved k data units.

In one embodiment, a meta file defining the information and an identifier for use in storing the information is received by the hive node which will generate the at least one protection units. In one embodiment, the generating operation is performed by a particular hive node of the reliability group, and the particular hive node receives an instruction to store the information from a remote device, with the instruction including the information and an identifier for use in storing the information. In one embodiment, the generation of at least one protection unit includes using an (n, k) threshold scheme, the data units consists of n data units with a minimum of k data units being required to recreate the information, and the generating operation is performed by a particular hive node. The particular hive nodes receives an instruction to store the information, with the instruction including the information and a value of k to use in the generating operation. In one embodiment, the instruction also defines the value of n.

In one embodiment: a requesting hive node multicasts a request to identify one of the hive nodes in the reliability group, the requesting hive node receives a response to the request from a particular hive node of the hive nodes in the reliability group, the requesting hive node requests the information from the particular hive node, and the particular hive node sends the information to the requesting hive node. In one embodiment, the particular hive node requests the data units from other hive nodes of the reliability group, and in response, the particular hive node receives at least k information units and recreates the information using at least k information units of the received at least k information units.

One embodiment reliably stores information across different groups of computers, with each of these groups including multiple computers networked together, with each of these computers including a storage mechanism. In one embodiment, first information is reliability stored across a first group of the different groups of computers. In one embodiment, second information is reliability stored across a second group of the different groups of computers. The first group of computers includes at least one computer different that the second groups of computers. In one embodiment, reliably storing the respective information (with the respective information including multiple information units), includes: generating at least one protection unit based on the information units such that the respective information can be recreated using less than all of the information units and at least one of the at least one protection unit. A data unit is defined as one or more information units, one or more protection units, or a combination thereof. Each of the information units are included in at least one of the data units and each of the at least one protection unit are included in at least one of the data units. In one embodiment, and initiating storage on each of the computers of at least one data unit such that each data unit is stored in at least one of the computers of the respective group of computers.

In one embodiment, the first and second groups of computers each consist of a different number of computers. In one embodiment, the generation of at least one protection unit includes using an (n, k) threshold scheme, wherein the data units consists of n data units, with a minimum of k data units being required to recreate the information. In one embodiment, k used for storing the first information across the first group of computers is different than k used for storing the second information across the second group of computers.

In one embodiment, each of the computers of the first and second groups of computers is a hive node.

One embodiment stores information units among hive nodes in a reliability group of a hive, with each of these hive nodes including a storage mechanism and the information including an information unit. One protection unit is generated based on the information unit such that the information can be recreated from the information unit or the protection unit, with a data unit being defined as the information unit or the protection unit. The information unit is included in one of data units and the protection unit is included in one of data units. At least one data unit is stored on each of the hive nodes such that each data unit is stored in at least one of the hive nodes.

In one embodiment, each of said hive nodes of the reliability group includes a mechanism for replacing a failed hive node of said hive nodes of the reliability group. In one embodiment, one of said hive nodes recognizes that the failed hive node has failed, and in response, the hive node initiates replacement of said failed hive node in the reliability group with a replacement hive node; wherein the replacement of said failed hive node includes recreating and storing on the replacement hive node at least one data unit stored on the failed hive node. One embodiment includes a first particular hive node and a second particular hive node of the hive nodes each recognizing that the failed hive node has failed, and in response, the first particular hive node identifies that it should replace the failed node and the second particular hive node identifies that it not should replace said failed node. The first particular hive node initiates the replacement of the failed hive node in the reliability group with a replacement hive node; wherein the replacement of said failed hive node includes recreating and storing on the replacement hive node said at least one data unit stored on said failed hive node. In one embodiment, the identification by the first particular hive node that it should replace said failed node includes the first particular hive node identifying that it is in communication with a quorum of the plurality of nodes. In one embodiment, the identification by the second particular hive node that it should not replace said failed node includes the second particular hive node identifying that it is not in communication with a quorum of the plurality of nodes. One embodiment includes creating the reliability group, which includes requesting hive volunteers and receiving responses, and selecting the plurality of hive nodes from said responses. One embodiment includes receiving a meta file defining the information and an identifier for said information. One embodiment includes a requesting hive node multicasting a request to identify one of said hive nodes in the reliability group; the requesting hive node receiving a response to the request from a particular hive node of said hive nodes in the reliability group; the requesting hive node requesting said information from the particular hive node; and the particular hive node sending the information to the requesting hive node.

Turning to the figures, FIG. 1A illustrates an architecture of hives used in one embodiment. Shown are multiple hives 100-101. A hive 100-101 is a logical grouping of one or more hive engines (e.g., computers or other computing devices) networked together to perform processing resources to one or more hive clients 110. For example, hive 100 includes multiple hive engines 105-106 connected over a network (or any communication mechanism) 107.

In one embodiment, a hive is a decentralized network of commodity hardware working cooperatively to provide vast computing power. A hive typically provides high-availability, high-scalability, low-maintenance, and predictable-time computations to applications (e.g., those corresponding to processing jobs of clients) executed in the hive. Each hive engine in the hive is typically capable to individually deploy and execute hive applications. When placed on the same network, hive engines seek each other out to pool resources and to add availability and scalability.

Figure 1B:
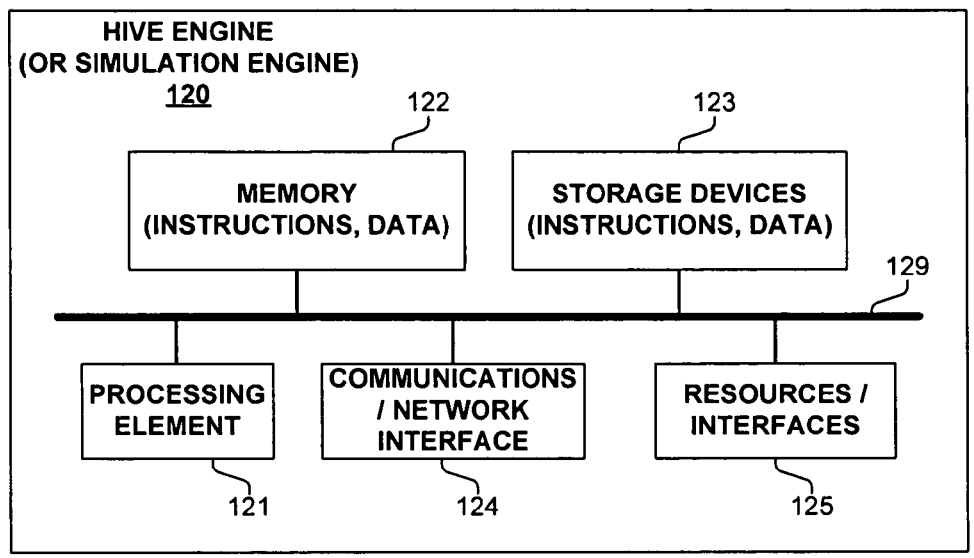
FIG. 1B illustrates a computing platform used for a hive engine for implementing request handlers, process handlers, and/or other processes of a hive of one embodiment, or also used for simulating the operation of a hive in one embodiment.

FIG. 1B illustrates a computing platform used for a hive engine for implementing request handlers, process handlers, and/or other processes of a hive as used in one embodiment (or also used for simulating the operation of one or more elements of a hive in one embodiment). As shown, hive engine 120 is configured to execute request handlers, process handler, and other hive processes, and to communicate with clients and other hive engines as discussed herein.

In one embodiment, hive engine 120 includes a processing element 121, memory 122, storage devices 123, communications/network interface 124, and possibly resources/interfaces (i.e., to communicate to other resources) which may be required for a particular hive application (e.g., specialized hardware, databases, I/O devices, or any other device, etc.) Elements 121-125 are typically coupled via one or more communications mechanisms 129 (shown as a bus for illustrative purposes). Various embodiments of hive engine 120 may include more or less elements. The operation of hive engine 120 is typically controlled by processing element 121 using memory 122 and storage devices 123 to perform one or more hive processes, hive tasks, or other hive operations according to the invention. Memory 122 is one type of computer-readable medium, and typically comprises random access memory (RAM), read only memory (ROM), flash memory, integrated circuits, and/or other memory components. Memory 122 typically stores computer-executable instructions to be executed by processing element 121 and/or data which is manipulated by processing element 121 for implementing functionality in accordance with the invention. Storage devices 123 are another type of computer-readable medium, and typically comprise solid state storage media, disk drives, diskettes, networked services, tape drives, and other storage devices. Storage devices 123 typically store computer-executable instructions to be executed by processing element 121 and/or data which is manipulated by processing element 121 for implementing functionality in accordance with the invention.

In one embodiment, hive engine 120 is used as a simulation engine 120 to simulate one or more hive engines, and/or one or more hive processes, tasks, or other hive functions, such as, but not limited to those disclosed herein, especially the operations, methods, steps and communication of messages illustrated by the block and flow diagrams and messages sequence charts. Hive simulator engine 120 typically is used to simulate the performance and availability of hive application fabrics. The simulator allows dynamic simulation of any environment using simple text directives or a graphical user interface. For example, hive simulator engine 120 can be used to determine the hive performance using particular computing hardware by specifying such things as the computer type, instantiation parameters, and connection fabric, which is used by hive simulator engine 120 to produce a representation of the performance of a corresponding hive. In one embodiment, multiple hive simulator engines 120 are used, such as a unique three-level, two-dimensional mode connection fabric that allows hive simulator engines 120 to transmit requests uni-directionally or bi-directionally and to access other hive simulator engines 120 for subset processing while processing a request. Thus, one or more hive simulator engines 120 allow for modeling at the software level, hardware level, or both levels. Additionally, a hive simulator engine 120 is typically able to transmit requests through a simulated network or real hive network, such as hive 100 (FIG. 1A).

Figure 2A:
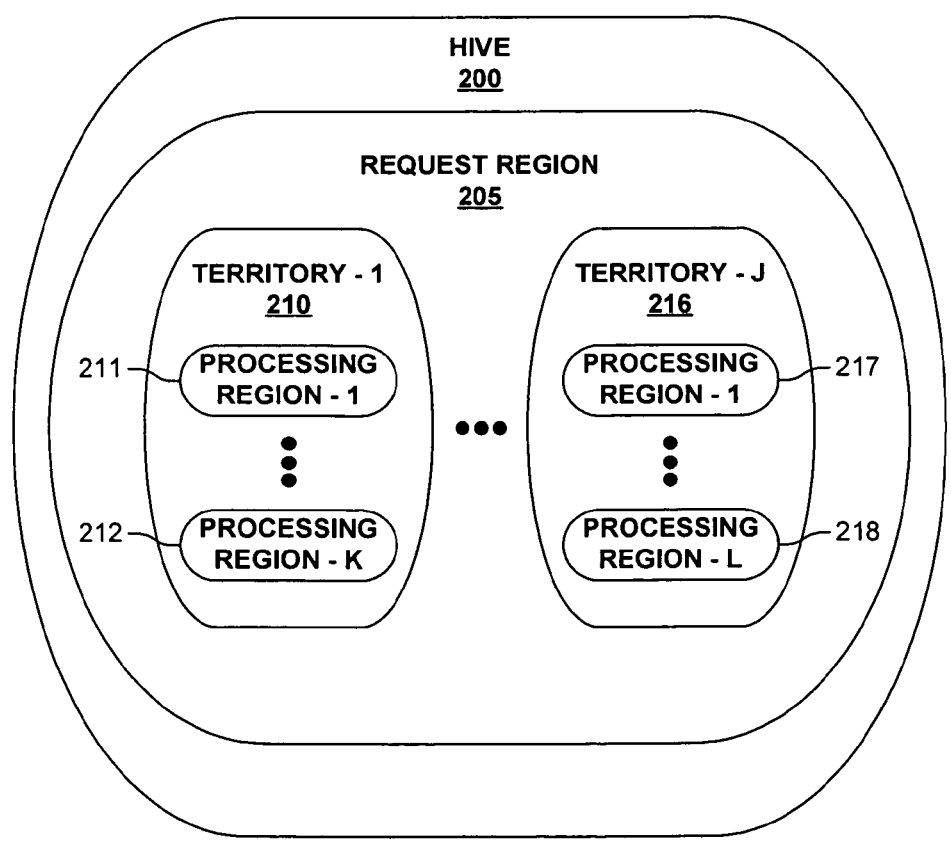
FIG. 2A illustrates a hierarchy of a hive, request regions, territories, and processing regions as used in one embodiment.

FIG. 2A illustrates a hierarchy of a hive, request regions, territories, and processing regions as used in one embodiment. As shown, hive 200 is logically divided into one or more request regions 205 (although most hives use only one request regions), territories 210 and 216, with multiple processing regions 211-212 and 217-218.

The use of territories 210 and 216 provides a mechanism for associating a physical location or quality of a corresponding hive engine which can be used, for example, in determining which responding request or process handlers to select via a volunteer pattern. When defined based on physical location, if performance is the major issue, then it is typically advantageous (but not required) to process all requests within the same territory. If reliability is the major issue, then it is typically advantageous (but not required) store state recover information in another territory.

Figure 2B:
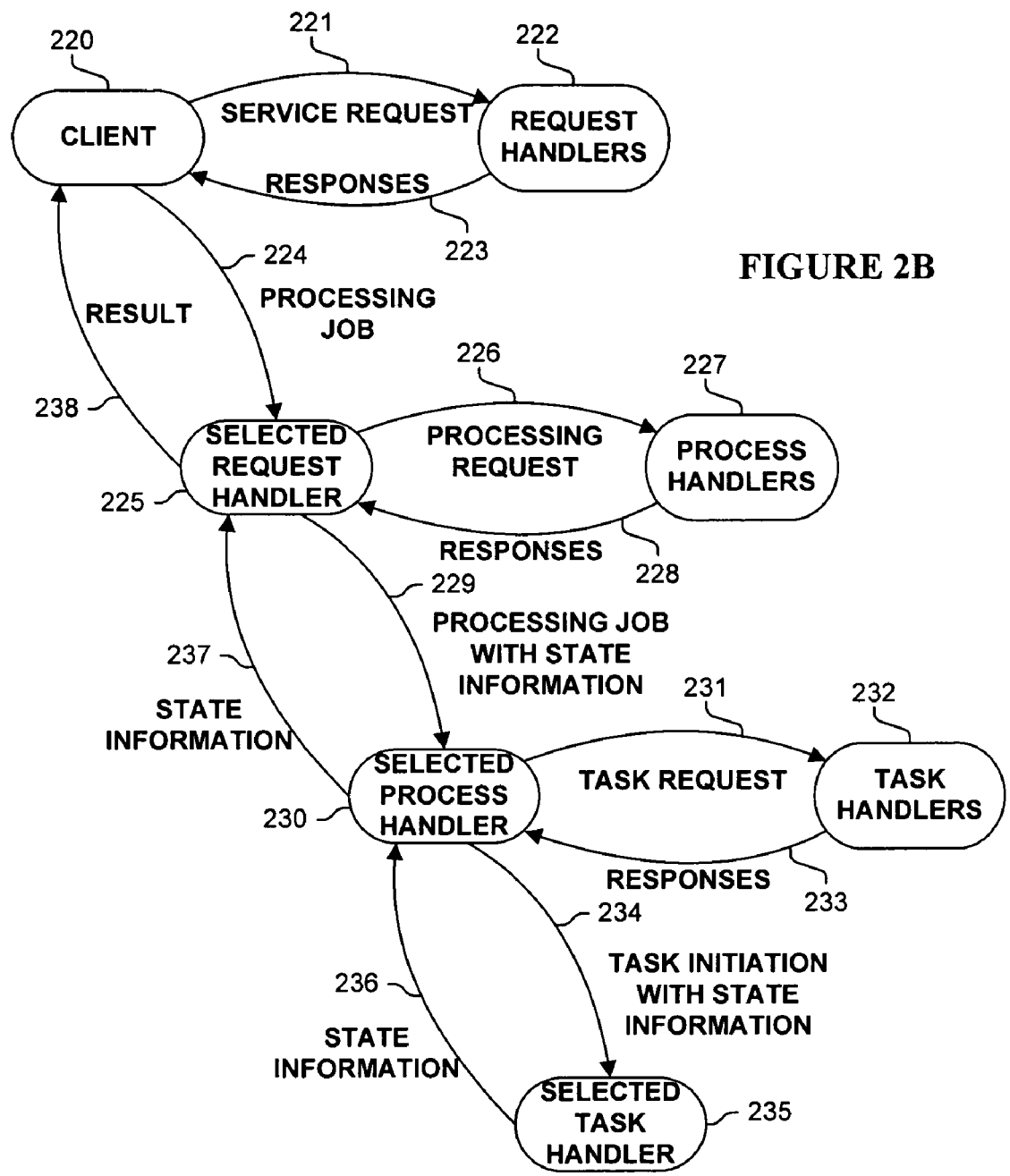
FIG. 2B illustrates an interaction of a client, request handlers, and process handlers of one embodiment.

FIG. 2B illustrates an interaction of a client, request handlers, and process handlers of one embodiment. Client 220 generates a service request 221 to request handlers 222, such as via a request region multicast message, one or more messages, a broadcast message, or other communication mechanisms. Those request handlers 222 that are available to process the request return responses 223 to client 220, typically via a unicast message directly to client 220 which includes a communications port to use should the sending request handler be selected by client 220. Client 220 selects, optionally based on territory considerations, typically one (but possibly more) of the responding request handlers, and communicates processing job 224 to the selected request handler 225.

In response, selected request handler 225 generates a processing request 226 to process handlers 227, such a via one or more processing region multicast messages or other communication mechanisms. Those process handlers 227 that are available to process the request return responses 228 to selected request handler 225, typically via a unicast message directly to selected request handler 225 which includes a communications port to use should the sending request handler be selected by selected request handler 225. Selected request handler 225 selects, optionally based on territory considerations, typically one (but possibly more) of the responding process handlers, and communicates processing job with state information 229 to the selected process handler 230. Inclusion of the state information is emphasized in regards to processing job with state information 229 because the processing job might be ran from the beginning or initialization state, or from an intermittent position or state, such as might happen in response to an error or timeout condition.

In response, selected process handler 230 proceeds to execute the process flow (or any other specified application), and at defined points in the process flow, updates selected request handler 225 with updated/progressive state information 237. Typically based on the process flow, selected process handler 230 will sequentially (although one embodiment allows for multiple tasks or sub-processes to be executed in parallel) cause the tasks or processing requests to be performed within the same hive engine or by other hive engines.

In one embodiment, selected process handler 230 selects a hive engine to perform a particular task using a volunteer pattern. For example, selected process handler 230 sends a multicast task request 231 to task handlers typically within the processing region (although one embodiment, sends task requests 231 to hive engines in one or more processing and/or request regions). Those task handlers 232 able to perform the corresponding task send a response message 233 to selected process handler 230, which selects, possibly based on territory, hive engine (e.g., itself as less overhead is incurred to perform the task within the same hive engine) or other considerations, one of the responding task handlers 232. Selected process handler 230 then initiates the task and communicates state information via message 234 to the selected task handler 235, which performs the task and returns state information 236 to selected process handler 230. If there are more tasks to perform, selected process handler 230 typically then repeats this process such that tasks within a process flow or application may or may not be performed by different hive engines. Upon completion of the application/process flow, selected process handler 230 forwards the final state information (e.g., the result) 237 to selected request handler 225, which in turn, forwards the result and/or other information 238 to client 220.

In one embodiment, selected process handler 230 performs tasks itself or causes tasks to be performed within the hive engine in which it resides (and thus selected task handler 235 is within this hive engine, and one embodiment does not send task request message 231 or it is sent internally within the hive engine.) In one embodiment, selected task handler 235 is a separate process or thread running in the same hive engine as selected process handler 230. Upon completion of the application/process flow, selected process handler 230 forwards the final state information (e.g., the result) 237 to selected request handler 225, which in turn, forwards the result and/or other information 238 to client 220.

Figure 2C:
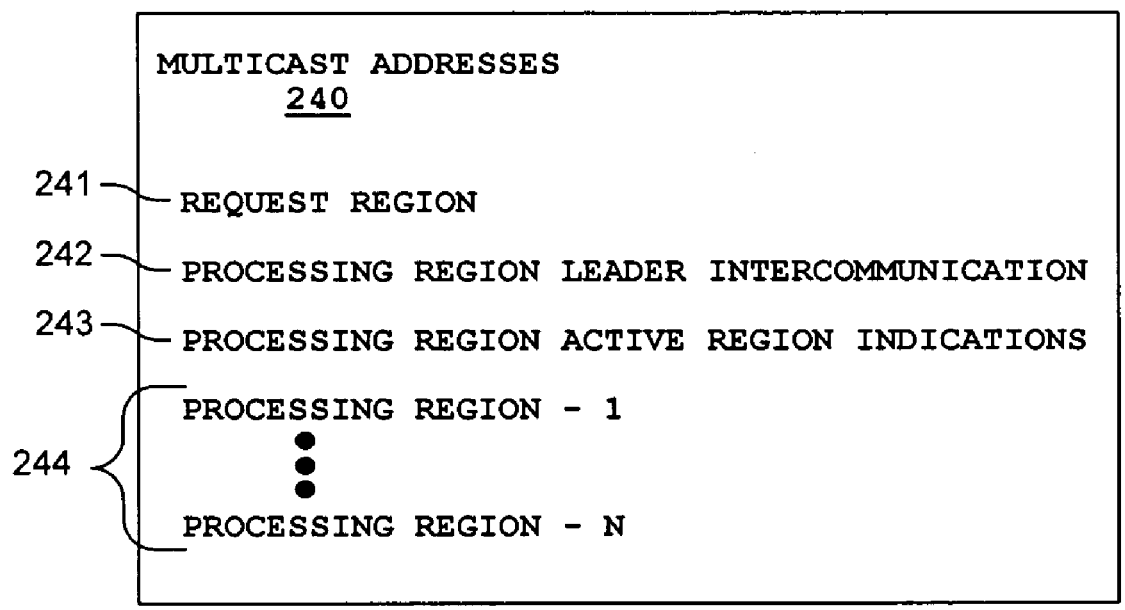
FIG. 2C illustrates multicast addresses used in one embodiment.

FIG. 2C illustrates multicast addresses 240 used in one embodiment. As shown, multicasts addresses 240 includes: a multicast request region address 241 using which a client typically sends a service request message, a processing region leader intercommunication multicast address 242 used for processing region leaders to communicate among themselves, a processing region active region indications multicast address 243 which is typically used to periodically send-out messages by region leaders to indicate which processing regions are currently active, and multiple processing region multicasts addresses 244, one typically for each processing region of the hive. Of course, different sets or configurations of multicast addresses or even different communications mechanisms may be used in one embodiment within the scope and spirit of the invention.

Figure 2D:
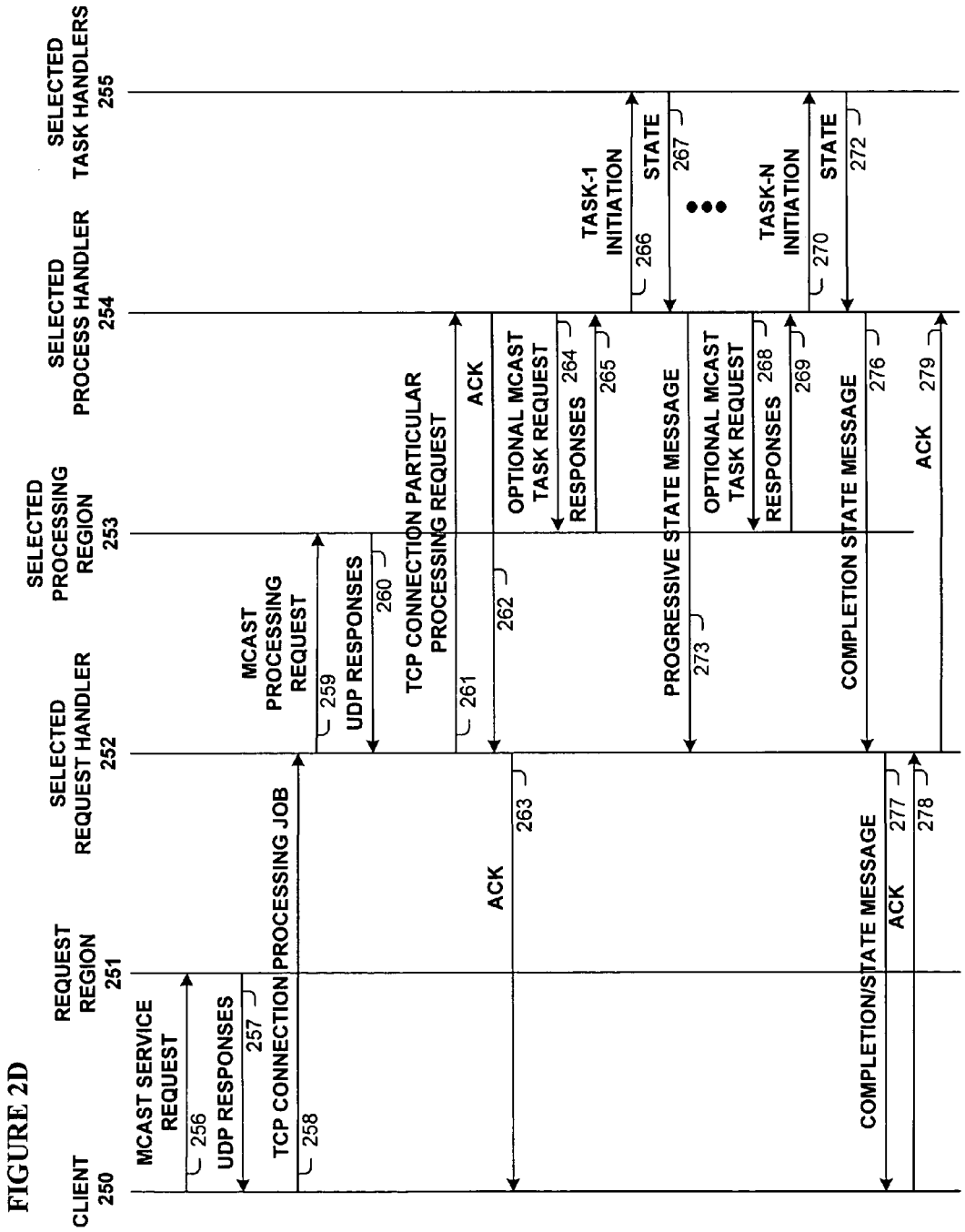
FIG. 2D illustrates the flow of messages between components of one embodiment.

FIG. 2D illustrates the flow of messages among components of one embodiment. Client 250 sends a multicast hive service request message 256 into the request region 251 of the hive. Request handlers available for performing the application corresponding to request 256 respond with UDP messages 257 to client 250, which selects selected request handler 252, one of the responding request handlers. In one embodiment, this selection is performed based on territory or other considerations, or even on a random basis. Client 250 then communicates the processing job in a message 258 over a TCP connection to the selected request handler 252.

In response and using a similar volunteer pattern, selected request handler 252 multicasts a processing request message 259 to a selected processing region 253, and receives UDP response messages 260 from available processing engines to service the request (e.g., perform the processing job). Selected request handler 252 selects selected process handler 254, one of the responding request handlers. In one embodiment, this selection is performed based on territory or other considerations, or even on a random basis. Selected request handler 252 then forwards the processing job with state information in message 261 to selected process handler 254, which returns an acknowledgement message 262. In response, selected request handler 252 sends an acknowledgement message 263 to client 250 (e.g., so that it knows that the processing is about to be performed.)

Selected process handler 254 then causes the processing job to be executed, typically by performing tasks within the same hive engine if possible for optimization reasons, or by sending out one or more tasks (possibly using a volunteer pattern) to other hive engines. Thus, selected process handler 254 optionally sends a multicast task request message 264 typically within it own processing region (i.e., selected processing region 253) (and/or optionally to one or more other processing or request regions), and receives responses 265 indicating available task handlers for processing the corresponding task. Task request message 264 typically includes an indication of the type or name of the task or task processing to be performed so that task handlers/hive engines can use this information to determine whether they can perform the task, and if not, they typically do not send a response message 265 (as it is less overhead than sending a response message indicating the corresponding task handler/hive engine cannot perform the task.) Note, in one embodiment, a task handler within the same hive engine as selected process handler 254 sends a response message 265.

Whether a task handler to perform the first task is explicitly or implicitly determined, selected process handler initiates a first task 266, which is performed by one of one or more individual task threads 255 (which may be the same or different task threads on the same or different hive engines), which upon completion (whether naturally or because of an error or timeout condition), returns state information 272 to selected process handler 254, which in turn updates selected request handler 252 via progressive state message 273. (Note, if there was only one task, then completion/state message 276 would have been sent in response to completion of the task.) This may continue for multiple tasks as indicated by optional MCAST task request and response messages 268-269 and task-n initiation 270 and state messages 272. When processing of the application/process flow is completed as determined by selected process handler 254 in response to state messages from the individual task threads 255, selected process handler 254 forwards a completion and result state information 276 to selected process handler 252, which forwards a result message 277 to client 250. In response, client 250 sends an acknowledgement message 278 to confirm receipt of the result (indicating error recovery operations do not need to be performed), and an acknowledgement message 279 is forwarded to selected process handler 254, and processing of the processing job is complete.

Figure 2E:
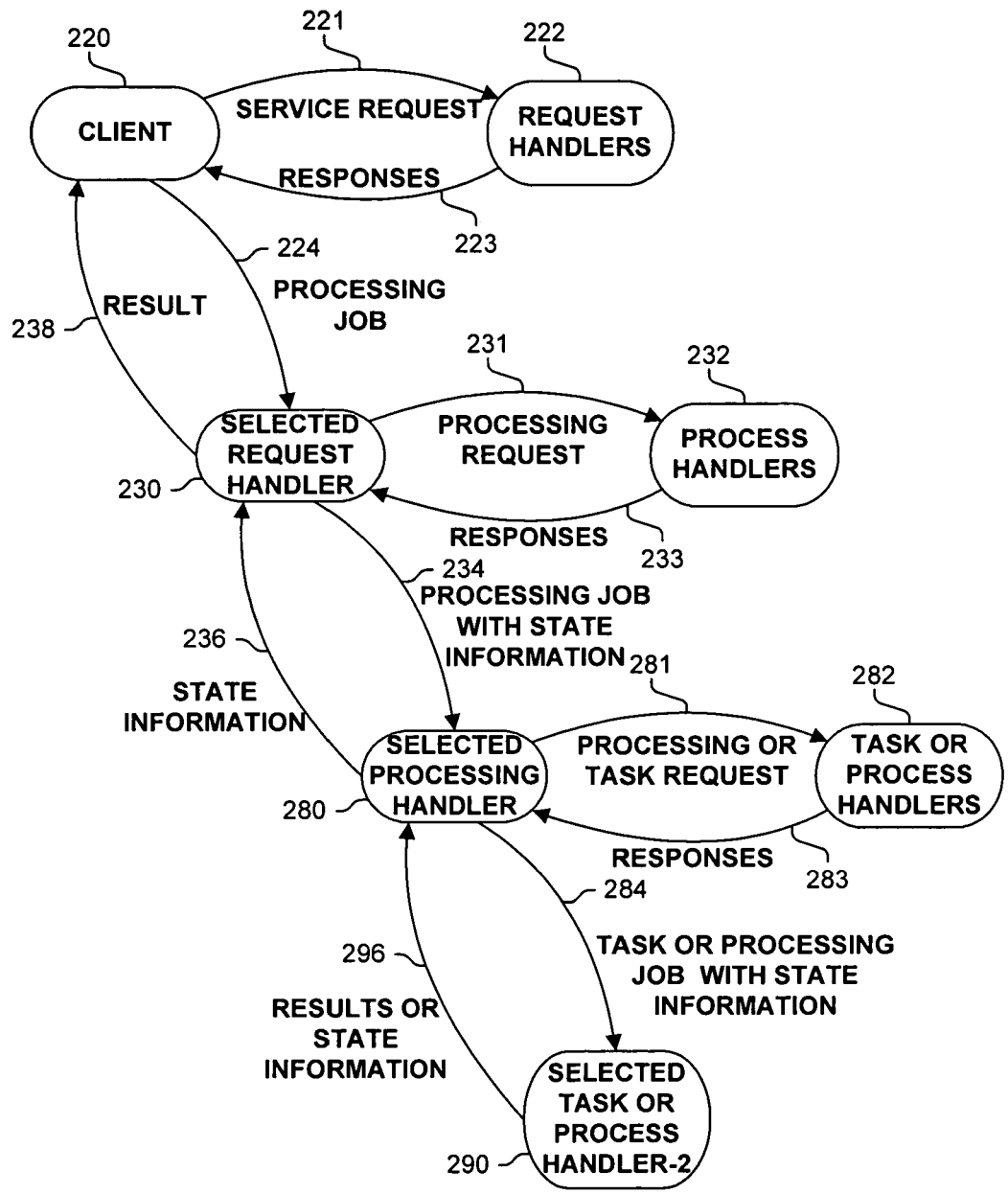
FIG. 2E illustrates an interaction of a client, request handlers, process handlers and possibly tasks of one embodiment.

FIG. 2E illustrates an interaction of a client, request handlers, process handlers and possibly tasks of one embodiment. Many of the processes and much of the flow of information is the same as illustrated in FIG. 2B and described herein, and thus will not be repeated. FIG. 2E is used to emphasize and explicitly illustrate that different embodiments may implement features differently, and to emphasize that a process flow may specify tasks or even other process flows to be performed or the same process flow to be performed recursively.

For example, as shown, selected process handler 230 of FIG. 2B is replaced with selected process handler 280 in FIG. 2E. Selected process handler 280, in response to being assigned to execute the clients processing job by receiving processing job with state information message 229, proceeds to execute the corresponding application/process flow, which may optionally include performing a volunteer pattern using processing or task request messages 281 and response messages 283 to/from one or more task or process handlers 282. In response to the volunteer operation or directly in response to receiving the processing job with state information message 229, selected process handler 280 will sequentially (although one embodiment allows for multiple tasks or sub-processes to be executed in parallel) perform itself or send out tasks or processing requests to corresponding selected task or process handlers 290, in which case task or processing job with state information messages 284 are typically sent and results or state information messages 296 are typically received. The number of levels used in performing a processing job is unbounded as indicated in FIG. 2E.

Figure 3:
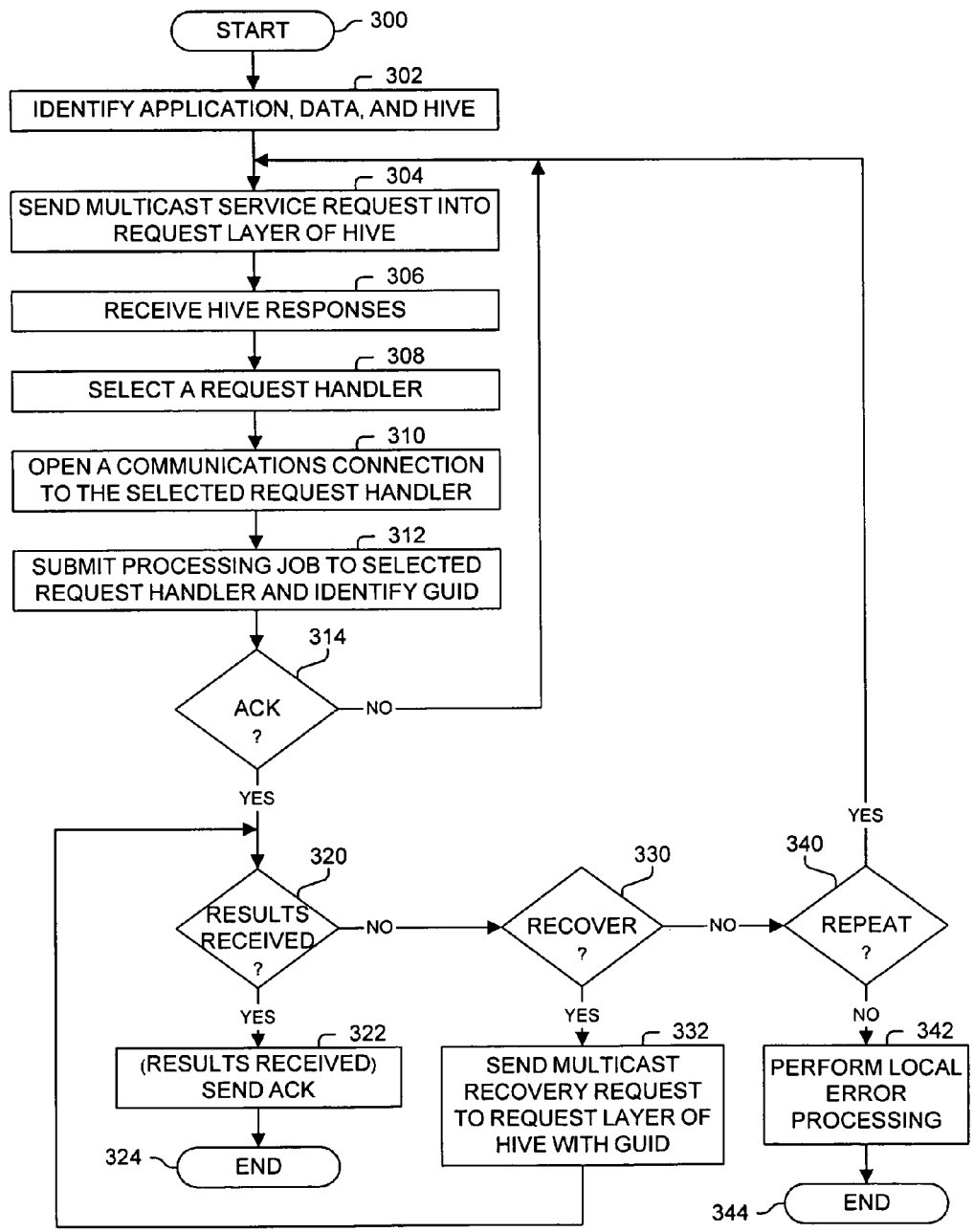
FIG. 3 is a flow diagram of a client process used in one embodiment.

FIG. 3 is a flow diagram of a client process used in one embodiment. Processing begins with process block 300, and proceeds to process block 302, wherein an application, data, and hive to process these is identified. Next, in process block 304, a multicast service request message indicating application is sent into the request layer of the selected hive. In process block 306, responses are received from the hive (if no responses are received, processing returns to process block 302 or 304 in one embodiment). Next, in process block 308, a request handler is selected based on the responses, and a communications connection is established to the selected request handler in process block 310. Next, in process block 312, the processing job is submitted to the selected request handler and a global unique identifier (GUID) is included so that the client and hive can uniquely identify the particular processing job. As determined in process block 314, if an acknowledgement message is not received from the hive indicating the job is being processed within a timeframe, then processing returns to process block 304.

Otherwise, if results are received from the hive within the requisite timeframe as determined in process block 320, then an acknowledgement message is returned to the hive in process block 322, and processing is complete as indicated by process block 324. Otherwise, as determined in process block 330, if the client determines it wishes to perform a recover operation, then in process block 332, a multicast recovery request message specifying the GUID is sent to the request layer of the hive, and processing returns to process block 320 to await the recovery results. Otherwise, as determined in process block 340, if the client determines to again request the job be performed, then processing returns to process block 304. Otherwise, local error processing is optionally performed in process block 342, and processing is complete as indicated by process block 344.

Figure 4A:
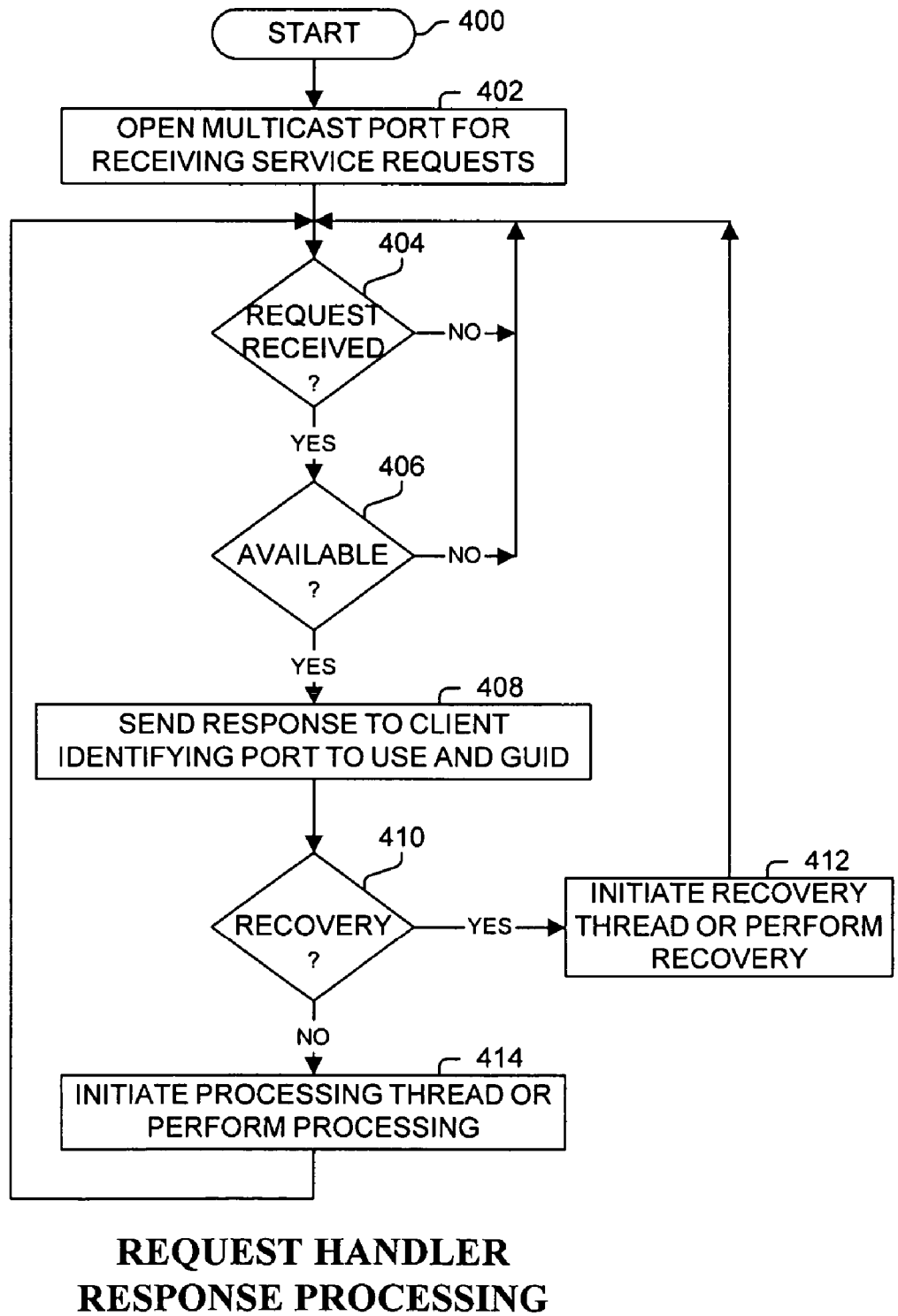
FIGS. 4A-C are flow diagrams of request hander processes used in one embodiment.
Figure 4B:
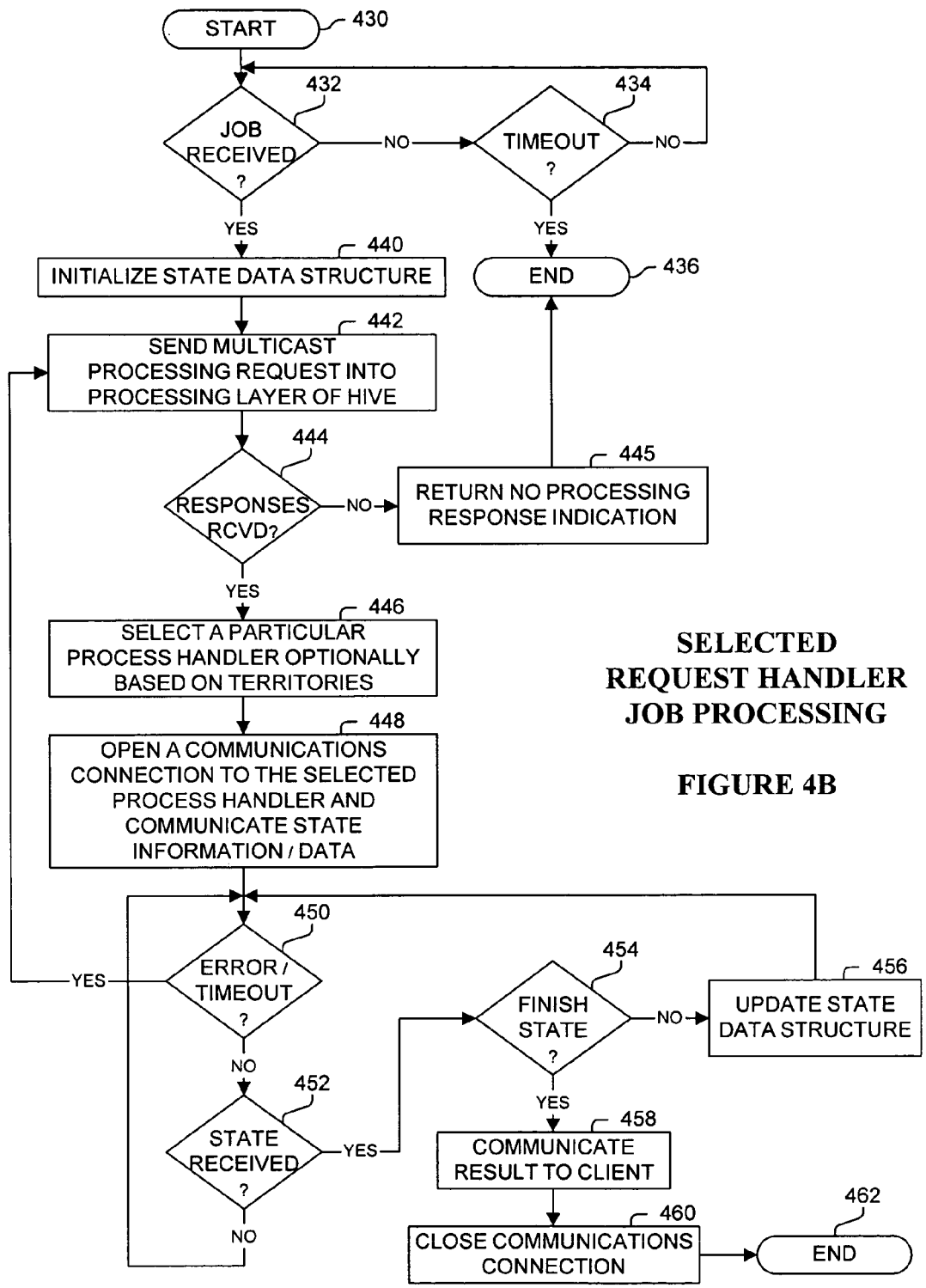
Figure 4C:
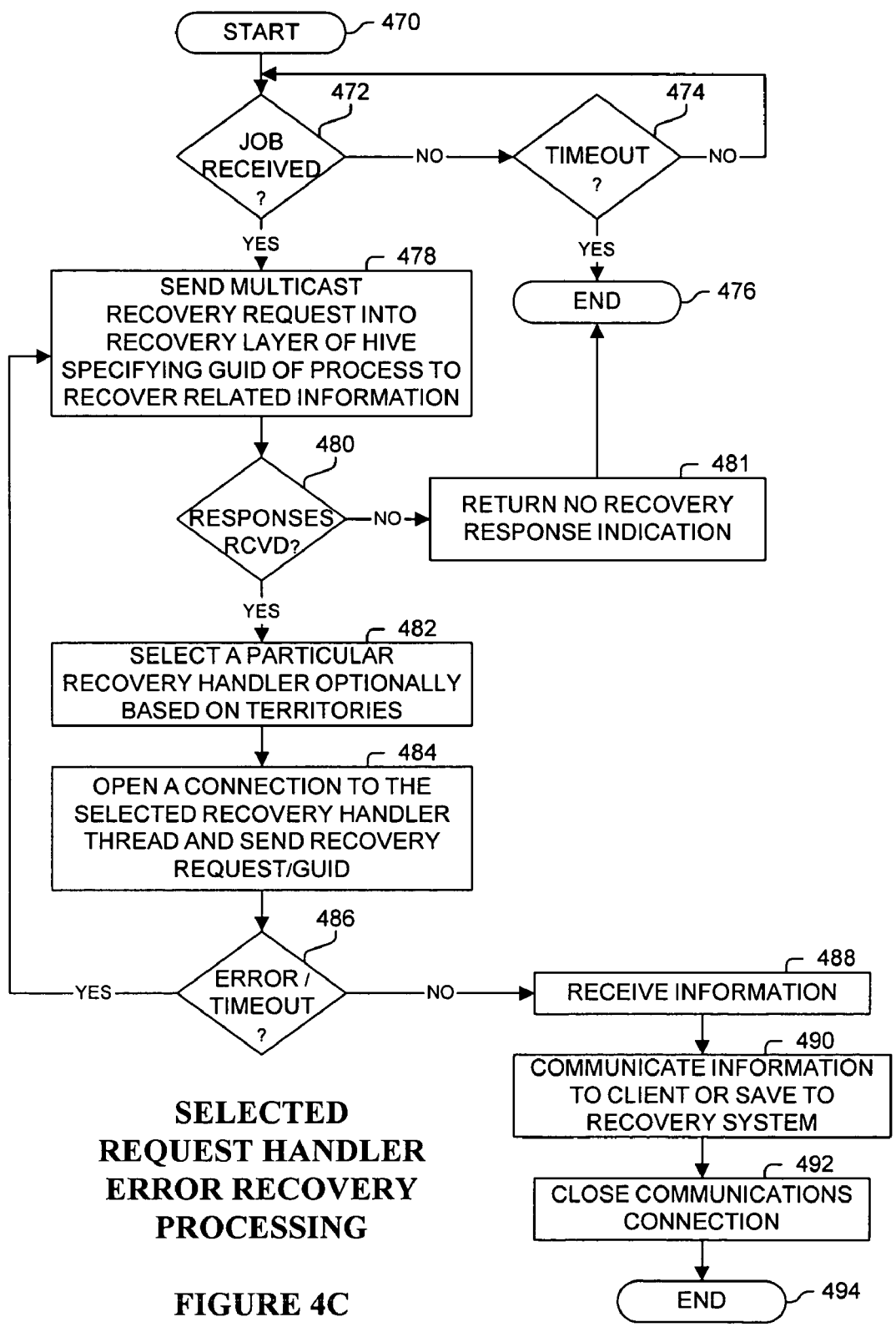

FIGS. 4A-C are flow diagrams of request hander processes used in one embodiment. FIG. 4A illustrates a process used in one embodiment for responding to service requests of clients. Processing begins with process block 400, and proceeds to process block 402, wherein a multicast port is opened for receiving service request messages. As determined in process blocks 404 and 406, until a service request is received and the request handler is available to handle the request, processing returns to process block 404. Otherwise, the request handler responds in process block 408 by sending a response message to the requesting client, with the response message typically identifying a port to use and the GUID of the received service request. As determined in process block 410, if the service request corresponds to a recovery request, then in process block 412, a recovery thread is initialized (such as that corresponding to the flow diagram of FIG. 4C) or the recovery operation is directly performed. Otherwise, in process block 414, a selected request handler thread is initialized (such as that corresponding to the flow diagram of FIG. 4B) or the request is handled directly. Processing returns to process block 404 to respond to more requests.

FIG. 4B illustrates a flow diagram of a process used by a selected request handler in one embodiment. Processing begins with process block 430, and loops between process blocks 432 and 434 until a job is received (and then processing proceeds to process block 440) or until a timeout condition is detected and in which case, processing is complete as indicated by process block 436.

After a processing job has been received (e.g., this process has been selected by the client to handle the request), a state data structure is initialized in process block 440. Then, in process block 442, a multicast processing request message is sent into one of the processing layers of the hive. As determined in process block 444, if no responses are received within a requisite timeframe, then a no processing handler response message is returned to the client in process block 445, and processing is complete as indicated by process block 436.

Otherwise, in process block 446, a particular process handler is selected. In one embodiment, this selection is performed based on territories (e.g., a process handler in a different territory than the selected request handler), other considerations or even on a random basis. In process block 448, a communications connection is established if necessary to the selected process handler, and the state information and data for the client processing request is sent (which may correspond to the initial state of the data received from the client or to an intermediate state of processing the client job request).

As determined in process block 450, if an error or timeout condition is detected, processing returns to process block 442. Otherwise, as determined in process block 452, until a state update message is received, processing returns to process block 450. As determined in process block 454, if the received state is not the finished or completed state, then in process block 456, the state data structure is updated, and processing returns to process block 450. Otherwise, processing has been completed, and in process block 458, the result is communicated to the client; in process block 460, the communications connection is closed; and processing is complete as indicated by process block 462.

FIG. 4C illustrates a flow diagram of a process used by a selected request handler performing error recovery in one embodiment. Processing begins with process block 470, and loops between process blocks 472 and 474 until a job is received (and then processing proceeds to process block 478) or until a timeout condition is detected and in which case, processing is complete as indicated by process block 476.

After a processing job has been received (e.g., this process has been selected by the client to perform the recover processing), in process block 478, a multicast recovery request message specifying the GUID of the job being recovered is sent into one or more of the recovery modules of the hive. As determined in process block 480, if no responses are received within a requisite timeframe, then a no recover response message is returned to the client in process block 481, and processing is complete as indicated by process block 476.

Otherwise, in process block 482, a particular recovery handler is selected, possibly based on territory considerations—such as a recovery handler in a different territory then this selected request handler. In process block 484, a communications connection is established if necessary to the selected recovery handler thread, and a recovery request is sent, typically including the GUID or other indication of the job to be recovered.

As determined in process block 486, if an error or timeout condition is detected, processing returns to process block 478. Otherwise, the recovered information is received as indicated by process block 488. In process block 490, the information is typically communicated to the client, or if this communication fails, it is saved to the recovery system. In one embodiment, the partially completed state, errors and/or other indications are stored to a local storage mechanism (e.g., some computer-readable medium) to be made available for use by a recovery process. In one embodiment, more significant process handling is performed, or the error communicating the error to another process, thread or hive engine for handling. The communications connection is then closed in process block 492, and processing is complete as indicated by process block 494.

Figure 5A:
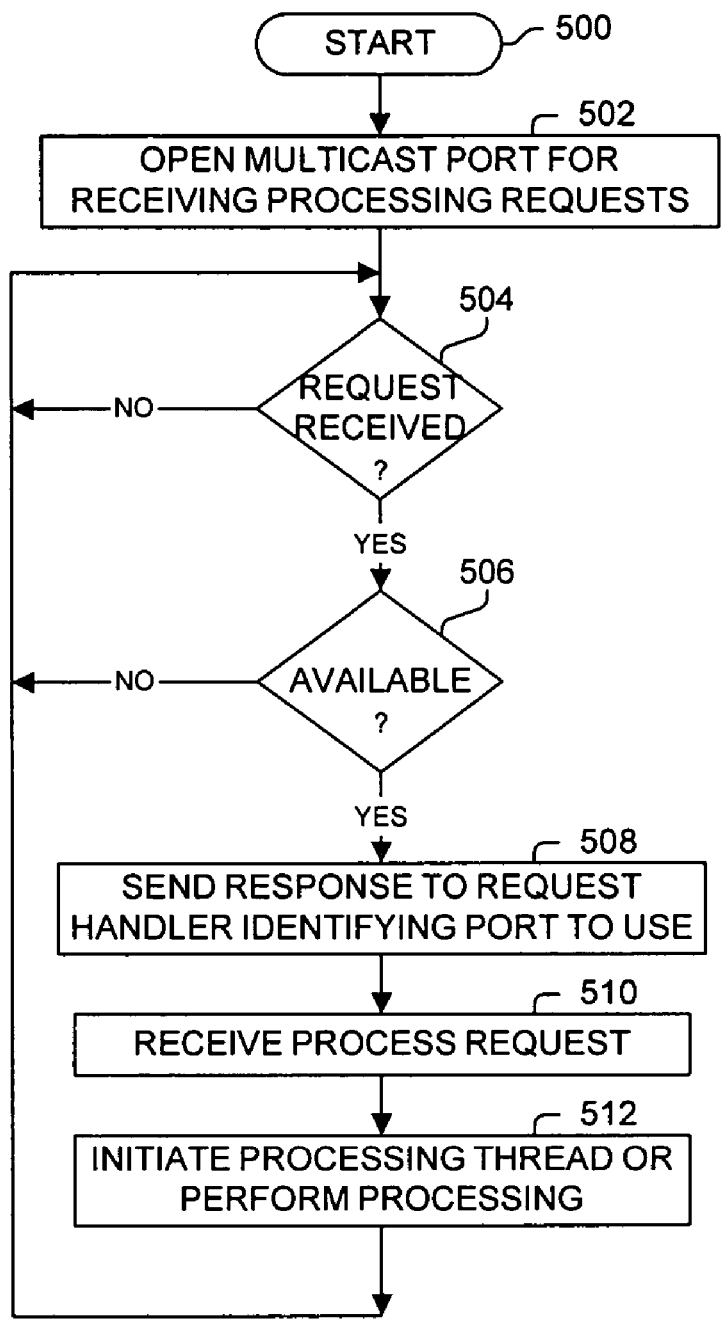
FIG. 5A-B are flow diagrams of process hander processes used in one embodiment.
Figure 5B:
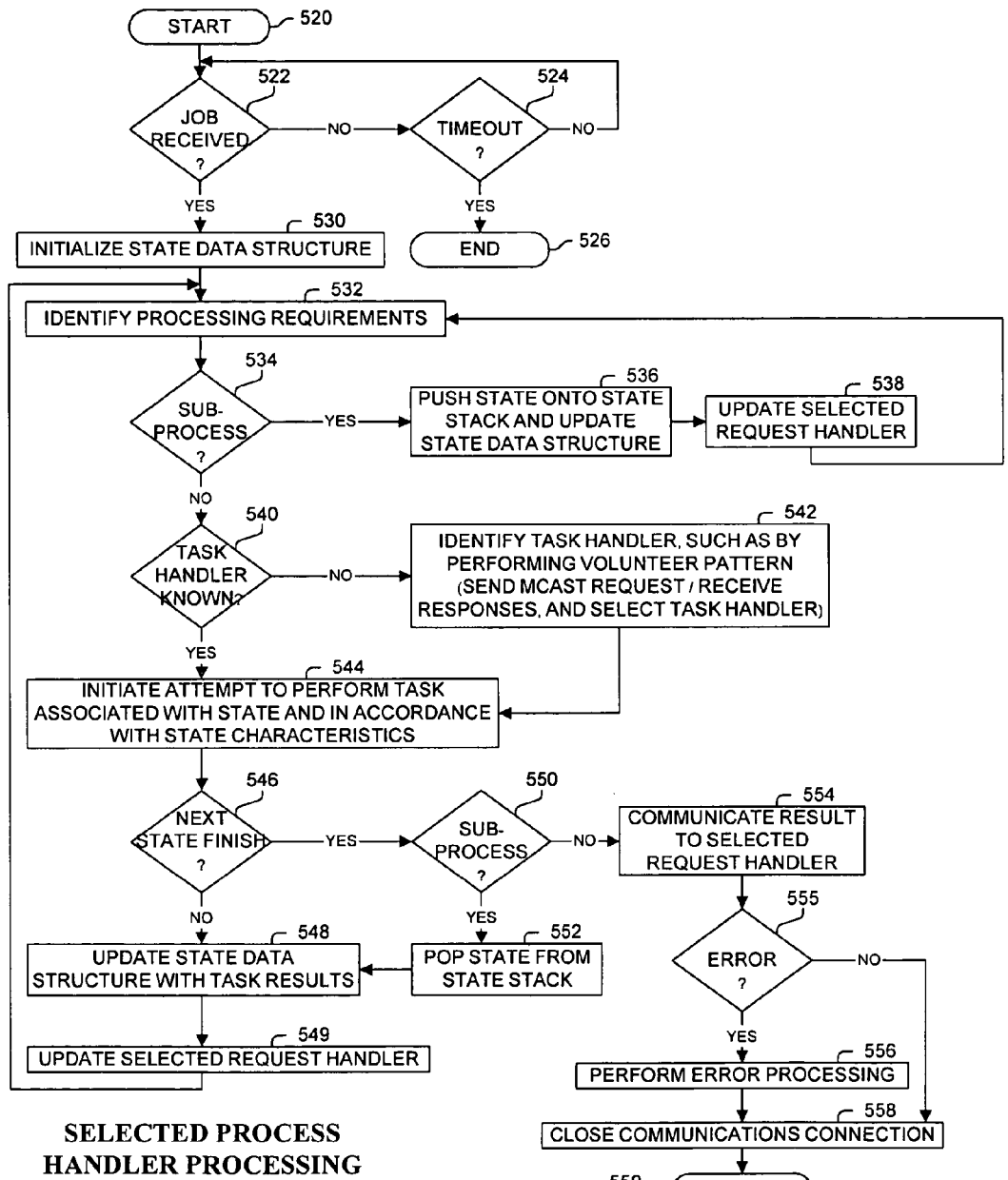

FIGS. 5A-B are flow diagrams of process hander processes used in one embodiment. FIG. 5A illustrates a process used in one embodiment for responding to service requests of request handlers. Processing begins with process block 500, and proceeds to process block 502, wherein a multicast port is opened for receiving processing request messages. As determined in process blocks 504 and 506, until a processing request is received and the process handler is available to handle the request, processing returns to process block 504. Otherwise, the process handler responds in process block 508 by sending a response message to the requesting request handler, with the response message typically identifying a port to use and possibly the GUID corresponding to the received processing request. The processing request is received in process block 510. Next, in process block 512, a selected process handler thread is initialized (such as that corresponding to the flow diagram of FIG. 5B) or the processing request is handled directly. Processing returns to process block 504 to respond to more requests.

FIG. 5B illustrates a flow diagram of a process used by a selected process handler in one embodiment. Processing begins with process block 520, and loops between process blocks 522 and 524 until a job is received (and then processing proceeds to process block 530) or until a timeout condition is detected and in which case, processing is complete as indicated by process block 526.

After a processing job has been received (e.g., this process has been selected by a selected request handler (or possibly other process handler) to handle the request), a state data structure is initialized in process block 530. In process block 532, the processing requirements of the next statement(s) within the process flow corresponding to the received job are identified. As determined in process block 534, if a sub-process is to be spawned (e.g., the process flow specifies a process flow to be executed), then in process block 536, the current state is pushed on to a state stack and the state is initialized to that of the new process flow, the selected request handler is updated in process block 538, and processing returns to process block 532 to process the new process flow.

Otherwise, as determined in process block 540, if the task handler is not already known (e.g., an optimization to perform the task on the same hive engine) such as it is not guaranteed to be performed locally, the task is a "limited task" in that it can only be performed by a subset of the task handlers or the processing of the task is made available to other hive engines (e.g., for performance or load balancing etc.), then in process block 542 the task handler to perform the task is identified. One embodiment identifies the task handler by sending a multicast task request messages, receives the responses, and selects, based on territory, load or other considerations, a task handler to perform the task.

Limited tasks provide a mechanism for identifying hive engines that have special hardware or other resources. Task handlers only on the hive engines with the specialized hardware or other resources possibly required to perform the task will be enabled to perform the corresponding task and thus these enabled task handlers will be the ones to respond to a task request for the corresponding task. Additionally, limited tasks provide a mechanism to limit the number of task handlers or hive engines allowed to access a particular resource by restricting the number and/or location of task handlers allowed to perform a task that accesses the particular resource. Thus, limited tasks may be useful to limit the rate or number of accesses to a particular resource (e.g., database engine, a storage device, a printer, etc.)

In process block 544, a task is initiated to perform the next operation identified in the current process flow with the current state information and characteristics (e.g., timeout, number of retries, etc.) on the identified, selected, or already known task handler. As determined in process block 546, after completion of the processing requirements of the processing statement(s), if the finish state has not been reached, then the state data structure is updated with the task result in process block 548, the selected request handler is updated with the current state information in process block 549, and processing returns to process block 532.

Otherwise, processing is completed of the current process flow as determined in process block 546, and if the current process flow is a sub-process (e.g., spawned process flow) (as determined in process block 550), then in process block 552, the state is popped from the state stack, and processing proceeds to process block 548. Otherwise, in process block 554, the result/state information is communicated to the selected request hander. As determined in process block 555, if an error has been detected, then error processing is performed in process block 556. In process block 558, the communications connection is closed, and processing is complete as indicated by process block 559. Note, in some embodiments, communications connections are not established and disconnected each time, but rather a same communications channel is used more than once.

Figure 5C:
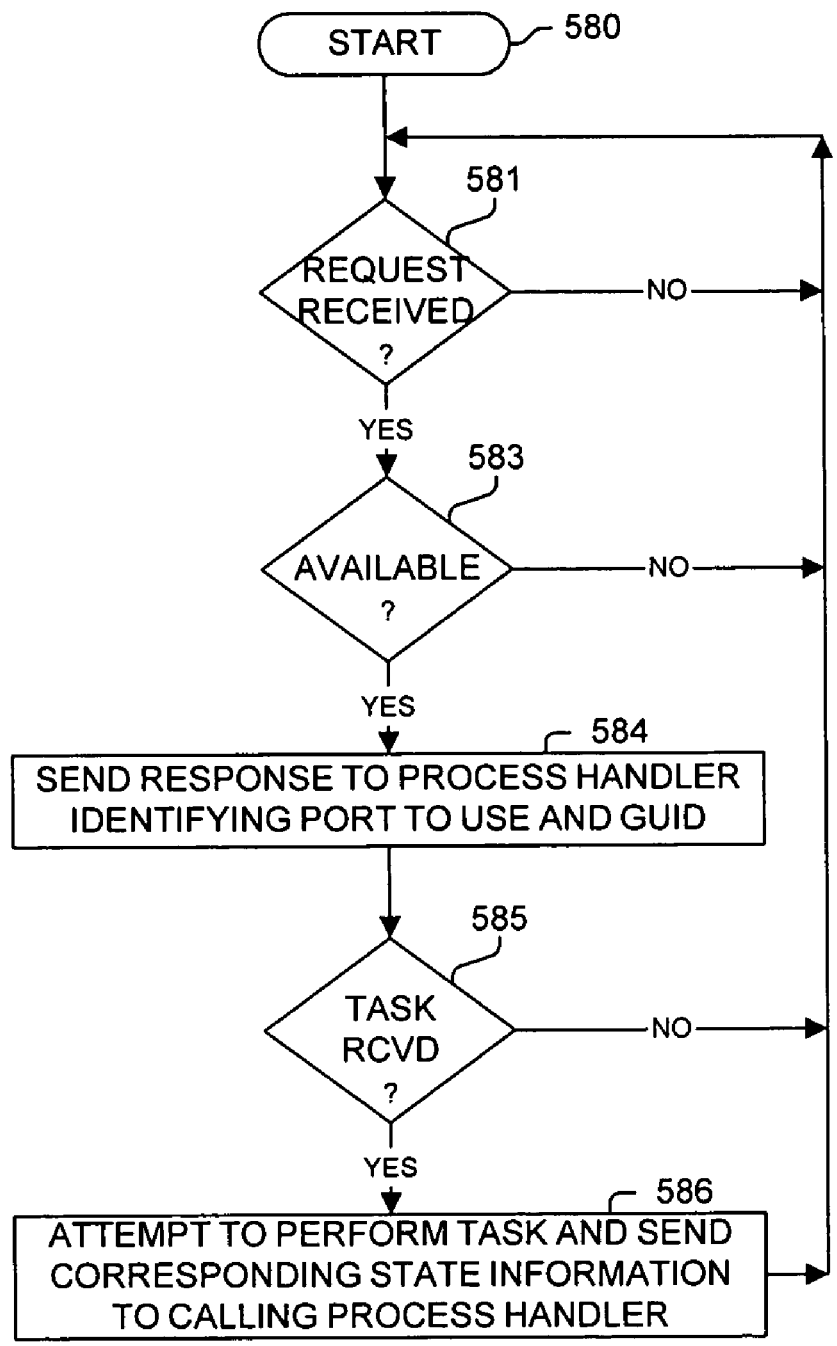
FIG. 5C is a flow diagram of a task handler process used in one embodiment.

FIG. 5C illustrates a flow diagram of a task handler performed by a hive engine in one embodiment. Processing begins with process block 580. As determined in process blocks 581 and 583, until a task request is received and the task handler is available to handle the request, processing returns to process block 581. Otherwise, the task handler responds in process block 584 by sending a response message to the requesting process (typically a process handler), with the response message typically identifying a port to use and the GUID of the received task request. As determined in process block 585, if the task is actually received (e.g., this task handler was selected by the process handler sending the task request), then in process block 586, the task is performed or at least attempted to be performed and resultant state information (e.g., completed state, partially completed state, errors and/or other indications) sent to the requesting process handler. Processing returns to process block 581. Note, in one embodiment, multiple processes illustrated in process block 5C or some variant thereof are performed simultaneously by a hive engine for responding to multiple task requests and/or performing tasks in parallel.

Figure 5D:
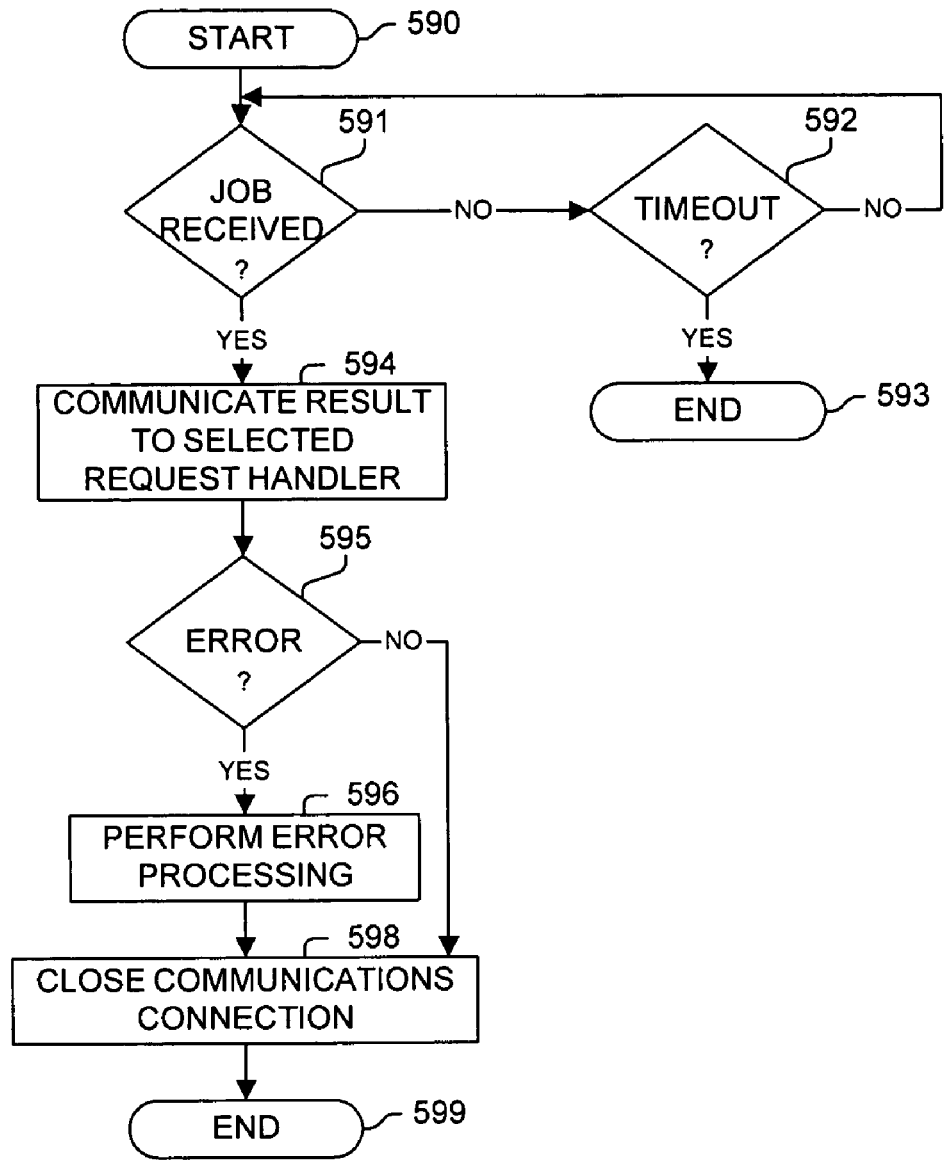
FIG. 5D is a flow diagram of a recovery layer process used in one embodiment.

FIG. 5D illustrates a flow diagram of a recovery processing performed by a hive engine in one embodiment. Processing begins with process block 590, and loops between process blocks 591 and 592 until a recovery job is received (and then processing proceeds to process block 594) or until a timeout condition is detected and in which case, processing is complete as indicated by process block 593. In process block 594, the recovery is retrieved from local storage and is communicated to the selected request hander. As determined in process block 595, if an error has been detected, then error processing is performed in process block 595. In process block 598, the communications connection is closed, and processing is complete as indicated by process block 599.

In one embodiment, a hive application is a collection of process flows that carry out specific sets of tasks. Applications can share process flows. An application definition file (XML descriptor file) typically describes the application, and the application definition file typically consists of the following: application name, process flow names, task names and module file names, support files, and/or configuration file names.

FIG. 6A illustrates an example definition file 600 of an application for use in one embodiment. As show, application definition file 600 specifies a set of corresponding process flows 601, tasks 602, support files 603, and configuration files 604.

FIG. 6B illustrates a definition of an process flow 620 "doProcessOne" used in one embodiment. Shown are four process flow statements 621-624, each specifying its beginning state, tasks to be performed, and next state depending on the outcome of the statements execution.

Figure 6C:
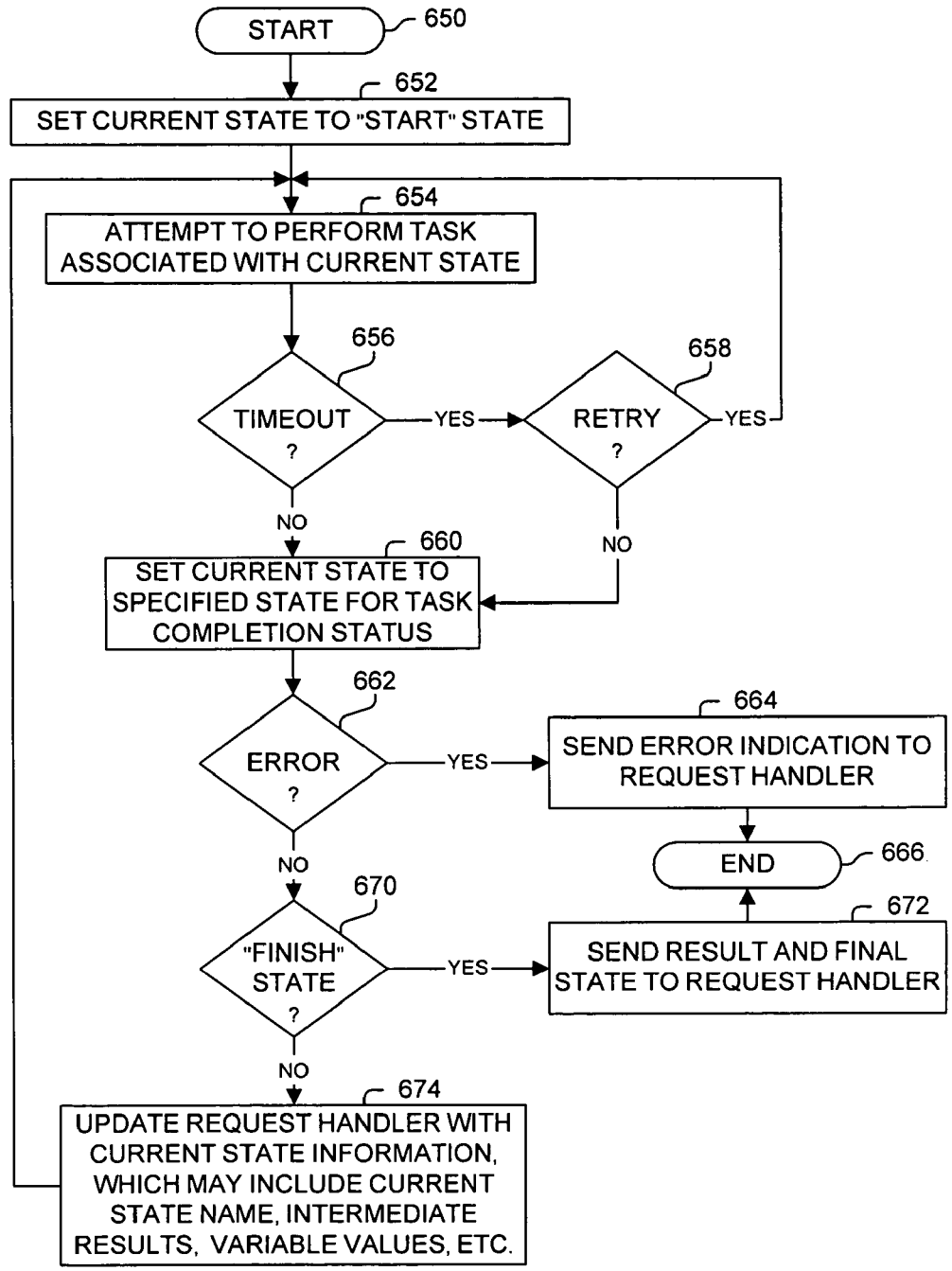
FIG. 6C illustrates a process used in one embodiment for executing a process flow.

FIG. 6C illustrates a process used in one embodiment for executing a process flow or processing job, such as that illustrated in FIG. 6B. Note, in one embodiment, the process illustrated in FIG. 5B is used to execute a process flow or processing job. In one embodiment, a combination of the processes illustrated in FIGS. 5B and 6C or another process is used to execute a process flow or processing job.

Turning to FIG. 6C, processing begins with process block 650, and proceeds to process block 652, wherein the current state is set to the START state. Next, in process block 654, the task associated with the current state is attempted to be performed. As determined in process block 656, if the task timed-out before completion, then as determined in process block 658, if the task should be retried (e.g., the number of retries specified in the process flow or a default value has not been exhausted), processing returns to process block 656. Otherwise, in process block 660, the current state is updated to that corresponding to the task's completion status (e.g., complete, non-complete, not-attempted, etc.). As determined in process block 662, if an error occurred (e.g., an invalid next state or other error condition), then an error indication is returned to the selected request handler in process block 664, and processing is complete as indicated by process block 666. Otherwise, if the next state is the FINISH state (as determined in process block 670), then the result and possibly a final set of state information is sent to the selected request handler in process block 672, and processing is complete as indicated by process block 672. Otherwise, in process block 674, the selected request handler is updated with current state information, such as, but not limited to (nor required to include) the current state name, intermediate results, variable values, etc. Processing then returns to process block 654.

Figure 7A:
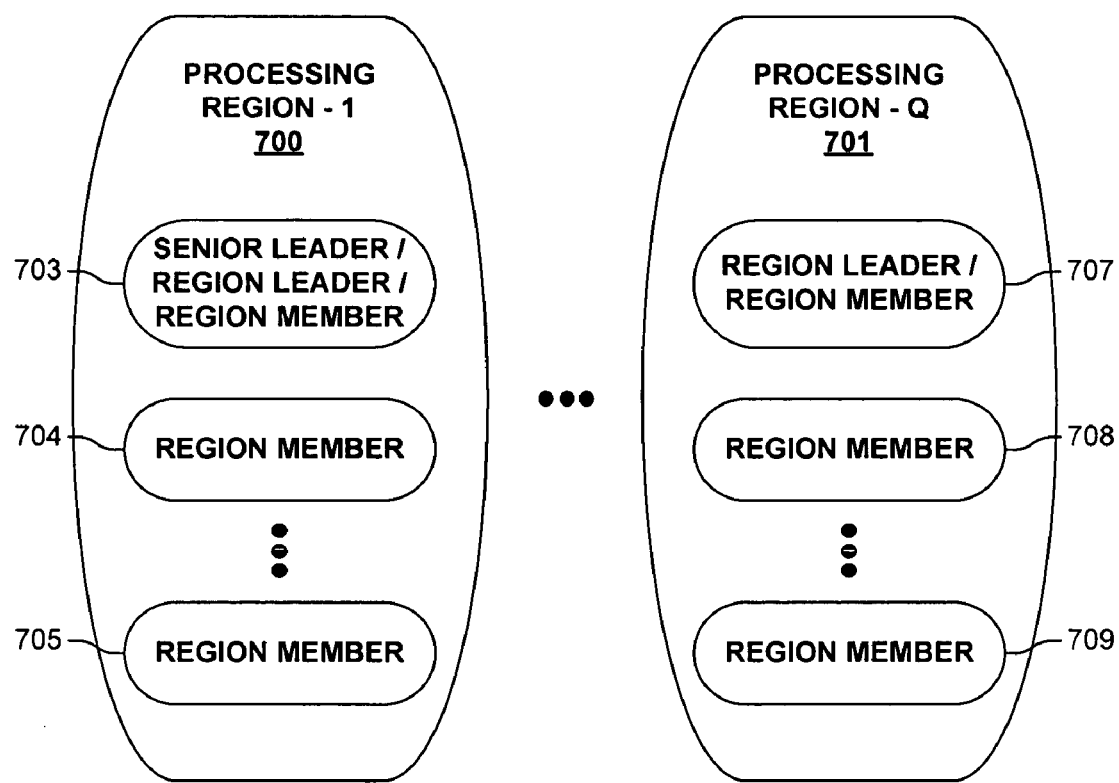
FIG. 7A illustrates a hierarchy of a senior region leaders, region leaders, and region members among multiple processing regions as used in one embodiment.

One embodiment of a hive uses a logical hierarchy of hive engines for delegation of performing administrative and/or other hive related tasks. In one embodiment, each hive engine participates in the processing region hierarchy as a region member with one hive engine in each processing region being a region leader, and there one overall senior region leader for the hive. For example, shown in FIG. 7A are multiple processing regions 700-701, having an overall senior region leader 703 (denoted senior leader/region leader/region member as it performs all functions) residing in processing region 700, a region leader/region member 707 in processing region 701, region members 704-705 in processing region 700, and region members 708-709 in processing region 701.

Figure 7B:
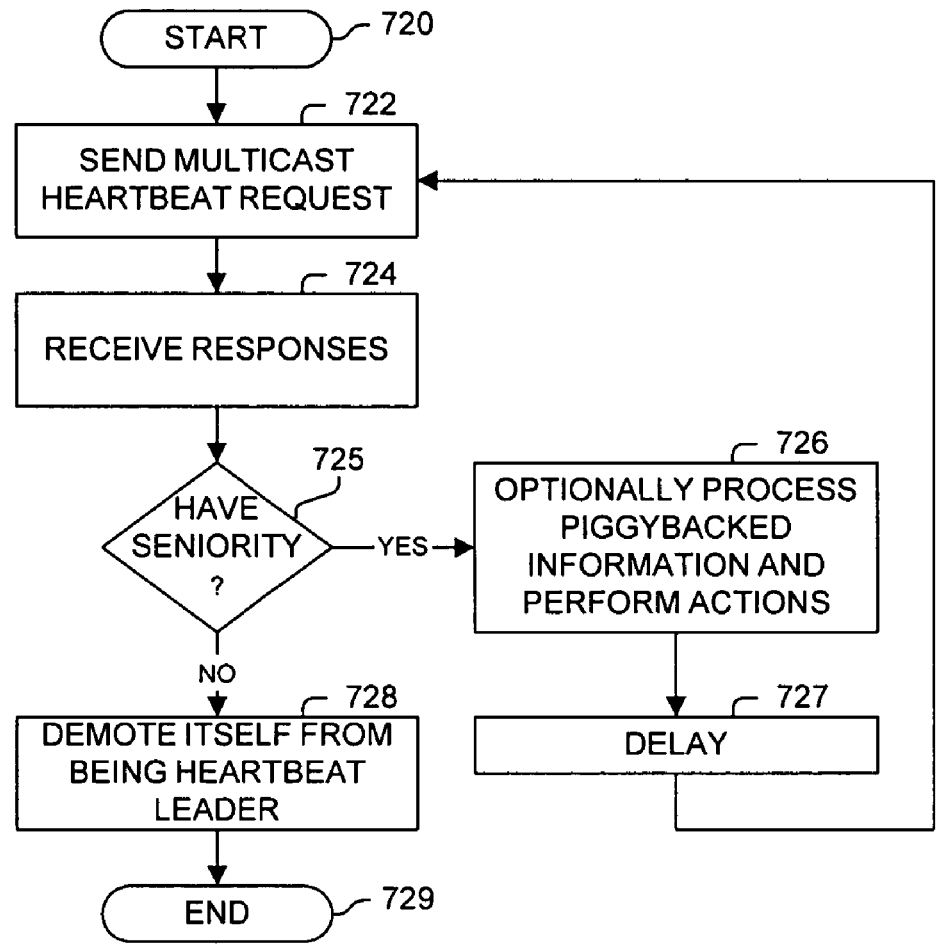
FIGS. 7B-7C are flow diagrams of processes used in one embodiment to establish and maintain a hierarchical relationship among distributed processes.
Figure 7C:
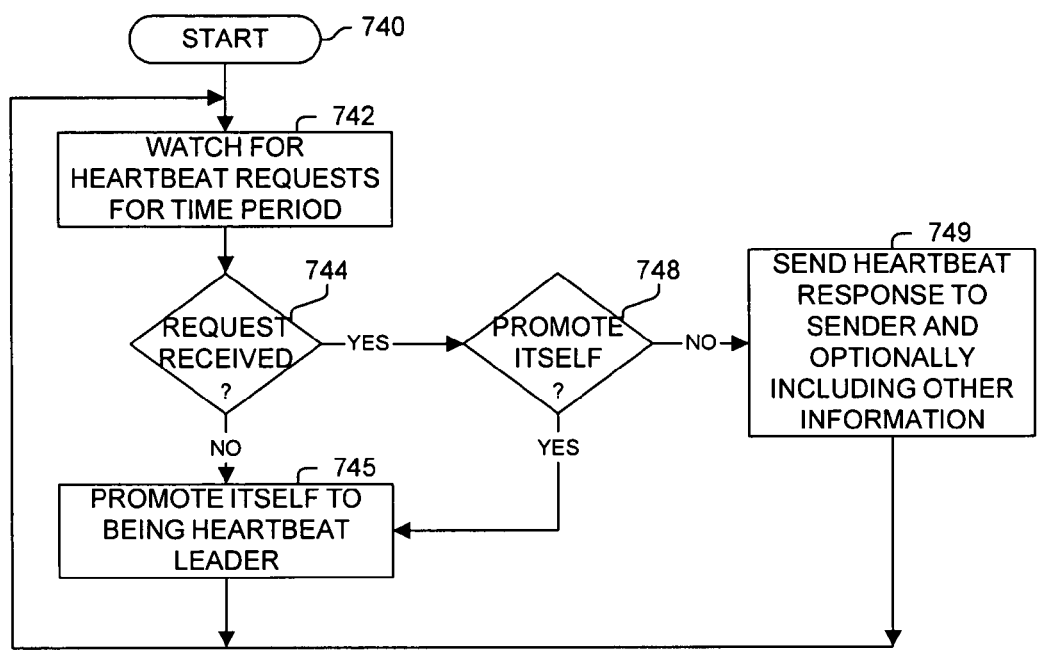

FIGS. 7B-7C are flow diagrams of processes used in one embodiment to establish and maintain this hierarchical relationship among distributed processes or systems, such as among hive engines. The generic terms of heartbeat leader and heartbeat member are used in describing this process, because it can be used in many different applications for establishing and maintaining a hierarchical relationship in a set of dynamic and autonomous processes and systems. For example, in one embodiment, the processes illustrated in FIGS. 7B-C are used to establish and maintain which hive engine in a region is the region leader, and between region leaders for establishing which hive engine is the senior region leader.

Processing of the heartbeat leader flow diagram illustrated in FIG. 7B begins with process block 720, and proceeds to process block 722 wherein a multicast heartbeat request message is sent on the multicast address belonging to the group in which the hierarchical relationship is being established and maintained. In process block 724, the responses are received. As determined in process block 725, if the process is senior over those from which a response was received, then it remains the leader or senior process, and optionally in process block 726, piggybacked information (e.g., number of regions, number of members in each region, etc.) is processed and possibly actions taken or initiated in response. As indicated by process block 727, the process delays or waits a certain period of time before repeating this process, and then processing returns to process block 722. Otherwise, in process block 728, the process demotes itself from being the leader or senior process (such as by initiating or switching to performing actions consistent with being a region member if not already performing the functions of a region member), and processing is complete as indicated by process block 729.

Processing of the heartbeat member flow diagram illustrated in FIG. 7C begins with process block 740, and proceeds to process block 742, wherein the process watches for and identifies heartbeat request messages during a predetermined timeframe. As determined in process block 744, if a no heartbeat request is received, then in process block 745, the process promotes itself to being the heartbeat leader, and processing returns to process block 742. Otherwise, if this process is senior to a process sending a heartbeat request message as determined in process block 748, then processing proceeds to process block 745 to promotes itself. Otherwise, in process block 749, a heartbeat response message is sent to the sender of the received heartbeat request message, and optionally other information is included in the heartbeat response message. Processing then returns to process block 742. Note, determining seniority can be performed in numerous manners and mechanisms, such as that based on some physical or logical value associated with a hive engine (e.g., one of its network addresses, its serial number, etc.)

FIG. 8A illustrates some of the functions performed by a senior processing region leader in one embodiment. Processing begins with process block 800, and proceeds to process block 802, wherein a heartbeat request is sent to all region leaders, typically by sending a multicast packet to the processing region leader intercommunication multicast address 242 (FIG. 2C) and piggybacked information is collected from received responses with this information typically including, but not limited to the number of processing regions, number of processing handlers, number of request handlers, limited task information, etc. As determined in process block 804, if the number of request handlers needs to be adjusted (e.g., there are too few or too many), then in process block 806, a region leader is selected and directed to start or stop a request handler. Next, as determined in process block 808, if the number of processing regions needs to be adjusted (e.g., there are too few or too many), then in process block 810, a region leader is selected and directed to disband or spit a region. Next, as determined in process block 812, if the number of task handlers that can perform a particular task (i.e., a "limited task" as typically and by default, all tasks can be performed by all task handlers) needs to be adjusted (e.g., there are too few or too many), then in process block 814, a region leader is selected and directed to adjust the number of task handlers within its region which can perform the particular limited task. Next, as determined in process block 816, if some other action needs to be performed, then in process block 818, the action is performed or a region leader is instructed to perform the action. Next, processing usually waits or delays for a predetermined or dynamic amount of time as indicated by process block 819, before processing returns to process block 802.

Figure 8B:
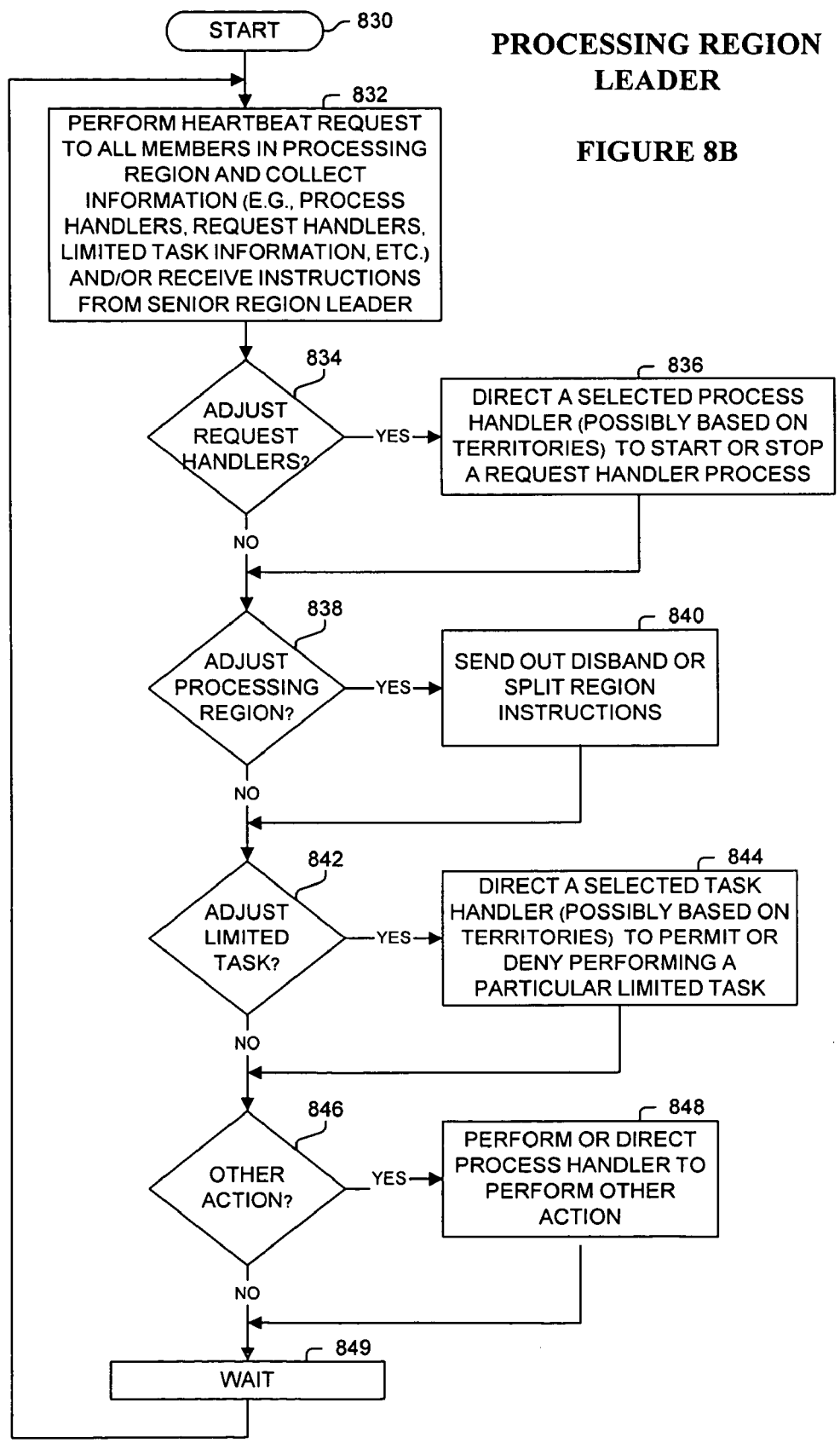
FIG. 8B is a flow diagram of a processing region leader process used in one embodiment.

FIG. 8B illustrates some of the functions performed by a region leader in one embodiment. Processing begins with process block 830, and proceeds to process block 832, wherein a heartbeat request is sent to all region member, typically by sending a multicast packet to the processing region multicast address 244 (FIG. 2C), and piggybacked information is collected from received responses with this information typically including, but not limited to the number of processing handlers, number of request handlers, etc.; or possibly instructions are received from the senior region leader. As determined in process block 834, if the number of request handlers needs to be adjusted (e.g., there are too few or too many), then in process block 836, a process handler is selected and directed to start or stop a request handler. Next, as determined in process block 838, if the number of processing regions needs to be adjusted (e.g., there are too few or too many), then in process block 840, an instruction to disband or spit the region is issued. Next, as determined in process block 842, if the number of task handlers permitted to perform a particular limited task needs to be adjusted (e.g., there are too few or too many), then in process block 844, an instruction is provided (directly, indirectly such as via a request or process handler, or based on a volunteer pattern) to a particular task handler to permit or deny it from performing the particular limited task. Next, as determined in process block 846, if some other action needs to be performed, then in process block 848, the action is performed or a process handler is instructed to perform the action. Next, processing usually waits or delays for a predetermined or dynamic amount of time as indicated by process block 849, before processing returns to process block 832.

Figure 8C:
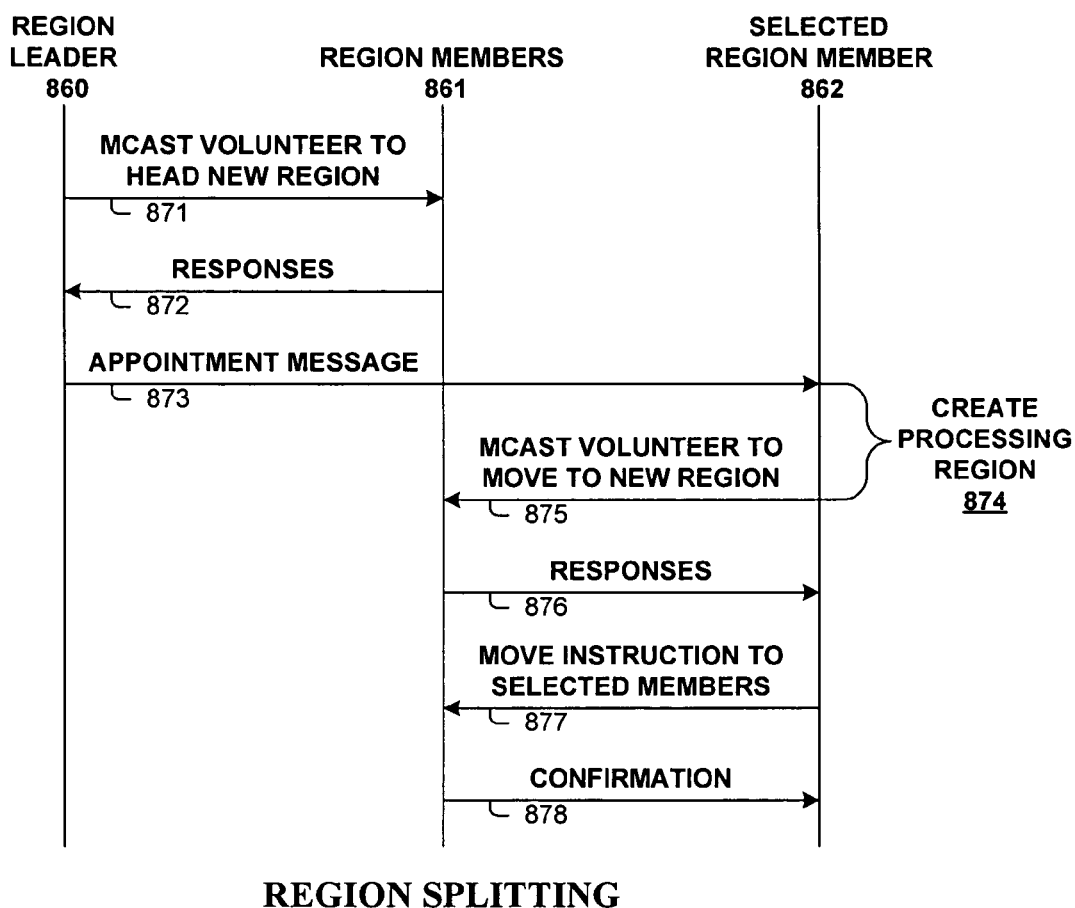
FIG. 8C illustrates the splitting of a region as performed in one embodiment.

FIG. 8C illustrates the splitting of a region as performed in one embodiment. Region leader 860 sends a multicast message 871 requesting a volunteer to head the new region to region members 861, some of which typically return a positive response message 872. Region leader 860 then identifies a selected region member 862 to head the new processing region, and sends an appointment message 873 to selected region member 862. In response, selected region member 862 creates a new processing region as indicated by reference number 874, typically including identifying an unused processing region multicast address 244 (FIG. 2C) as it monitored the traffic or processing region active indication messages sent to processing region active region indications multicast address 243. Then, selected region member 862 multicasts a volunteer message 875 to processing regions in the old (and still used) processing region and typically receives one or more responses 876. Selected region member 862 then selects a certain number, typically half of the number of process handlers in the old processing region, of responding process handlers, and notifies them to switch to the new processing region via move instruction 877, and they in turn, send a confirmation message 878 to selected region member 862.

In one embodiment, a node can determine on its own its respective functionality to be performed, rather than assigned this role by senior processing region leader or processing region leader, or another process. For example, nodes participate in the passing of heartbeat messages so they can readily detect a relevant change in a hive or portion thereof. Also, node can either be assigned or determine (e.g., based on a set of values such as hive membership number, network address) a relative role, such that it can determine what function to perform based on the state of the hive. For example, if a node is in the third position in a hive region where the first two nodes are the request handlers (or perform another predetermined function), and one of these first two nodes is removed, then this node in the second position and performs its corresponding function.

Figure 8D:
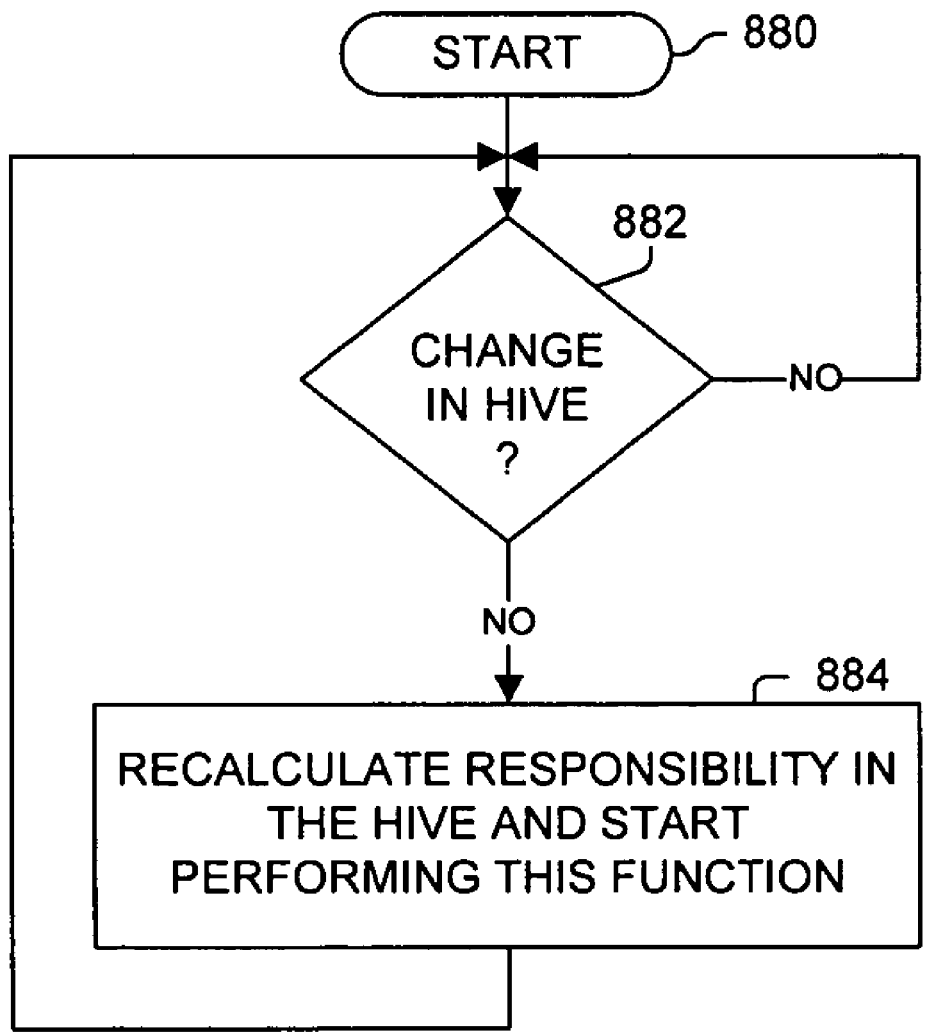
FIG. 8D is a flow diagram of a process for self-determining a node's responsibility as performed in one embodiment.

One such process for self-determining a node's responsibility used in one embodiment is illustrated in FIG. 8D. Processing begins with process block 880. As determined in process block 882, if there is a change in the hive relevant to the self-determination of a nodes role operation, then processing proceeds to process block 884, wherein the node determines its role and performs this same or new functionality. Processing loops back to process block 882 to continue processing.

Figure 9:
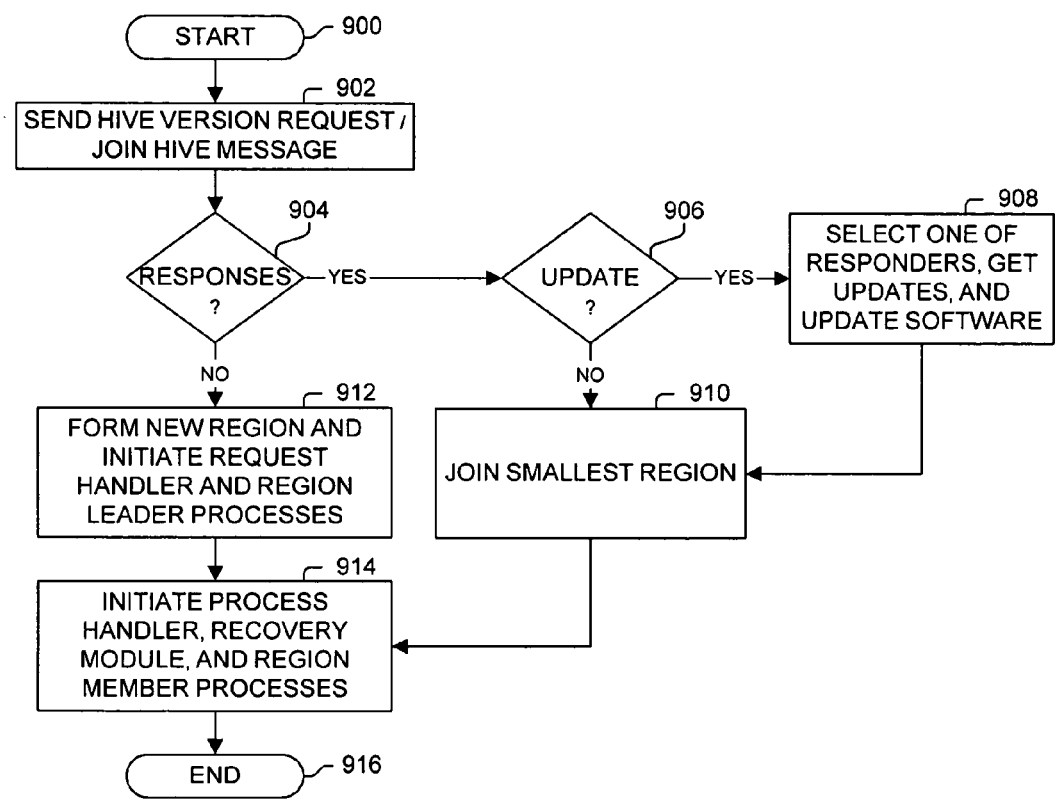
FIG. 9 illustrates a process used in one embodiment for initializing a hive engine.

FIG. 9 illustrates a process used in one embodiment for initializing a hive engine. Processing begins with process block 900, and proceeds to process block 902, wherein a hive version request and hive join multicast message is sent typically to all region leaders. As determined in process block 904, if no responses are received, then in process block 912, a new processing region is formed, and request hander and region leader processes are initiated. Next, in process block 914, process handler, recovery module, and region member processes are initiated, and startup processing is completed as indicated by process block 916. Otherwise, as determined in process block 906, if a hive software update is available, then, in process block 908, one of the responders is selected, the updates are acquired, and the software (e.g., hive software, operating system, etc.) is updated. In process block 910, the hive engine joins the smallest or possibly one of the smaller processing regions, possibly with this selection being determined by identified territories, and processing proceeds to process block 914.

In one embodiment, the hive is updated by a client with special administrative privileges. This administrative client sends a request to the senior region leader of the hive. The senior region leader opens a TCP connection and sends the administration client the connection information. The administration client sends the new application to the senior region leader. When the senior region leader receives an update, the senior region leader multicasts the update command to all the hive members. The senior region leader sends multicast message containing the name of the file that is being updated, the new version, and the total number of packets each hive member should receive. The senior region leader then multicasts the data packets, each packet typically includes the file id, the packet number, and data. If a hive member does not receive a packet, that hive member sends a request to the senior region leader for the missing packet. The senior region leader resends, multicasts, the missing packet. The hive members store the update in a staging area until they receive the activation command. To activate an update, the administration client sends the activation command to the senior region leader. The senior region leader multicasts the activate command to the hive members. The hive members remove the old application or files and moves the update from the staging area to the production area. To update the hive software or operating system, the senior region leader distributes the updates and restarts volunteers in a rolling fashion. When the hive service manager detects a new version of itself, the service manager forks the process and restarts with a new version. Also, the senior region leader can send other update commands. An active message indicates that the corresponding application, patch, or OS that should be running on the hive. A deactivated messages indicates that the corresponding application, patch, or OS should not be running on the hive and should remain installed on hive members. A remove message indicates that the corresponding application, patch, or OS was once installed on the Hive and any instances found on Hive members should be removed. This allows hive engines to be updated and also to move back to previous releases.

One embodiment provides hive storage capability to reliably store information which can be read and written by computers and/or hive nodes. Proper data redundancy is typically a key to provide high reliability, availability and survivability. This information could be any information of any size, such as, but not limited to, one or more values, blocks of data, files, file systems, database/database-like structured data records, etc., using in any application, such as, but not limited to, email, search engines, news feeds, inventory management, transactions, computations, image storage and manipulation, etc.

One embodiment stores information by storing multiple information units of the information and one or more protection units generated using one or more thresholding schemes. The basic idea of a threshold scheme is to map information units of the original information along with one or more protection items into n pieces, or data units, using certain mathematical transforms. Then all the n data units are typically distributed to n nodes in the system, with each node typically storing one data unit (e.g., one or more information units, one or more protection units, or some combination thereof). In order to access the information, at least k data units need to be retrieved in order to recreate the original information (i.e., the original information can be exactly recovered from m different shares if $m \geq k$, but less than k data will not recover the original information. Such threshold schemes are called (n, k) threshold schemes. The threshold schemes can be realized by an unlimited number of mechanisms, and can also be used for secret sharing. To maximize the usage of network and storage and eliminate bottlenecks in a distributed storage system, each data unit is typically (although not required) made to be of the same size. Otherwise, the failure of a node storing a data unit with bigger size might have bigger impact on the system performance.

From an error control code point of view, an (n, k) threshold scheme with equal-size data units is equivalent to an (n, k) block code, and especially most (n, k) threshold schemes are equivalent to (n, k) MDS (Maximum Distance Separable) codes. An (n, k) error control code uses mathematical means to transform a k-symbol message data block to an n-symbol codeword block such that any m symbols of the codeword block can recover all the k symbols of the original message data block, where $k \leq m \leq n$, typically with all the data units being the same size in bits. Obviously, by the simple pigeon hole principle, $k \leq m$. When m=k, such an (n, k) code is called MDS code, or meets the Singleton Bound. Herein, the nomenclature of (n, k) threshold scheme refers to any data distribution scheme using an (n, k) MDS code. Using coding terminology, each share of (n, k) is called an information unit. The process of creating n information units from the original information is called encoding, and the corresponding process of recreating the original information from at least an arbitrary k information units stored in the system is called decoding.

It is not hard to see an (n, k) scheme can tolerate up to (n−k) node failures at the same time, and thus achieve data reliability, or data survivability in case the system is under attack where some nodes can not function normally. The (n, k) scheme can also ensure the integrity of data distributed in the system, since an (n, k) code can be used to detect data modifications on up to (n−k) nodes.

One embodiment uses a general self-organizing, self-healing, and self-maintaining software storage platform to provide flexible (n, k) threshold schemes together with a set of basic operations on data files. Any MDS code can be used. One embodiment uses one or more MDS array codes (a class of MDS codes), whose encoding and decoding mainly are bitwise XORs (exclusive ORs). Other known MDS array codes include the EVENODD code, the X-Code, and the BCode, each of which are used in one embodiment. These MDS array codes are very efficient to encode and decode.

Figure 10A:
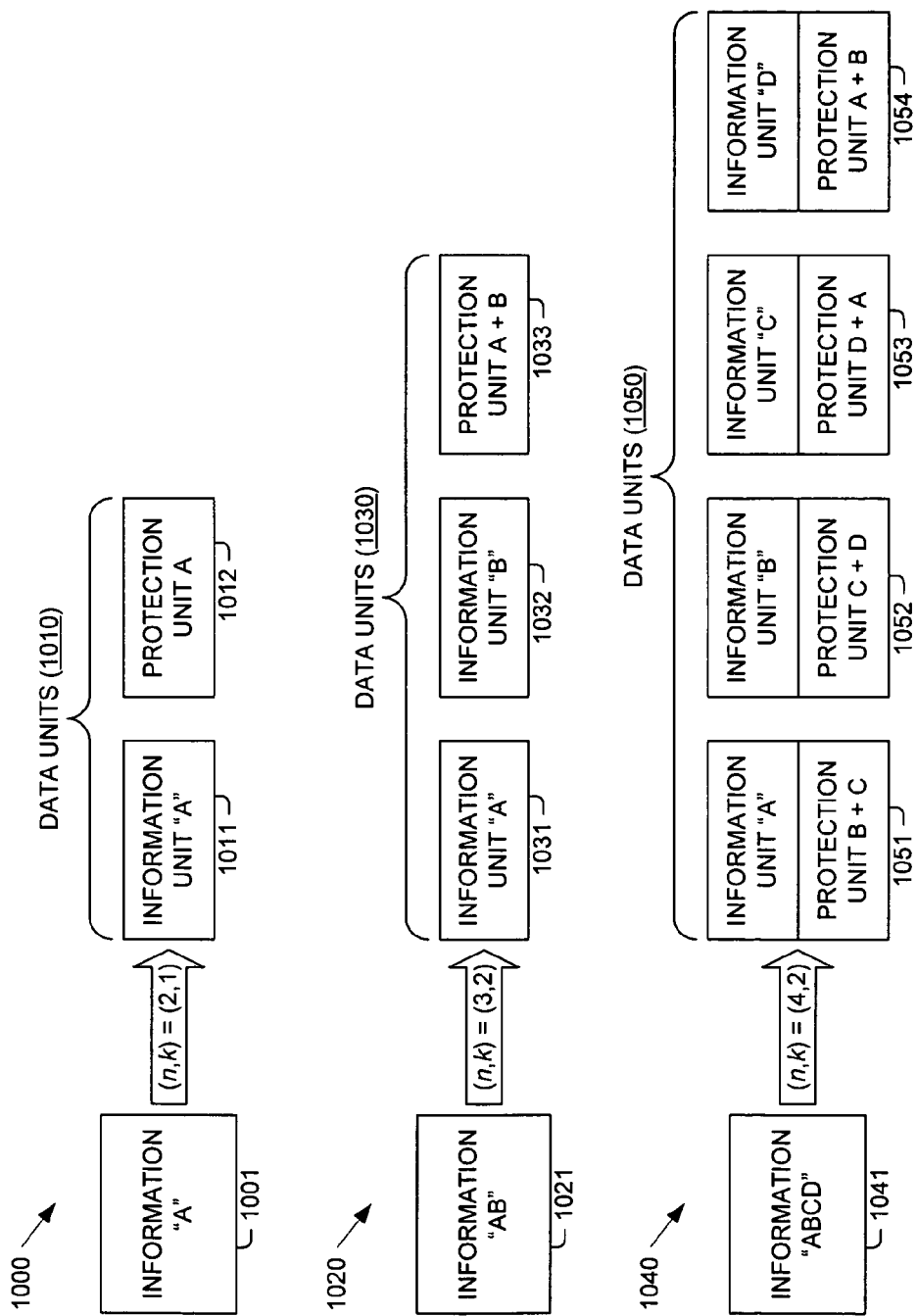
FIG. 10A is a block diagram illustrating the concept of thresholding schemes used in one embodiment.

FIG. 10A illustrates using a (2, 1) threshold scheme (1000), a (3, 2) threshold scheme (1020) and a (4, 2) threshold scheme (1040). Note, the symbol '+' is used to indicate the bitwise XOR operation. Also, an embodiment may use any threshold scheme, such as, but not limited to a (2, 1), (3, 2), (4, 2), or (8, 3) threshold scheme.

A (2, 1) threshold scheme 1000 will first be discussed. Information 1001 is reliably stored in n=2 data units (1010—i.e., data units 1011-1012), such that retrieving any one of the two data units 1010 will allow the recreation of information 1001 (or is the same as information 1001). A data unit is defined as an information unit, a protection unit, or some combination thereof. For ease of description and understanding, information 1021 is denoted "A" to indicate it includes one information unit A 1011. Protection unit 1012 is typically generated by copying information unit A 1011 (or via some other deterministic function performed on information unit A 1011). For reliability purpose, data units 1030 are typically stored on different computers, or for more reliability, on different hive storage nodes (e.g., a hive node with reliable storage mechanisms).

FIG. 10A also illustrates a (3, 2) threshold scheme 1020. Information 1021 is reliably stored in n=3 data units (1030—i.e., data units 1031-1033), such that retrieving any two of the three data units 1030 will allow the recreation of information 1021. For ease of description and understanding, information 1021 is denoted "AB" to indicate it includes two information units A 1031 and B 1032. Protection unit 1033 is generated by the bitwise OR operation of information units A 1031 and B 1032. For reliability purpose, data units 1030 are typically stored on different computers, or for more reliability, on different hive storage nodes (e.g., a hive node with reliable storage mechanisms).

FIG. 10A also illustrates a (4,2) threshold scheme 1040. Information 1041 is reliably stored in n=4 data units (1050—i.e., data units 1051-1054), such that retrieving any two of the four data units 1050 will allow the recreation of information 1041. For ease of description and understanding, information 1041 is denoted "ABCD" to indicate it includes four information units A-D. As shown, each of data units 1050 include one information unit and a protection unit generated by bitwise XOR'ing two of the other four data units 1050. As shown, data unit 1051 includes information unit A and protection unit B+C; data unit 1052 includes information unit B and protection unit C+D; data unit 1053 includes information unit C and protection unit D+A; and data unit 1054 includes information unit D and protection unit A+B. For reliability purpose, data units 1050 are typically stored on different computers, or for more reliability, on different hive storage nodes (e.g., a hive node with reliable storage mechanisms).

An information unit in an array code is a very flexible piece of data. It can be a bit, a byte, a block of any size, or even a file. An array code can be applied on a file, using a block whose size is optimal for the application. An array code can also be used for a group of files, with files being information units. Typically, the files are of the same size (possibly filled with data to make them the same size). Of course, other simple techniques can be used to apply a threshold scheme to files with different sizes. For example, the information unit size is set close to that of most of the files and use another symbol size is used for the remaining data.) Also, when an information unit is an independent entity that is what is desired to be manipulated (rather than the entire information), only that particular information unit needs to be retrieved from storage. If there is a failure, the information unit can be recreated from the other information units.

A system may use a single or any number of different threshold schemes, with the scheme used automatically selected, prior selected, selected in a storage instruction, etc.

Figure 10B:
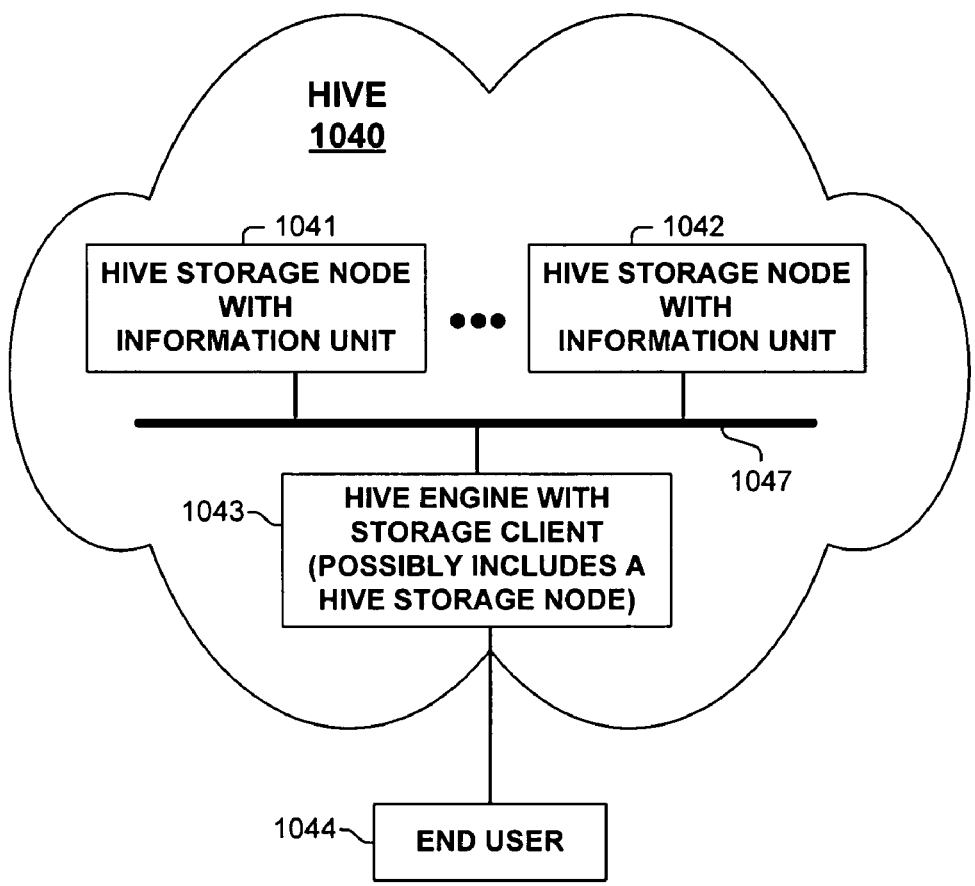
FIG. 10B is a block diagram illustrating an exemplary storage hive architecture used in one embodiment.

FIG. 10B is a block diagram illustrating an exemplary storage hive architecture used in one embodiment. Note, the reliable data storage mechanism is often discussed herein in terms hive nodes, with the discussion applicable to computers systems instead of hive nodes.

Shown in FIG. 10B is hive 1040 including multiple hive storage nodes 1041-1042 for storing data units (and possibly hive engine 1043 also having hive storage capability). Using an (n, k) threshold scheme, there must be at least n different hive storage nodes to store each data unit on a separate hive storage node. In one embodiment, there are n hive storage nodes; while in one embodiment, there are many more hive storage nodes than n.

In one embodiment, a hive engine 1043 provides an interface to an external end user system for reading and writing information, and typically for creating the data units and distributing them to multiple hive storage nodes, and for retrieving the data units and recreating the information. In one embodiment, hive engine 1043 includes hive storage node capability, and therefore it can also be used to store data units.

Figure 10C:
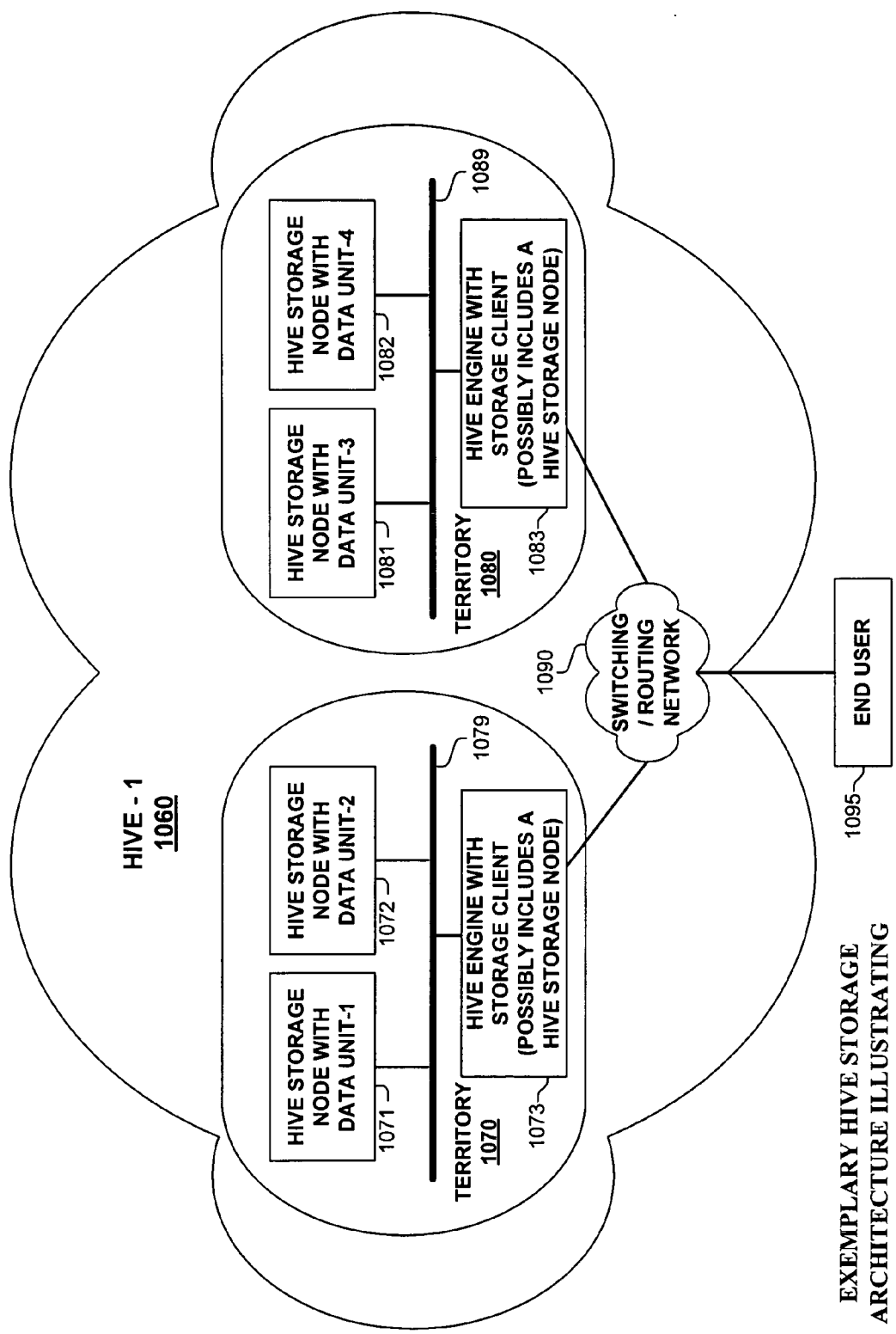
FIG. 10C is a block diagram illustrating an exemplary storage hive architecture used in one embodiment.

Shown in FIG. 10C is a hive 1060 including two hive territories 1070 and 1080, each having multiple hive nodes 1071-1073 and 1081-1083, respectively, and interconnected via a communications element 1090 (e.g., a router, switch, etc.). As previously discussed herein, territories are groupings of hive nodes. An additional measure of reliability can be included in a system by having different territories in different locations (as well as having hive nodes of a single territory of hive in different locations).

FIG. 10C also indicates that hive storage nodes 1071-1072 and 1081-1082 include data units 1-4, for describing an example using a (4, 2) threshold scheme (such as, but not limited threshold scheme 1040 of FIG. 10A) in which four data units are used, and the original information can be created from any two of these data units. Thus, by storing k data units in each of different territories, especially where a network, power, or other failure will affect only one of these territories, end user 1095 will typically have more reliably access to the information in case of a failure (including maintenance) of a hive node. FIG. 10C also illustrates that systems (e.g., hive nodes, computers, etc.) can be selected for storing data units based on their physical locations, including such that k data units can be stored on each of at least two different physical subnetworks.

While an (n, k) MDS code ensures the exact recovery of the original information from any k nodes, the information can certainly be recovered from more than k nodes. This feature enables dynamic load balancing among the hive nodes. For example, when a (4, 2) threshold scheme (such as, but not limited threshold scheme 1040 of FIG. 10A) is used, as long as all the four nodes are functioning, the information can be easily recovered by collecting the four original information units and extracting the original information units without having to perform any decoding computation. It is also possible to recover the original information from three nodes, such as from the information units of the first three received data units, and decoding the missing data unit from received corresponding protection unit and information units. Thus, based on the available network bandwidth, processing load and response latency from each node, as well as processing power of the client node, different data recovery operations can be performed to achieve load balancing among the hive nodes, dynamically on block level. A client can also achieve trade-off between communication and computation. For example, if it is more expensive to set up and maintain connections to hive nodes, due to latency and other factors, than local computations, a client may well choose to recover the original information units from only k hive nodes even if other hive nodes are accessible.

Also, when a (n, k) threshold scheme is applied to information, in general, one hive node stores one data unit. But, these nodes can be grouped based on various application needs. For example, if an (8,3) threshold scheme is applied to information, and hive nodes are physically located at two different sites (such as that shown in FIG. 10C), then the eight nodes can be physically split between the two sites, such that each site stores four data units. In this case, the four nodes at one site can form a group, which can provide user data in normal situations. Should one node fail in this first site, the remaining three nodes can still recreate the information without retrieving any data units from the other site. Only when two or more nodes fail at one site does a data unit need to be retrieved from the other site in order to recreate the original data. Thus, in normal situations, the two groups at the two sites can function independently for information retrievals, while each group has a certain degree of reliability. Combined, the two groups still maintain the designed reliability degree.

In a hive with N nodes, an (n, k) threshold scheme (where usually n<N) can be applied to encode information. Then n data units are stored on n of the N nodes in the hive. However, both k and n are tunable based on the needs of the application. Note, here the reliability degree (e.g., the number of simultaneous node failures) depends on the difference between n and k, while the effective storage use depends on the ratio of k:n. Further more, even after both n and k are already determined, it is still possible to use an (m, k) threshold scheme (where m>n) by storing only n of the m data units on n hive nodes. This gives the hive another degree of flexible in data placement. For example, to enable more random node grouping, some nodes other than the n designated notes may choose store some of the data units as well. If just an (n, k) code is used, some data units are inevitably replicated in a naive fashion, the increase in reliability degree by those node is limited. In worst case, there is no reliability increase at all. But by using an (m,k), m>n threshold scheme, extra nodes can store information units other than the n ones already used. This effectively increases the reliability degree.

In order to store the information, an instruction is typically received including the information and an identifier for referencing the information (e.g., a filename, an information space and value, etc.). In one embodiment, the instruction also includes an indication of the threshold scheme to use, such as the value of k and/or n to use. In one embodiment, an indication of the reliability level is also included in the instruction for determining whether to store the data units across multiple different locations (e.g., subnets, territories, etc.).

Every data unit of an information has a new metadata (index) file associated with it, which is tentatively called the hnode (Hive Node). The hnode stores the data necessary for distributing and recovering the associated information, as well as characteristics normally associated with a file or data stored in a computer or database system. In one embodiment, it includes the following attributes:

Locations of all associated data units and the original information, which may, for example, be specified by a path name with the server node ID if not already included in the path name.

An indication of the thresholding scheme used for encoding and decoding the shares.

A security flag indicating if an encryption key is needed to recover the user file.

Access rights: rights for read, append, write or delete

Extensions for other information

Each of the data units of the original information, as well as the original information itself (if the user chooses to store a local copy in addition to its distributed data units on hive storage nodes/computer systems) has the same hnode information stored with it for high redundancy. Because hnode is very important and its size is small, typically less than a hundred bytes in one embodiment, this high redundancy brings another level of reliability and security for easy detection of any modifications on it and easy recovery in case some hnode is destroyed together with its data unit. In addition to the hnode for each information, system wide configuration information is also typically maintained by each hive node, which mainly includes the mapping between the logical server ID and its location information, such as IP address or host name. The hive storage nodes may but not necessarily replicate directory trees on a client machine, which can be decided by users or system administrators.

Many different operations are available in one embodiment for storing and retrieving information encoded into multiple data units and distributed across multiple systems.

The write operation is a basic procedure to store information. In one embodiment, a write instruction is received, typically including the information. A corresponding hnode file is created if it does not already exist, the data units are created, the then written to their respective systems (which again may be specified by the user) together with the hnode files. The file create and write operations are just the ones supported by the host file system. If the hnode file exists, it updates the related hnode files if necessary, for example a previous move operation was incomplete or a different code is used for this write operation.

The read operation is a basic procedure to read the original information. In one embodiment, a read instruction is received, typically including an identifier of the original information (e.g., some indication of what to read). The corresponding data from the hnode is read and updates all the hnode files if necessary, then reads proper data units from the systems (e.g., from as many as possible, from k systems, etc.). After collecting all or enough data units, the original information is recreated. This original information is passed to proper applications, written to a local file specified by the user, or sent to a device. Note here the decoding operation may not need any computation at all if all the information units are accessible.

In one embodiment, a detect operation is used to detect whether the original information (e.g., local copy) and/or the data units have been modified/corrupted on some systems. In one embodiment, this operation uses a proper error detection algorithm to detect possible modifications in the data units and/or original file. In one embodiment, errors are detected on locally stored data units by each node using a standard error detection codes and mechanisms, with these corrupt data units being recreated from other corresponding data units typically stored on other nodes. In one embodiment, errors are detected and corrected on locally stored data units by each node using a standard error correction codes and mechanisms, with the additional ability to recreate these corrupt data units from other corresponding data units typically stored on other nodes as needed (e.g., the number of errors exceeds the capability of the error correction code).

In one embodiment, a repair operation is provided to correct the modifications/corruptions if the number of these is within the threshold scheme's error correcting capability. This operation employs a proper error correction algorithm of the threshold scheme to correct the errors (i.e., the modifications/corruptions).

In one embodiment, a restore operation is provided to restore corrupted or missing data units to a consistent state with the other intact data units. In some situations, data units are read from other systems to recreate the missing data units (possibly after recreating the original information).

In one embodiment, a copy operation is provided for making a copy of the original information or a data unit thereof. When the original information or a data unit is copied, a hnode file is created for the new file, and the associated hnode is copied to the new hnode file.

In one embodiment, a move operation is provided for moving the original information or a data unit thereof. When the original information or any data unit is moved, this operation updates its hnode with the new pathname of the moved file and moves (using the host file system's move operation) the updated hnode to the new location as well. The Move operation then updates all the other related hnode files with the new locations of the moved file and its hnode. If some hnode files are inaccessible, this operation marks a flag in the extension field of the moved hnode to indicate this move operation is incomplete and related hnode files need to be updated when accessed later.

In one embodiment, a check operation is provided to check and report the consistency of all the related hnode files and to perform proper updates if necessary.

In one embodiment, a delete operation is provided to delete (using the host file system's delete operation) the original file (if exists) and deletes all the associated data units files and hnode files. If some share files and/or hnode files are inaccessible, a deletion incomplete flag is marked in the original file's hnode. This hnode is not deleted until all the other related files are deleted. Note, one embodiment uses a two-phased delete operation. First, the nodes storing a data unit corresponding to the information or the information space are notified of the deletion operation, and in response, they acknowledge they received the delete operation. After all acknowledgements are received, a delete commit message is sent to the nodes to commit the deletion operation. In this manner, further accessing of the information/information space can be prevented to maintain integrity, as well as ensuring that all nodes are aware that the delete operation is being performed such that one or more of them do not erroneously detect a data failure and recreate the missing data units should one of the nodes not receive a basic delete message (which would be a different/messaging error and the data should be deleted and not recreated).

In one embodiment, other operations are provided, such as, but not limited to, access, display, modify, update hnode files, etc.

Figure 11A:
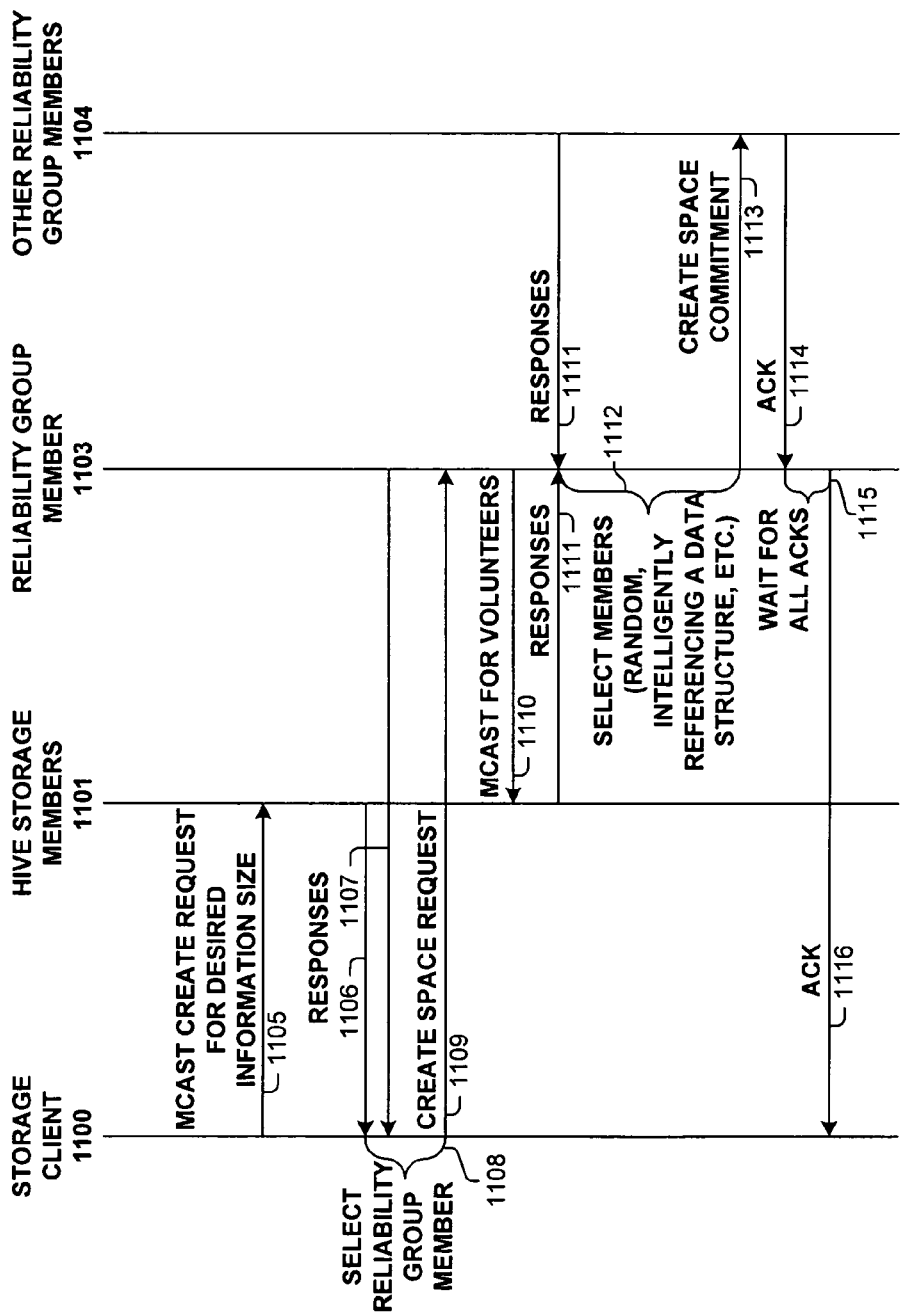
FIG. 11A illustrates one process used in one embodiment for creating a reliable storage space for reliably storing information among multiple systems.
Figure 11B:
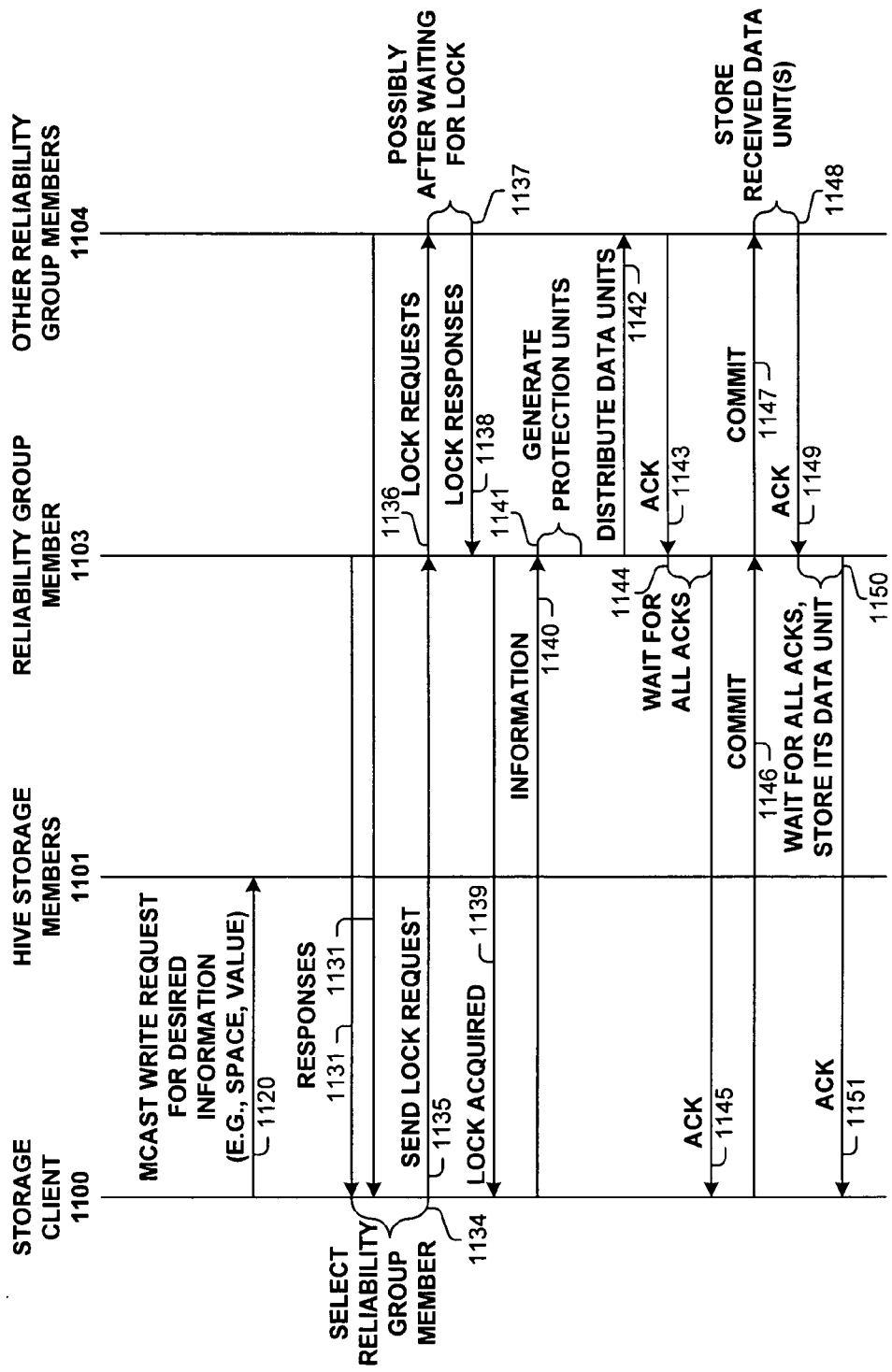
FIG. 11B illustrates one process used in one embodiment for writing information reliably stored among multiple systems.
Figure 11C:
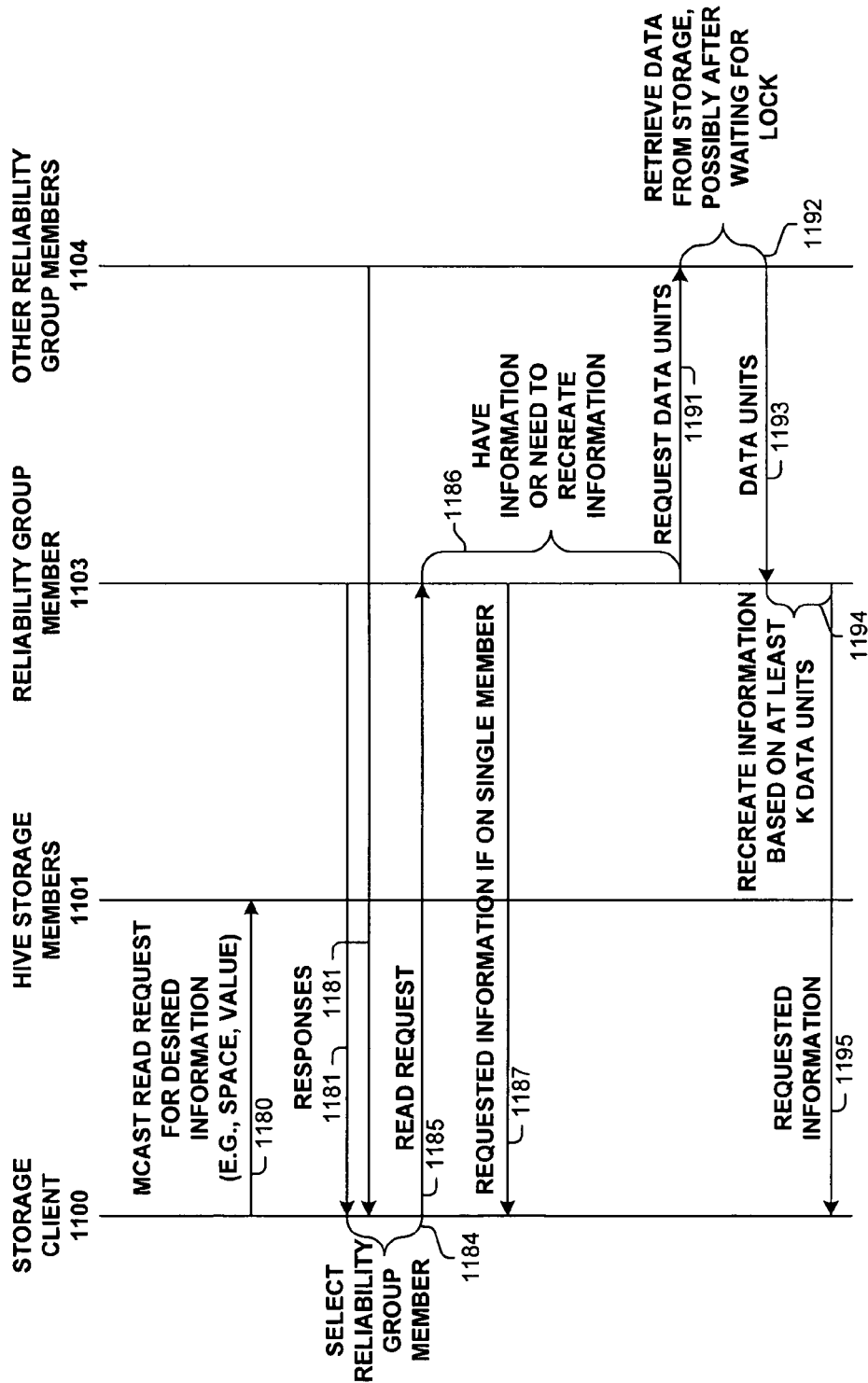
FIG. 11C illustrates one process used in one embodiment for reading information reliably stored among multiple systems.

FIGS. 11A-C illustrate the creation and distribution of data units from the original information performed in one embodiment, as well as recovering the original information from the distributed data units performed in one embodiment. Storage client 1100 refers to a process or system which is the end client or typically provides an interface between the end client and the reliable storage system. Hive storage members 1101 refers to all hive storage nodes, while reliability group member 1103 and other reliability group members 1104, a subset of the hive storage members 1101, refer to those hive storage nodes that are or will be storing data units corresponding to the original information of interest. Although these figures are discussed in using hive terminology, these teachings are applicable to non-hive systems (and typically in which case, the systems used will be specified rather than requesting volunteers and selecting among the responses).

First, FIG. 11A illustrates one process used in one embodiment for creating a reliable storage space for reliably storing information among multiple systems. Typically in response to storage client 1100 receiving an instruction to create an information space to be referenced by an identifier (e.g., a space, value tuple), storage client 1100 sends a multicast message (1105) to storage hive members 1101 indicating the need to create a storage space of a particular size to store the data units for an original information. Note, as used herein, the term multicast message is used to indicate that a message is sent to one or more systems, such as via one or more unicast or multicast messages. Responses 1106 and 1107 are received, and from which, a hive node is selected (1108) to be reliability group member 1103 (e.g., one of the hive storage nodes of the reliability group being created). Note, responses may have been received from other reliability group members 1104, which are depicted as part of as responses 1106.

A create space request instruction 1109 is sent to reliability group member 1103, typically including the number of nodes required (i.e., n), and storage size on required for each node. Reliability group member 1103 sends a multicast message to hive storage members 1101 (which include other reliability group members 1104), and responses 111 are received. Reliability group member 1103 then selects (1112) the other reliability group members 1104 based on the responses 1111. This selection (1112) can be random (including based on first received messages), or intelligently, such as referencing a data structure to identify membership information of other reliability groups and then selecting other reliability group members 1104 to diversify the hive node composition of the reliability group in comparison with the composition of one or more other reliability groups, and/or selecting hive nodes based on their territories and/or physical locations or subnets. A commit space instruction 1113 is then sent to the selected other reliability group members 1104, which return acknowledgement messages 1114. In response to receiving all (1115) of the acknowledgement messages 1114, reliability group member 1103 sends an acknowledgement messages 1116 to storage client indicating that the requested space has been created.

Note, as part of the process illustrated in FIG. 11A, one embodiment also assigns one or more of the other reliability group members 1104 which were not selected for storing data units to be a quorum member for use in error recover, such as when members storing data units of a space cannot communicate with each other (such as when a node goes down, network failure, etc.). To prevent multiple members from recovering multiple instances of a space, one embodiment imposes a limitation that a member must reach a quorum between itself and the other members with which it can communicate and only one of these members in the quorum will recreate the space. Typically the quorum is defined to be over fifty percent, but may be a different value for all or some of the storage spaces (i.e., if the data is static, multiple recoveries may be desired). This can be problematic, for example, when there are an even number of members and there is a network failure. For example, assume that two members are used to store the data units (i.e., n=2). If they cannot communicate with each other, the reliable storage space should be recovered by exactly one of the members. If a quorum value of greater than fifty percent is used, neither member will quality. A quorum member is therefore used as the tie-breaker to allow the possibility of a member obtaining the requisite quorum. As long as one of the members can communicate with the quorum member, the quorum member can be used to identify the one of these two members to recover the space. Note, in this context, recover of a space might require the recover of a member storing data or the quorum member.

FIG. 11B illustrates one process used in one embodiment for writing information reliably stored among multiple systems. Typically in response to receiving a write instruction including the information and its identifier, storage client 1100 sends a multicast message (1120) to hive storage members 1101 requesting access to an identified information. The reliability group members 1103 and 1104 typically each respond (1131). Note, in one embodiment, the same reliability group member 1103 is typically selected if it responds as this may simplify the avoidance of a race or data inconsistency condition with multiple members simultaneously trying to modify the information.

Storage client 1100 then selects (1134) reliability group member 1103 (one of the reliability group members which is not necessarily the same reliability group member interface storage client 1100 when the storage space was created). In one embodiment, a lock request (1135) is sent to reliability group member 1103, which sends lock requests (1136) to other reliability group members 1104. In response and possibly after waiting for the lock (1137), other reliability group members 1104 send lock response 1138, and after all of which have been received, reliability group member 1103 sends a lock acquired message (1139) to storage client 1100. Storage client 1100 then sends information (1140) to reliability group member 1103, which generates the protection units (1141) and distributes (1142) the other data units to other reliability group member 1104, which return acknowledgement messages (1143). After all acknowledgement messages have been received (1144), reliability group member 1103 sends (1145) an acknowledgement message to storage client 1100, which returns (1146) a commit storage message. In one embodiment, a different store/commit mechanism is used. Reliability group member 1103 then sends (1147) commit messages to other reliability group members 1104, which then store (1148) the received data units, and return (1149) an acknowledgment message to reliability group member 1103. Reliability group member 1103 stores its data unit. After all acknowledgement messages have been received (1150), reliability group member 1103 sends (1151) an acknowledgement message to storage client 1100.

First, FIG. 11C illustrates one process used in one embodiment for reading information reliably stored among multiple systems. In response to receiving a read instruction typically indicating the information desired, storage client 1100 sends (1180) a multicast request to hive storage members 1101 (which include reliability group members 1103 and 1104) indicating the information desired. Reliability group members 1103 and 1104 (e.g., hive storage members 1101 that have data units corresponding to the desired information) respond (1181), possibly indicating if they have the entire information without having to recreate it from distributed data units. Storage client 1100 then selects (1134) reliability group member 1103 (any one of the reliability group members which responded or preferably one with the entire information), and sends the read request to reliable group member 1103. Note, in one embodiment, the same reliability group member 1103 is selected if it responds as this may simplify the avoidance of a race or data inconsistency condition.

Storage client 1100 sends (1185) the read request to reliability group member 1103. If it determines (1186) that it has the entire information, the information is sent (1187) to storage client 1100. Note, in one embodiment, even if reliability group member 1103 has the entire information, reliability group member 1103 communicates with one or more (and typically all) of the other reliability group members 1104 storing a data unit corresponding to the information to ensure that the data it contains is not stale.

Otherwise, the information needs to be recreated from the distributed data units, which are requested (1191) from other reliability group members 1104, which retrieve (1192) the data units possibly after waiting for a lock to expire, and send (1193) their respective data unit to reliability group member 1103. Reliability group member 1103 recreates (1194) the original information based on the received data units (and possible a meta file describing what the data units contain), and forwards (1195) the requested information to storage client 1100.

In one embodiment, the original information is created from n data units. In one embodiment, the original information is created from k data units. In one embodiment, the original information is created from m data units, where k<m<n. In one embodiment, after k data units which do not include all of the information units are received, the recreation of the information is initiated from the currently received data units, and after all information units are received, the information is created from these information units (which doesn't require any decoding), such as in parallel with the other recreation operation or stopping the other recreation operation. As previously discussed, if all information units are received, the original information can be recreated by stitching the information units together; while if at least one information unit has not been received, the missing information units must be created from at least one protection unit and other portions of the received data units which requires processing resources. Embodiments are typically flexible to meet the needs of the application in the context of systems used to implement the reliable storage system.

Figure 12:
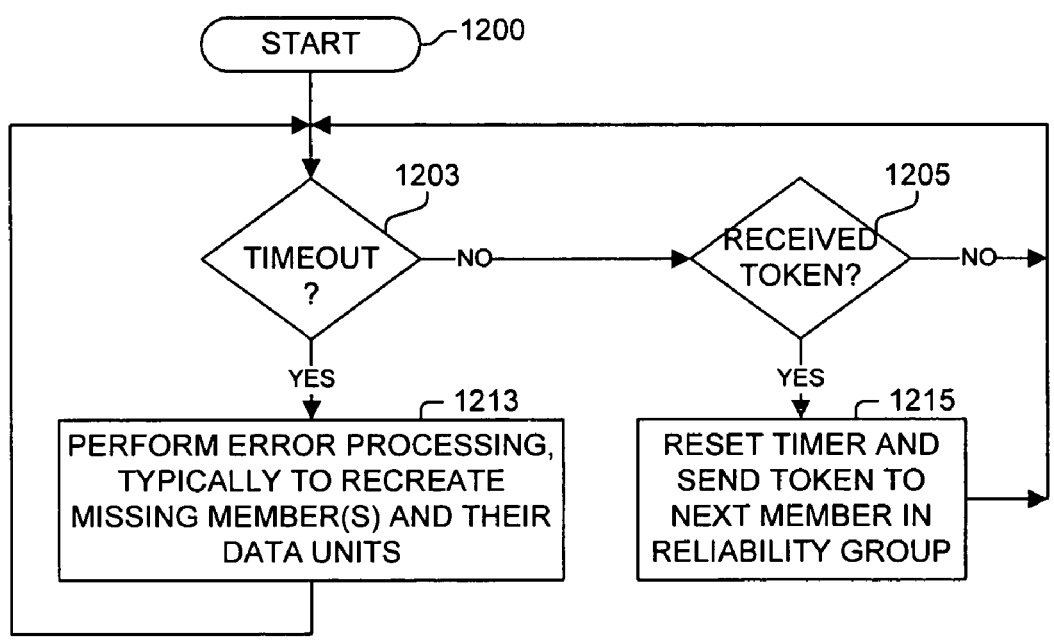
FIG. 12 is a flow diagram illustrating a process used in one embodiment for monitoring the status of a reliability group, and recreating a failed member.

FIG. 12 is a flow diagram illustrating a process used in one embodiment for monitoring the status of a reliability group, and recreating a failed member. One embodiment continually passes a token around from member to member of each of its reliability groups in order to identify when a system/data unit becomes unavailable. Turning to FIG. 12, processing beings with process block 1200. As determined in process block 1203, if there has not been a timeout since the time a last token was received, then as determined in process block 1205, if a token has been received, then in process block 1215, the timeout timer is reset, and the token is forwarded to the next member of the reliability group. Otherwise, in response to a timeout, error processing is performed in process block 1213, typically including recreating the missing member(s) of the reliability group by reading/recreating the information as described in FIG. 11C, and then either recreating a single new reliability group member, or recreating a whole new reliability group member (such as illustrated in FIG. 11A) and then writing the recreated information to it (such as shown in FIG. 11B) and then deleting the corrupted reliability group. If the original information cannot be recreated, an error message is generated.

Figure 13:
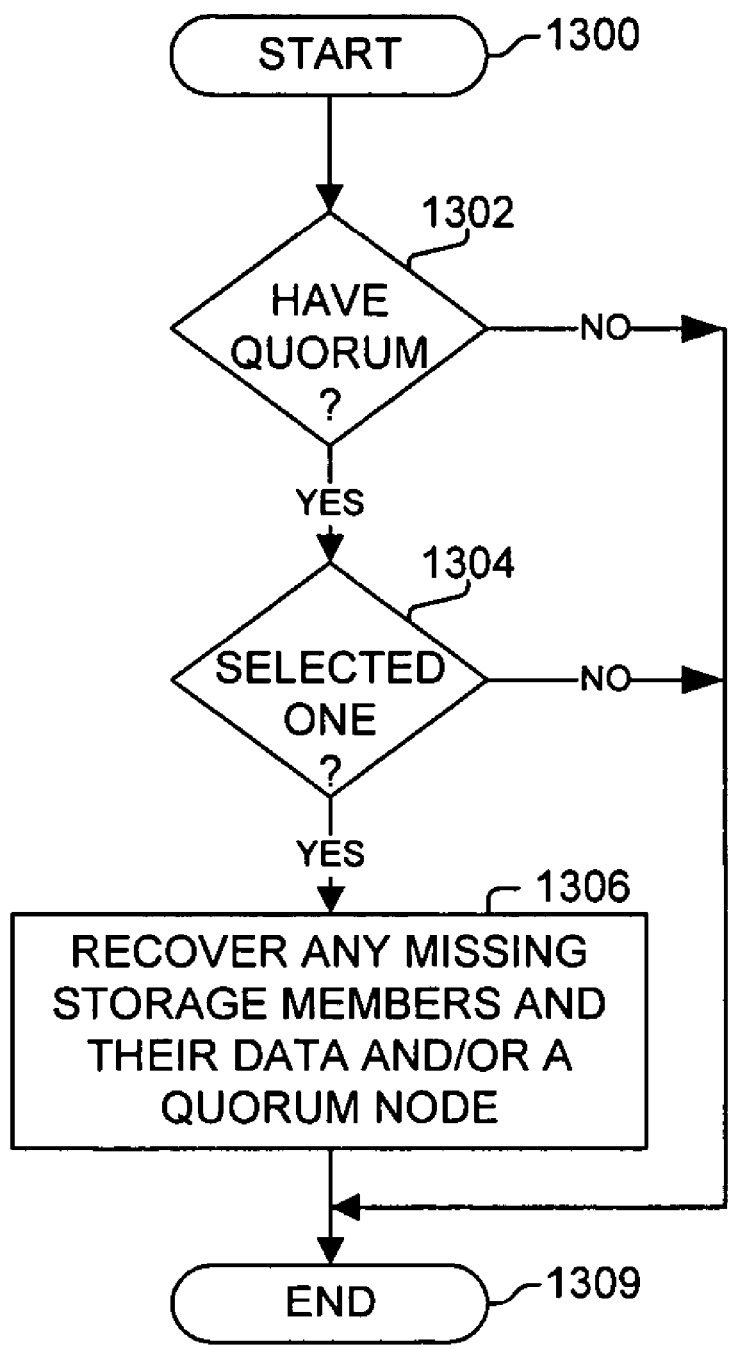
FIG. 13 is a flow diagram illustrating a process used in one embodiment for quorum-based recovery.

As discussed supra, it may be desirous of an embodiment to limit the recreation of a storage space to be performed only one of the remaining members. A technique used in one embodiment is to have a quorum requirement that only members that reach a quorum with itself and the number of members to which it can communicate are eligible to perform the recovery. FIG. 13 is a flow diagram illustrating a process used in one embodiment for quorum-based recovery. Processing begins with process block 1300. As determined in process blocks 1302 and 1304, if the member has achieve quorum and it is the selected one of the members reaching quorum (e.g., the highest storage member in a predetermined organizational order of the members resulting in quorum being reached, a randomly selected member of the storage members resulting in quorum being reached, etc.), then in process block 1306, the recovery process is performed by the selected member to recover any missing storage members and their data units, and/or possibly a quorum member. Note, in one embodiment, a quorum member is ineligible to perform the recover operation based on a design decision because it initially contains no data units and thus would require more work to recover the data. However, in one embodiment, the quorum member is eligible to perform the recover operation. Processing is complete as indicated by process block 1309.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for reliably storing information across a plurality of computers networked together, each of the plurality of computers including a storage mechanism, said information including a plurality of information units, the method comprising:
   generating at least one protection unit based on the plurality of information units such that said information can be recreated using less than all of said information units and at least one of said at least one protection unit, wherein a data unit of a plurality of data units is defined as one or more information units of the plurality of information units, one or more protection units of said at least one protection unit, or a combination of one or more information units of the plurality of information units and one or more protection units of said at least one protection unit; and wherein each of said information units are included in at least one of the plurality of data units and each of said at least one protection unit are included in at least one of the plurality of data units; and
   initiating storage on each of the plurality of computers of at least one data unit of the plurality of data units such that each data unit in the plurality of data units is stored in at least one of the plurality of computers;
   wherein said generating and said initiating storage are performed by a particular computer of the plurality of computers; and wherein the method includes: the particular computer receiving an instruction to store said information from a different device, said instruction including said information and an identifier for use in storing said information.

2. The method of claim 1, wherein said information includes a computer file, and each of the plurality of information units include an approximate same sized portion of the computer file.

3. The method of claim 1, wherein said information includes a plurality of computer files, and each of the plurality of information units includes a different one of the plurality of computer files.

4. The method of claim 1, comprising: retrieving less than all of the data units in the plurality of data units from computers of the plurality of computers, wherein said retrieved less than all data units include at least one of said at least one protection unit; and recreating said information from said retrieved less than all of the data units.

5. The method of claim 4, wherein said generating at least one protection unit includes using an (n, k) threshold scheme, wherein the plurality of data units consists of n data units; and wherein a minimum of k of the plurality of data units are required to recreate said information.

6. The method of claim 5, wherein n is three and k is two, and each of said k data units consists of one of said information units or one of said at least one protection unit.

7. The method of claim 5, wherein n is four and k is two, and each of said k data units consists of one of said information units and one of said at least one protection unit.

8. The method of claim 4, wherein said generating at least one protection unit includes using an (n, k) threshold scheme, wherein the plurality of data units consists of n data units; and wherein said retrieved less than all data units consists of more than k data units.

9. The method of claim 1, wherein said generating at least one protection unit includes using an (n, k) threshold scheme, wherein the plurality of data units consists of n data units; and wherein a minimum of k of the plurality of data units are required to recreate said information; and wherein said method includes selecting the plurality of computers based on their respective locations such that k computers are located on each of at least two physically different subnetworks.

10. The method of claim 9, comprising: retrieving k data units from computers of the plurality of computers, wherein said retrieved k data units include at least one of said at least one protection unit; and recreating said information from said retrieved less than all of the data units.

11. The method of claim 1, wherein each of the plurality of computers is a hive node; and the method includes identifying the plurality of computers using a volunteer procedure including: requesting hive volunteers, receiving responses to said request from each of the plurality of computers plus one or more additional hive nodes, and selecting the plurality of computers from said received responses.

12. The method of claim 11, wherein said generating at least one protection unit includes using an (n, k) threshold scheme, wherein the plurality of data units consists of n data units; and wherein a minimum of k of the plurality of data units are required to recreate said information; and wherein said method includes selecting the plurality of computers based on their respective locations such that k computers are located on each of at least two different hive territories.

13. The method of claim 12, comprising: retrieving k data units from computers of the plurality of computers, wherein said retrieved k data units include at least one of said at least one protection unit; and recreating said information from said retrieved less than all of the data units.

14. The method of claim 1, wherein the plurality of computers includes at least three computers.

15. The method of claim 1, wherein the plurality of computers includes at least four computers.

16. The method of claim 1, wherein the plurality of computers includes a first computer and a second computer; and the method includes the first computer updating said information, and subsequently, the second computer updating said information, wherein said updating said information includes said generating operation and said initiating storage on each of the plurality of computers operation.

17. The method of claim 1, wherein said generating at least one protection unit includes using an (n, k) threshold scheme, wherein the plurality of data units consists of n data units; and wherein a minimum of k of the plurality of data units are required to recreate said information; and wherein the method includes the particular computer receiving an instruction to store said information from a different device, the instruction including said information and a value of k to use in said generating operation.

18. The method of claim 17, wherein the instruction also defines the value of n.

19. A method for use with a hive distributed storage system for storing information among a plurality of hive nodes in a reliability group of a hive, each of the plurality of hive nodes including a storage mechanism, said information including a plurality of information units, the method comprising:
 creating the reliability group, said creating the reliability group including requesting hive volunteers and receiving responses, and selecting the plurality of hive nodes from said responses;
 generating at least one protection unit based on the plurality of information units such that said information can be recreated using less than all of said information units and at least one of said at least one protection unit, wherein a data unit of a plurality of data units is defined as one or more information units of the plurality of information units, one or more protection units of said at least one protection unit, or a combination of one or more information units of the plurality of information units and one or more protection units of said at least one protection unit; and wherein each of said information units are included in at least one of the plurality of data units and each of said at least one protection unit are included in at least one of the plurality of data units; and
 storing on each of said hive nodes at least one data unit of the plurality of data units such that each data unit in the plurality of data units is stored in at least one of said hive nodes.

20. The method of claim 19, wherein said information includes a computer file, and each of the plurality of information units include an approximate same sized portion of the computer file.

21. The method of claim 19, wherein said information includes a plurality of computer files, and each of the plurality of information units includes a different one of the plurality of computer files.

22. The method of claim 19, wherein each of said hive nodes of the reliability group includes a mechanism for replacing a failed hive node of said hive nodes of the reliability group.

23. The method of claim 22, comprising a particular hive node of said hive nodes recognizing that the failed hive node has failed, and in response, said particular hive node initiating replacement of said failed hive node in the reliability group with a replacement hive node; wherein said replacement of said failed hive node includes recreating and storing on the replacement hive node said at least one data unit stored on said failed hive node.

24. The method of claim 23, wherein said replacement of said failed hive node includes sending a multicast hive volunteer request message and receiving one or more responses, and selecting the replacement hive node from said one or more responses.

25. The method of claim 22, comprising a first particular hive node and a second particular hive node of said hive nodes each recognizing that the failed hive node has failed, and in response, the first particular hive node identifying that it should replace said failed node and the second particular hive node identifying that it not should replace said failed node, said first particular hive node initiating replacement of said failed hive node in the reliability group with a replacement hive node; wherein said replacement of said failed hive node includes recreating and storing on the replacement hive node said at least one data unit stored on said failed hive node.

26. The method of claim 25, wherein said identification by the first particular hive node that it should replace said failed node includes the first particular hive node identifying that it is in communication with a quorum of the plurality of nodes.

27. The method of claim 26, wherein said identification by the second particular hive node that it should not replace said failed node includes the second particular hive node identifying that it is not in communication with a quorum of the plurality of nodes.

28. The method of claim 19, wherein said responses include responses from hive nodes other than the plurality of hive nodes.

29. The method of claim 19, wherein said requesting hive volunteers includes sending a multicast hive volunteer request message.

30. The method of claim 19, wherein said selecting the plurality of hive nodes from responses includes intelligently selecting the plurality of hive nodes to diversify the hive node composition of the reliability group in comparison with the composition of one or more other reliability groups; wherein said intelligently selecting includes referencing a data structure identifying membership information of other reliability groups.

31. The method of claim 19, comprising: retrieving less than all of the data units in the plurality of data units from said hive nodes, wherein said retrieved less than all data units include at least one of said at least one protection unit; and recreating and said information from said retrieved less than all of the data units.

32. The method of claim 31, wherein said generating at least one protection unit includes using an (n, k) threshold scheme, wherein the plurality of data units consists of n data units; and wherein said retrieved less than all data units consists of k data units.

33. The method of claim 19, including receiving a meta file defining said information and an identifier for said information.

34. The method of claim 19, wherein said generating operation is performed by a particular hive node of the reliability group; and wherein the method includes: the particular hive node receiving an instruction to store said information from a remote device, said instruction including said information and an identifier for use in storing said information.

35. The method of claim 19, wherein said generating at least one protection unit includes using an (n, k) threshold scheme, wherein the plurality of data units consists of n data units; and wherein said less than all data units consists of k data units; wherein said generating operation is performed by a particular hive node of the reliability group; and wherein the method includes: the particular hive node receiving an instruction to store said information, the instruction including said information and a value of k to use in said generating operation.

36. The method of claim 19, including:
a requesting hive node multicasting a request to identify one of said hive nodes in the reliability group;
the requesting hive node receiving a response to the request from a particular hive node of said hive nodes in the reliability group;
the requesting hive node requesting said information from the particular hive node; and
the particular hive node sending the information to the requesting hive node.

37. The method of claim 36, including: the particular hive node requesting said data units from other hive nodes of the reliability group, and in response, the particular hive node receiving at least k information units and recreating said information using at least k information units of said received at least k information units.

38. A method for reliably storing information across different groups of computers, each of said different groups including a plurality of computers networked together, each of said computers including a storage mechanism, the method comprising:
reliability storing first information across a first group of said different groups of computers; and
reliability storing second information across a second group of said different groups of computers, wherein the first group of computers includes at least one computer different that the second groups of computers;
wherein said reliably storing said respective information, with said respective information including a plurality of information units, includes: generating at least one protection unit based on the plurality of information units such that said respective information can be recreated using less than all of said information units and at least one of said at least one protection unit, wherein a data unit of a plurality of data units is defined as one or more information units of the plurality of information units, one or more protection units of said at least one protection unit, or a combination of one or more information units of the plurality of information units and one or more protection units of said at least one protection unit; and wherein each of said information units are included in at least one of the plurality of data units and each of said at least one protection unit are included in at least one of the plurality of data units; and initiating storage on each of the plurality of computers of said respective group of computers of at least one data unit of the plurality of data units such that each data unit in the plurality of data units is stored in at least one of the plurality of computers of said respective group of computers;
wherein the first and second groups of computers each consist of a different number of computers, and said generating at least one protection unit includes using an (n, k) threshold scheme, wherein the plurality of data units consists of n data units; and wherein a minimum of k of the plurality of data units are required to recreate said information; and wherein said k used for storing said first information across the first group of computers is different than k used for storing said second information across the second group of computers.

39. The method of claim 38, wherein each of the plurality of computers of the first and second groups is a hive node.

40. A method for use with a hive distributed storage system for storing information units among a plurality of hive nodes in a reliability group of a hive, each of the plurality of hive nodes including a storage mechanism, said information including an information unit, the method comprising:
creating the reliability group, said creating the reliability group including requesting hive volunteers and receiving responses, and selecting the plurality of hive nodes from said responses;
generating one protection unit based on the information unit such that said information can be recreated from the information unit or the protection unit, wherein a data unit of a plurality of data units is defined as the information unit or the protection unit; and wherein the information unit is included in one of the plurality of data units and the protection unit is included in one of the plurality of data units; and
storing on each of said hive nodes at least one data unit of the plurality of data units such that each data unit in the plurality of data units is stored in at least one of said hive nodes.

41. The method of claim 40, wherein each of said hive nodes of the reliability group includes a mechanism for replacing a failed hive node of said hive nodes of the reliability group.

42. The method of claim 41, comprising one of said hive nodes recognizing that the failed hive node has failed, and in response, said hive node initiating replacement of said failed hive node in the reliability group with a replacement hive node; wherein said replacement of said failed hive node includes recreating and storing on the replacement hive node said at least one data unit stored on said failed hive node.

43. The method of claim 41, comprising a first particular hive node and a second particular hive node of said hive nodes each recognizing that the failed hive node has failed, and in response, the first particular hive node identifying that it should replace said failed node and the second particular hive node identifying that it not should replace said failed node, said first particular hive node initiating replacement of said failed hive node in the reliability group with a replacement hive node; wherein said replacement of said failed hive node includes recreating and storing on the replacement hive node said at least one data unit stored on said failed hive node.

44. The method of claim 43, wherein said identification by the first particular hive node that it should replace said failed node includes the first particular hive node identifying that it is in communication with a quorum of the plurality of nodes.

45. The method of claim 44, wherein said identification by the second particular hive node that it should not replace said failed node includes the second particular hive node identifying that it is not in communication with a quorum of the plurality of nodes.

46. The method of claim 40, including:
a requesting hive node multicasting a request to identify one of said hive nodes in the reliability group;
the requesting hive node receiving a response to the request from a particular hive node of said hive nodes in the reliability group;
the requesting hive node requesting said information from the particular hive node; and
the particular hive node sending the information to the requesting hive node.

47. The method of claim 1, wherein a hive includes each of the plurality of computers, with the hive including a plurality of territories, with each of the plurality of computers belonging to one of the plurality of territories; and wherein the instruction includes an indication of the reliability level determining whether to store the plurality of data units across multiple different territories of the plurality of territories; and wherein the particular computer is responsive to said indication of reliability in determining on which of the plurality of computers to store data units of the plurality of data units.

48. The method of claim 38, wherein said generating and said initiating storage for storing the first information is performed by a first particular computer of the first group, and said generating and said initiating storage for storing the second information is performed by a second particular computer of the second group; and wherein the method includes: the first particular computer receiving a first instruction to store said first information from a different device, said first instruction including said first information and a first identifier for use in storing said first information; and the second particular computer receiving a second instruction to store said second information from a second different device, said second instruction including said second information and a second identifier for use in storing said second information.

* * * * *